(12) United States Patent
Matsuura et al.

(10) Patent No.: US 8,614,770 B2
(45) Date of Patent: Dec. 24, 2013

(54) DIGITAL BROADCAST RECEIVER AND RECEIVING METHOD

(75) Inventors: Daiki Matsuura, Tokyo (JP); Keiichi Shirasuka, Tokyo (JP); Soichiro Matsumoto, Tokyo (JP); Minoru Sota, Tokyo (JP); Tadashi Sakaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1223 days.

(21) Appl. No.: 12/279,514

(22) PCT Filed: Apr. 16, 2007

(86) PCT No.: PCT/JP2007/058255
§ 371 (c)(1),
(2), (4) Date: Aug. 14, 2008

(87) PCT Pub. No.: WO2007/125777
PCT Pub. Date: Nov. 8, 2007

(65) Prior Publication Data
US 2009/0021641 A1    Jan. 22, 2009

(30) Foreign Application Priority Data

Apr. 26, 2006  (JP) .................................. 2006-121516
Nov. 22, 2006  (JP) .................................. 2006-315530

(51) Int. Cl.
*H04N 5/64* (2006.01)
(52) U.S. Cl.
USPC .......................................................... 348/837
(58) Field of Classification Search
USPC .................... 348/553, 739, 837; 455/130–355
See application file for complete search history.

(56) References Cited

U.S. PATENT DOCUMENTS

| 5,448,750 | A | * | 9/1995 | Eriksson et al. | ............ 455/452.2 |
| 2003/0103446 | A1 | | 6/2003 | Negishi et al. | |
| 2005/0013450 | A1 | * | 1/2005 | Kumazawa | .................... 381/103 |
| 2005/0020223 | A1 | * | 1/2005 | Ellis et al. | .................. 455/186.1 |
| 2005/0212966 | A1 | * | 9/2005 | Tanaka et al. | .................. 348/559 |

FOREIGN PATENT DOCUMENTS

| JP | 2006-109337 A | 4/2000 |
| JP | 2001-251229 A | 9/2001 |
| JP | 2001-285101 A | 10/2001 |
| JP | 2001285101 A | * 10/2001 |
| JP | 2002-141877 A | 5/2002 |

(Continued)

*Primary Examiner* — Mehrdad Dastouri
*Assistant Examiner* — Jared Walker
(74) *Attorney, Agent, or Firm* — Birch, Stewart, Kolasch & Birch, LLP

(57) ABSTRACT

An unreceivability detector (6) that, based on various information obtained from a signal received from a broadcasting station of a digital broadcast program being viewed/listened to, detects that the received signal of that broadcasting station is currently unreceivable and outputs an unreceivability notification, an affiliated station memory (8) that stores channel information of the program being viewed/listened to and channel information of a station affiliated with that broadcasting station, and a tuning control unit (7) that, when it receives an unreceivability notification from the unreceivability detector, retrieves the channel information of the affiliated station from the affiliated station memory (8) and permits the program of the affiliated station to be viewed/listened to, if it is currently in a receivable state, and outputs an instruction to make a channel search for an affiliated station if no affiliated station is stored in the affiliated station memory are provided. When the program being viewed/listened to becomes unviewable/unlistenable, the time during which program viewing/listening is interrupted can be shortened.

24 Claims, 27 Drawing Sheets

(56) References Cited

FOREIGN PATENT DOCUMENTS

| | | | |
|---|---|---|---|
| JP | 2002-359825 A | | 12/2002 |
| JP | 2002359825 A | * | 12/2002 |
| JP | 2003-152578 A | | 5/2003 |
| JP | 2004-140690 A | | 5/2004 |
| JP | 2004-289464 A | | 10/2004 |
| JP | 2004-320406 A | | 11/2004 |
| JP | 2005-210648 A | | 8/2005 |
| JP | 2005-277873 A | | 10/2005 |
| JP | 2006-50540 A | | 2/2006 |
| JP | 2006-67489 A | | 3/2006 |
| JP | 2006-108737 A | | 4/2006 |
| JP | 2006-115404 A | | 4/2006 |
| JP | 2006109337 A | * | 4/2006 |
| JP | 2006-166035 A | | 6/2006 |
| JP | 2006-174208 A | | 6/2006 |
| WO | WO-2006/041039 A1 | | 4/2006 |

* cited by examiner

FIG.5

| SERVICE ID | | | | | | | | | | | | | | | |
|---|---|---|---|---|---|---|---|---|---|---|---|---|---|---|---|
| MSB | | | | | | | | | | | | | | | LSB |
| b15 | b14 | b13 | b12 | b11 | b10 | b09 | b08 | b07 | b06 | b05 | b04 | b03 | b02 | b01 | b00 |
| AREA IDENTIFICATION CODE | | | | | | PREFECTURAL MULTI FLAG | SERVICE TYPE | | REGIONAL BROADCASTER IDENTIFICATION CODE | | | | SERVICE NUMBER | | |

FIG.6

AREA IDENTIFICATION CODES

| AREA IDENTIFICATION CODE | DESCRIPTION |
|---|---|
| 0~9 | WIDE-AREA BROADCAST |
| 10~63 | PREFECTURAL (PREFECTURAL STATION) BROADCAST |

FIG.7  AREA IDENTIFICATION CODE ASSIGNMENTS

| ID | AREA | ID | AREA | ID | AREA |
|---|---|---|---|---|---|
| 0 | RESERVED | 16 | HOKKAIDO (MURORAN) | 32 | YAMANASHI |
| 1 | KANTO AREA | 17 | MIYAGI | 33 | AICHI |
| 2 | KINKI AREA | 18 | AKITA | 34 | ISHIKAWA |
| 3 | CHUKYO AREA | 19 | YAMAGATA | 35 | SHIZUOKA |
| 4 | HOKKAIDO AREA | 20 | IWATE | 36 | FUKUI |
| 5 | OKAYAMA, KAGAWA | 21 | FUKUSHIMA | 37 | TOYAMA |
| 6 | SHIMANE, TOTTORI | 22 | AOMORI | 38 | MIE |
| 7 | RESERVED | 23 | TOKYO | 39 | GIFU |
| 8 | RESERVED | 24 | KANAGAWA | 40 | OSAKA |
| 9 | RESERVED | 25 | GUNMA | 41 | KYOTO |
| 10 | HOKKAIDO (SAPPORO) | 26 | IBARAKI | 42 | HYOGO |
| 11 | HOKKAIDO (HAKODATE) | 27 | CHIBA | 43 | WAKAYAMA |
| 12 | HOKKAIDO (ASAHIKAWA) | 28 | TOCHIGI | 44 | NARA |
| 13 | HOKKAIDO (OBIHIRO) | 29 | SAITAMA | 45 | SHIGA |
| 14 | HOKKAIDO (KUSHIRO) | 30 | NAGANO | 46 | HIROSHIMA |
| 15 | HOKKAIDO (KITAMI) | 31 | NIIGATA | 47 | OKAYAMA |

| ID | AREA |
|---|---|
| 48 | SHIMANE |
| 49 | TOTTORI |
| 50 | YAMAGUCHI |
| 51 | EHIME |
| 52 | KAGAWA |
| 53 | TOKUSHIMA |
| 54 | KOCHI |
| 55 | FUKUOKA |
| 56 | KUMAMOTO |
| 57 | NAGASAKI |
| 58 | KAGOSHIMA |
| 59 | MIYAZAKI |
| 60 | OITA |
| 61 | SAGA |
| 62 | OKINAWA |
| 63 | RESERVED |

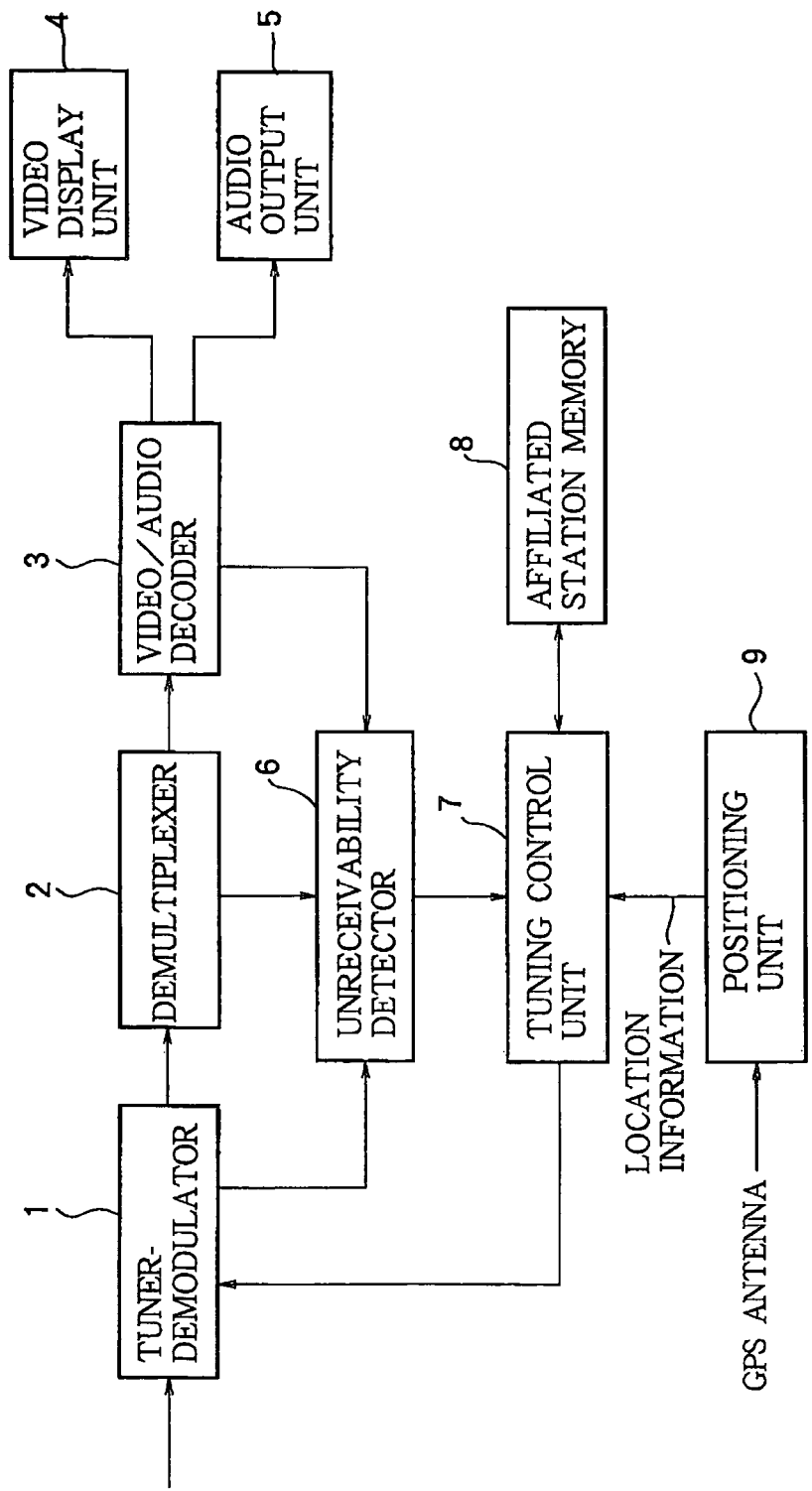

FIG.17 (a)

| LEVEL 1 | LEVEL 2 | LEVEL 3 |
|---|---|---|
| TS(A) | TS(B) | TS(C) |

FIG.17 (b)

| LEVEL 1 | LEVEL 2 | LEVEL 3 | LEVEL 4 |
|---|---|---|---|
| TS(D) | TS(A) | TS(B) | TS(C) |

NEW TS

FIG.18 (a)

| LEVEL 1 | LEVEL 2 | LEVEL 3 | LEVEL 4 |
|---|---|---|---|
| TS(D) | TS(A) | TS(B) | TS(C) |

FIG.18 (b)

| LEVEL 1 | LEVEL 2 | LEVEL 3 | LEVEL 4 |
|---|---|---|---|
| TS(A) | TS(D) | TS(B) | TS(C) |

DIGITAL BROADCAST RECEIVER AND RECEIVING METHOD

FIELD OF THE INVENTION

The present invention relates to a digital broadcast receiver that is mounted in a vehicle and receives and decodes a digital broadcast, more particularly to a digital broadcast receiver that simplifies the finding of an affiliated broadcasting station when the program reception conditions of the broadcasting station being received worsen.

BACKGROUND ART

Conventional digital broadcasting stations of this type do not transmit information indicating other broadcasting stations that are broadcasting programs with the same content as the digital broadcasting station. Moreover, even if a digital broadcasting station transmitted that type of information, the information has not been used by receivers installed in vehicles. When the reception of a program being viewed/listened to on a vehicle-mounted receiver became impossible because the received signal level had become too low or for some other reason, accordingly, the viewer/listener had to select receivable broadcasting stations one by one manually and determine whether they were broadcasting the same program content.

A known method of avoiding this troublesome procedure is, for example, for the digital broadcasting station to broadcast program information including information about affiliated stations; when the vehicle-mounted receiver decides that program reception is impossible because the receiving level is too low, for example, it automatically searches for another receivable broadcasting station; if it finds another receivable broadcasting station, it extracts that broadcasting station's affiliated station information from that broadcasting station's program information; if the affiliated station information indicates that the station is affiliated with the station that was broadcasting the program being viewed/listened to before the receiving level dropped, the receiver automatically selects that broadcasting station (see, for example, Patent Document 1, claim 1 and FIG. 1).

Another known method automatically conducts a channel search when it decides that program reception is impossible because the receiving level is too low, extracts from the program information of each channel found the title of the program that the broadcasting station is broadcasting, and compares that program title with the program title of the program that was being viewed/listened to before the receiving level dropped; if they are the same (or if they are in the same genre, or if their program identification numbers are the same when compared), the receiver selects the broadcasting station (see, for example, Patent Document 1 claims 2-5 and FIG. 1).

Patent Document 1: Japanese Patent Application Publication No. 2004-140690 (claims 1-5 and FIG. 1).

DISCLOSURE OF THE INVENTION

Problems to be Solved by the Invention

A problem with the conventional digital broadcast receivers is that since they search for affiliated stations by scanning the channels in order across the entire receivable frequency band every time a drop in receiving level makes viewing/listening impossibler program viewing/listening is interrupted for lengthy intervals. In particular, if a vehicle such as an automobile is traveling near the boundary between the service areas of two affiliated broadcasting stations, frequent channel searches are made to find affiliated stations, and viewing/listening to the program is interrupted for an extremely long time.

The present invention addresses the above problem with the object of providing a digital broadcast receiver and receiving method that, when viewing/listening to the program of the broadcasting station of the program being viewed/listened to becomes impossible, can shorten the time needed to find an affiliated broadcasting station, and can shorten the time for which program viewing/listening is interrupted.

Means of Solution of the Problems

The present invention provides a digital broadcast receiver comprising:

an unreceivability detector for detecting, based on information obtained from the broadcasting station of the digital broadcast program currently being viewed/listened to, a state (referred to below as 'the currently unreceivable state') in which the received signal from the broadcasting station of the program currently being viewed/listened to is currently unreceivable, and outputting an unreceivability notification;

an affiliated station memory for storing at least channel information of the broadcasting station of the program currently being viewed/listened to and, when an affiliated broadcasting station affiliated with the broadcasting station of the program currently being viewed/listened to is found in a channel search, storing at least channel information of the affiliated broadcasting station in association, as related by affiliation, with the at least channel information of the broadcasting station of the program currently being viewed/listened to; and a tuning control unit for, upon receiving the unreceivability notification from the unreceivability detector, retrieving the channel information of affiliated broadcasting stations from the affiliated station memory, if an affiliated broadcasting station that is possibly receivable at the current location is stored, deciding whether the received signal based on the channel information of the affiliated broadcasting station is currently in a receivable state (referred to below as the 'currently receivable state'), and permitting the program of the affiliated broadcasting station to be viewed/listened to if it is in the 'currently receivable state', and if no affiliated broadcasting station that is possibly receivable at the current location is stored, outputting a command to make a channel search for affiliated broadcasting stations.

Effect Of The Invention

When a broadcasting station that has been selected and for which a station affiliation relationship has been recorded is being received or an affiliated broadcasting station thereof is being received and the broadcasting station being received has come into the 'currently unreceivable state', the present invention can shorten the time for which program viewing/listening is interrupted by automatically referring to the records, saving the time that would have been needed to make a channel search for affiliated broadcast stations by scanning the entire receivable frequency band.

BRIEF DESCRIPTION OF THE DRAWINGS

FIG. 5 shows the bit structure of the service ID in a terrestrial digital broadcast.

FIG. 6 shows the classification of the area identifier field of the service ID in a terrestrial digital broadcast.

FIG. 7 indicates the area assignments of the area identifier field in Japanese terrestrial digital broadcasting.

FIG. 8 is a block diagram showing the schematic internal structure of a digital broadcast receiver according to a second embodiment of this invention.

FIGS. 17(a) and 17(b) form a diagram illustrating a priority order determination algorithm for selecting the next station when an affiliated station is successfully received (when a new TS is detected) in a tenth embodiment of this invention.

FIGS. 18(a) and 18(b) form a diagram illustrating a priority order determination algorithm for selecting the next station when an affiliated station stored in the affiliated station memory 8 or an MFN TS is successfully received in the tenth embodiment of this invention.

Figure 1:
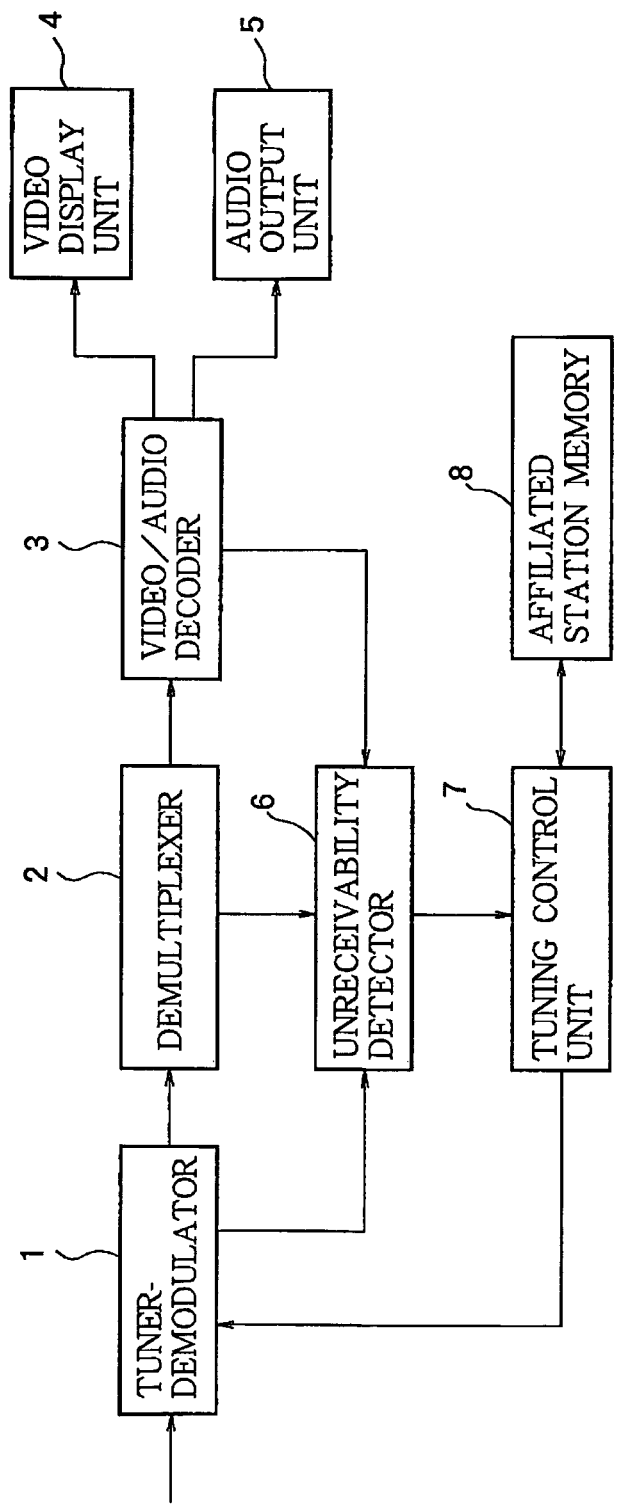
FIG. 1 is a block diagram showing the schematic internal structure of a digital broadcast receiver according to a first embodiment of this invention.

EXPLANATION OF REFERENCE CHARACTERS 1 tuner-demodulator, 2 demultiplexer, 3 video/audio decoder, 4 video display unit, 5 audio output unit, 6 unreceivability detector, 7 tuning control unit, 8 affiliated station memory, 9 positioning unit, 51 'viewing/listening to broadcasting station A' state, 52 'searching for affiliated station' state, 53 'viewing/listening to broadcasting station B' state, 61 'viewing/listening to program A' state, 62 'viewing/listening to program B' state, 71 'viewing/listening to broadcasting station A on lower level' state, 72 'viewing/listening to broadcasting station A on upper level' state, 73 'viewing/listening to broadcasting station B on lower level' state, 74 'viewing/listening to broadcasting station B on upper level' state, 75 'searching for affiliated station' state, 81 'viewing/listening to broadcasting station A on lower level' state, 82 'viewing/listening to broadcasting station A on upper level' state, 83 'viewing/listening to broadcasting station B on lower level' state, 84 'viewing/listening to broadcasting station B on upper level' state

BEST MODE OF PRACTICING THE INVENTION

First Embodiment

FIG. 1 is a block diagram showing the schematic internal structure of a digital broadcast receiver according to a first embodiment of this invention. The digital broadcast receiver shown in FIG. 1 has a tuner-demodulator 1, a demultiplexer 2, a video/audio decoder 3, a video display unit 4, an audio output unit 5, an unreceivability detector 6, a tuning control unit 7, and an affiliated station memory 8.

The tuner-demodulator 1 inputs a broadcast signal output from a digital broadcast broadcasting station and received by an antenna, performs station selection, demodulation, and error correction, and outputs a TS (transport stream). Station selection is performed in response to a designation made by an input means, or on the basis of channel information stored in the affiliated station memory 8 as described later, or on the basis of information detected in a channel search as described later. The tuner-demodulator 1 also outputs at least one of various types of information such as the receiving level of the received signal of the selected program, the receiving C/N ratio (Carrier-to-Noise ratio: the ratio of carrier power to noise power), PLL lock information, frame lock information, and error rate information.

The demultiplexer 2 extracts program specific information (PSI) and service information (SI) from the input TS and stores the information in a memory. The memory here can be an affiliated station memory 8, which will be described later, or another storage unit.

The demultiplexer 2 further detects the values of TS packet identifiers (PIDs) of video TS packets and audio TS packets in the TS, from the extracted PSI and/or SI (hereinafter, 'PSI/SI'), extracts the video TS packets and audio TS packets separately by filtering the TS with the PIDs, outputs them to the video/audio decoder 3, and outputs also at least one of the following types of information: program association table (PAT) interruption information, program map table (PMT) interruption information, TS loss of synchronization information, and TS packet loss information.

The PAT interruption information is issued when a PAT fails to arrive at its prescribed time interval. The PMT interruption information is issued when a PMT fails to arrive at its prescribed time interval. The TS loss of synchronization information (notification) is issued when synchronization bytes are not detected at intervals of 188 bytes in the TS. The TS packet loss information (notification) is issued when a discontinuity is detected in continuity counter values included in the TS headers.

The video/audio decoder 3 decodes a video signal and audio signal from the video packets and audio packets, outputs the video signal decoded from the video packets to the video display unit 4 and the audio signal decoded from the audio packets to the audio output unit 5, and also outputs decoding error detection information and/or decoding error rate information.

The video display unit 4 displays a picture on a screen in accordance with the input video signal decoded from the video packet. The audio output unit 5 outputs sound from a speaker in accordance with the input audio signal decoded from the audio packet.

If the digital broadcast receiver is mounted in a moving vehicle such as an automobile or is being carried around, for example, as the receiving location of the digital broadcast receiver shifts, the receiving location may be outside the service area of the broadcasting station of the program being viewed/listened to, or reception may be affected by a terrestrial structure that blocks or attenuates the carrier wave, making it impossible to receive the program from the station broadcasting the program being viewed/listened to; the unreceivability detector 6 detects this state.

Accordingly, on the basis of at least one of the various types of information output from the tuner-demodulator 1, demultiplexer 2, and video/audio decoder 3, the unreceivability detector 6 detects that the received signal is in the 'currently unreceivable state.'

For example, if the receiving level information from the tuner-demodulator 1 indicates that the receiving level is lower than a certain value, the signal is determined to be 'currently unreceivable.'

Likewise, if the receiving C/N ratio information from the tuner-demodulator 1 indicates that the C/N ratio is lower than a certain value, the signal is determined to be 'currently unreceivable.'

Likewise, if the PLL lock information from the tuner-demodulator 1 indicates that the PLL is out of lock, the signal is determined to be 'currently unreceivable.'

Likewise, if the frame lock information from the tuner-demodulator 1 indicates that frame lock has been lost, the signal is determined to be 'currently unreceivable.'

Likewise, if the error rate information from the tuner-demodulator 1 indicates that the error rate is greater than a certain value, the signal is determined to be 'currently unreceivable.'

Likewise, if a PAT interruption is detected in accordance with the program association table (PAT) interruption information from the demultiplexer 2, the signal is determined to be 'currently unreceivable.'

Likewise, if a PMT interruption is detected in accordance with the program map table (PMT) interruption information from the demultiplexer 2, the signal is determined to be 'currently unreceivable.'

Likewise, if TS loss of synchronization is detected in accordance with the TS loss of synchronization information from the demultiplexer 2, the signal is determined to be 'currently unreceivable.'

Likewise, if TS packet loss is detected in accordance with the TS packet loss information from the demultiplexer 2, the signal is determined to be 'currently unreceivable.'

Likewise, if a decoding error is detected in accordance with the decoding error detection information from the video/audio decoder 3, the signal is determined to be 'currently unreceivable.'

Likewise, if the decoding error rate information from the video/audio decoder 3 indicates that the decoding error rate is higher than a certain value, the signal is determined to be 'currently unreceivable.'

The unreceivability detector 6 determines whether the received signal is in the 'currently unreceivable state,' in accordance with the input information or input notification. In this process, if the signal is in an 'impending unreceivable state,' that is, if the signal is currently receivable but may soon become unreceivable because the signal level is close to the unreceivable level, the signal is treated as if it were in the 'currently unreceivable state' even though it is receivable at present.

If it is determined that the received signal is in the 'currently unreceivable state,' an unreceivability notification is sent to the tuning control unit 7. That is, on the basis of various information obtained from the signal received from the station broadcasting the program being viewed/listened to, the unreceivability detector 6 detects that the signal of the program being viewed/listened to from that broadcasting station has become unreceivable and outputs the unreceivability notification.

The tuning control unit 7 stores at least channel information of the broadcasting station of the program being viewed/listened to, in the affiliated station memory 8 or another storage unit.

Upon receiving the unreceivability notification from the unreceivability detector 6, the tuning control unit 7 searches for channel information of an affiliated broadcasting station (affiliated station) in the affiliated station memory 8, which will be described later; if an affiliated station that the digital broadcast receiver can receive in its current location is stored, the tuning control unit 7 determines whether the received signal based on the channel information of the affiliated station is in the 'currently receivable state;' if the signal is in the 'currently receivable state,' it permits the program of the affiliated station to be viewed/listened to (selects the station, causing display of its picture and output of its sound); if no affiliated station that the digital broadcast receiver can receive in its current location is stored, the tuning control unit 7 issues commands to the tuner-demodulator Ito perform a channel search for an affiliated station. The tuning control unit 7 issues these channel search commands so as to produce operations following the state transition diagram in FIG. 2, which will be described later.

If a plurality of affiliated stations are stored in the affiliated station memory 8, when the unreceivability notification is received from the unreceivability detector 6, an area adjacent to the area identified by the area identifier value of the service ID obtained from the signal received from the station broadcasting the program being viewed/listened to is obtained, and broadcasting stations disposed in areas adjacent to the service area of the station broadcasting the signal of the program being viewed/listened to are selected from the plurality of affiliated stations stored in the affiliated station memory 8, in order of proximity, to check whether they are in the 'currently receivable state.'

The affiliated station memory 8 stores at least channel information of the broadcasting station of the program being viewed/listened to, and if a channel search has detected an affiliated station of the broadcasting station of the program being viewed/listened to, it also stores at least the channel information of the affiliated station in association, as related by affiliation, with at least the channel information of the broadcasting station of the program being viewed/listened to. The affiliated station memory 8 may store a plurality of affiliated stations.

Figure 2:
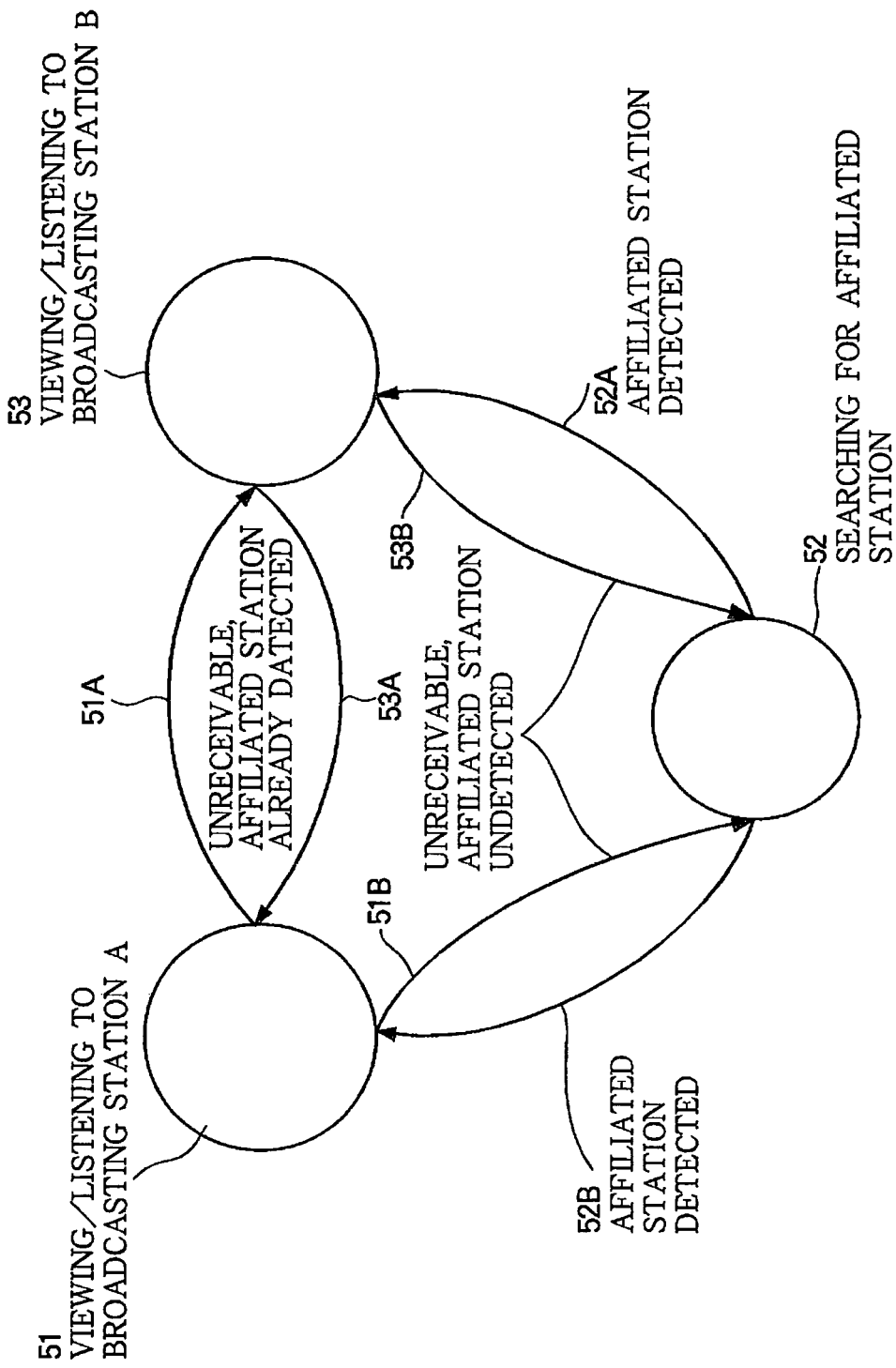
FIG. 2 is a state transition diagram of the station selection operation of the tuning control unit 7 in the digital broadcast receiver in FIG. 1.

FIG. 2 is a state transition diagram of the station selection operation of the tuning control unit 7 in the digital broadcast receiver in FIG. 1.

In FIG. 2, the 'viewing/listening to broadcasting station A' state 51 indicates that a program of digital broadcasting station A is being viewed/listened to with the digital broadcast receiver. The 'searching for affiliated station' state 52 indicates that the digital broadcast receiver is performing a channel search for an affiliated station, to find a broadcasting station in the same affiliation with broadcasting station A or B by selecting channels in ascending order of physical frequency, for example. The 'viewing/listening to broadcasting station B' state 53 indicates that the digital broadcast receiver is in the state in which a program of digital broadcasting station B is being viewed/listened to. Broadcasting station A and broadcasting station B are digital broadcasting stations belonging to the same affiliation. In general, digital broadcasting stations belonging to the same affiliation are highly likely to broadcast the same program at the same time, although at some times, a program may be broadcast specifically for the area in which the digital broadcasting station is located.

The transition conditions are as shown in the diagram. In the 'viewing/listening to broadcasting station A' state 51, a transition 51A to the 'viewing/listening to broadcasting station B' state 53 occurs when an unreceivability notification is input in a state in which an affiliated station (broadcasting station B) has already been found, and a transition 51B to the 'searching for affiliated station' state 52 occurs when an unreceivability notification is input in a state in which an affiliated station has not been found yet.

Likewise, in the 'viewing/listening to broadcasting station B' state 53, a transition 53A to the 'viewing/listening to broadcasting station A' state 51 occurs when an unreceivability notification is input in a state in which an affiliated station (broadcasting station A) has already been found, and a transition 53B to the 'searching for affiliated station' state 52 occurs when an unreceivability notification is input in a state in which an affiliated station has not been found yet.

In the 'searching for affiliated station' state 52, when an affiliated station is found as a result of the search, a transition is made to either the 'viewing/listening to broadcasting station A' state 51 or the 'viewing/listening to broadcasting station B' state 53, whichever was not the source state of the preceding transition. That is, if the preceding transition was from the 'viewing/listening to broadcasting station A' state 51, a transition 52A is made to the 'viewing/listening to broadcasting station B' state 53, broadcasting station B being the affiliated station obtained as the result of the search; if the preceding transition was from the 'viewing/listening to broadcasting station B' state 53, a transition 52B is made to the 'viewing/listening to broadcasting station A' state 51, broadcasting station A being the affiliated station obtained as the result of the search.

Figure 3:
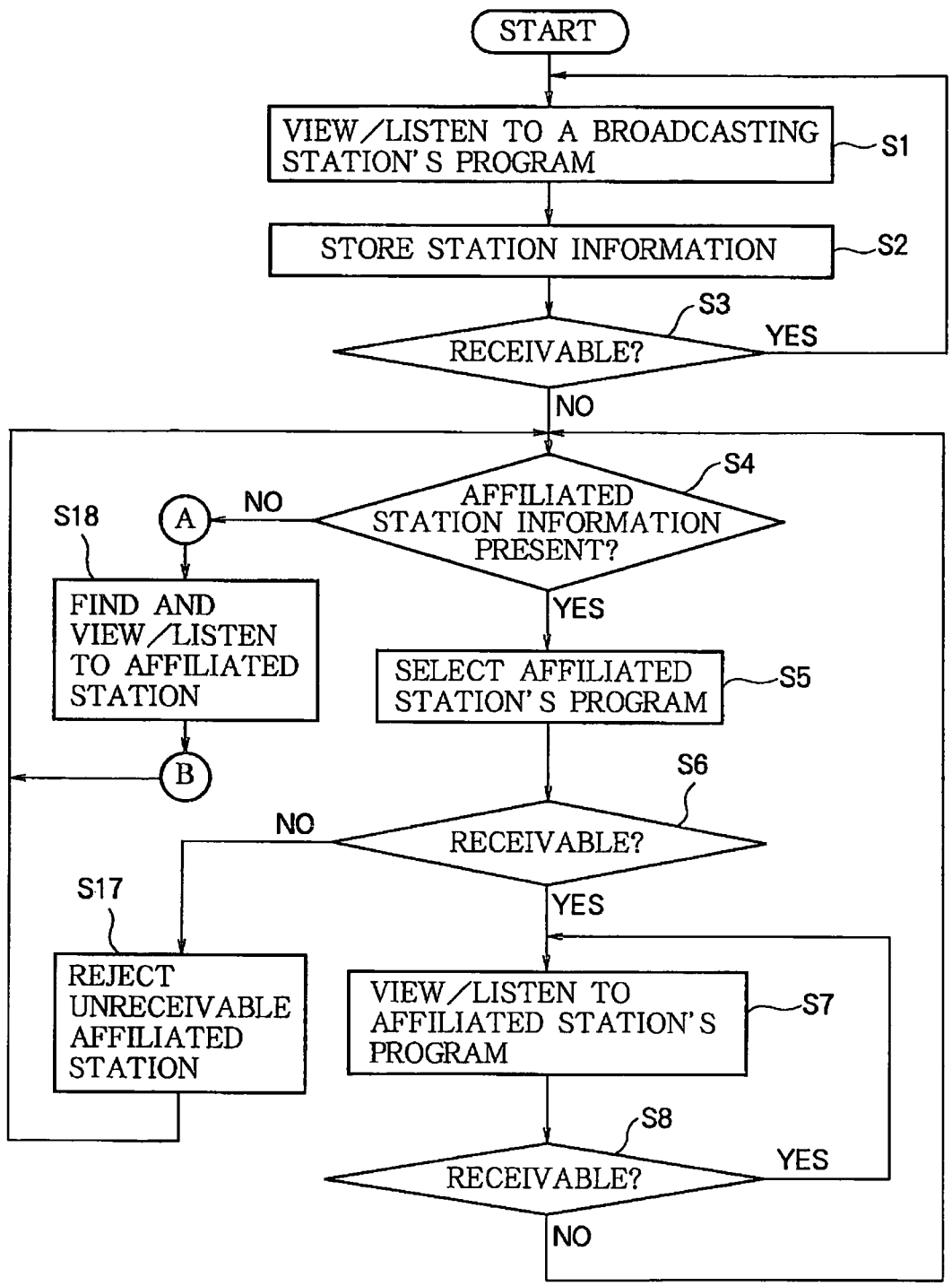
FIG. 3 is a flowchart illustrating the operation of the tuning control unit 7 in the digital broadcast receiver in FIG. 1.
Figure 4:
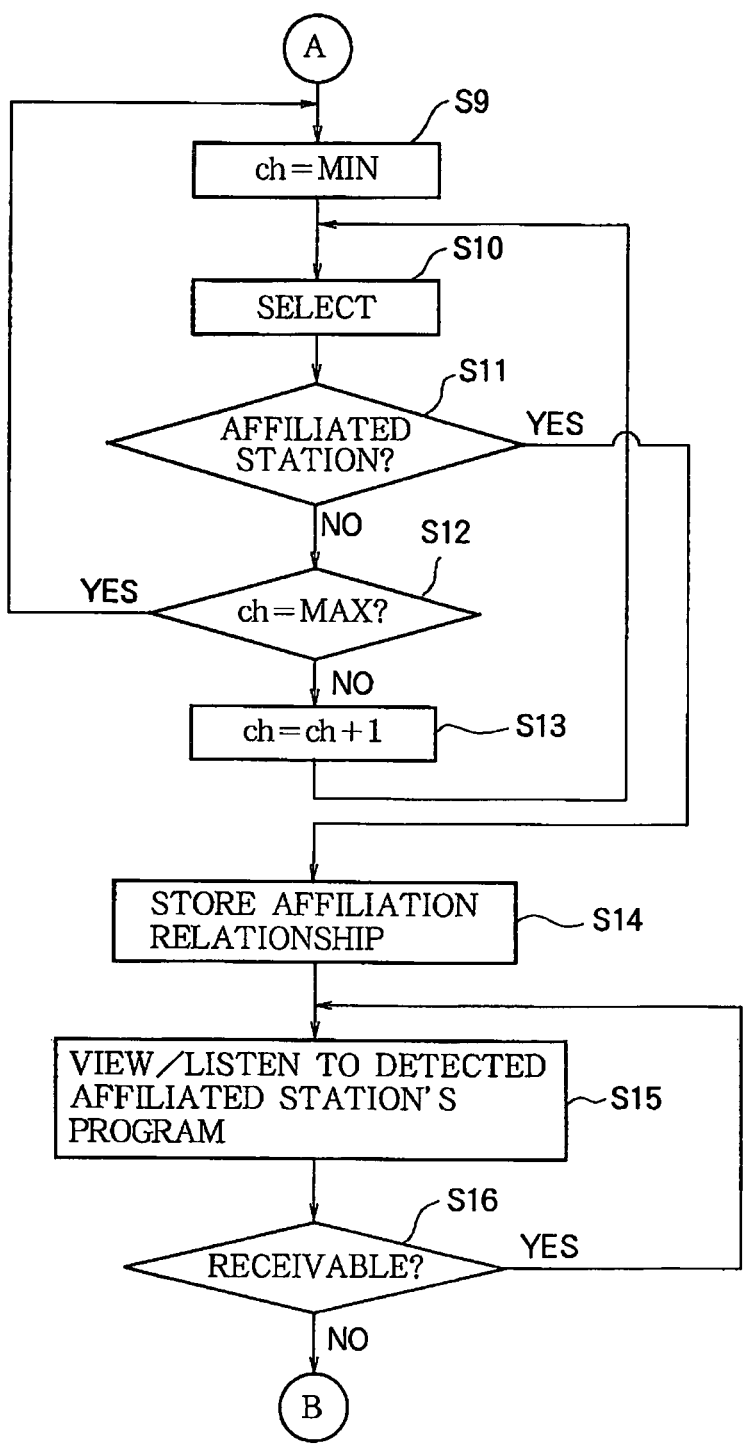
FIG. 4 is a flowchart showing details of step S18 (find and view/listen to affiliated station) in FIG. 3.

FIGS. 3 and 4 form a flowchart illustrating the operation of the tuning control unit 7 in the digital broadcast receiver in FIG. 1.

The operation of the tuning control unit 7 will be described below using FIGS. 2, 3, and 4.

To start with, it will be assumed that the digital broadcast receiver, at the command of the tuning control unit 7, is in a state (for example, the 'viewing/listening to broadcasting station A' state 51 in FIG. 2) in which one broadcasting station (for example, broadcasting station A, one of the two broadcasting stations shown in FIG. 2) is being viewed/listened to (S1).

In this situation, the tuning control unit 7 stores at least the channel information of the station broadcasting the program being viewed/listened to in the affiliated station memory 8 or another storage unit (S2).

In the state in step S1 above, the tuning control unit 7 decides whether or not it has received an 'unreceivability notification' from the unreceivability detector 6, that is, whether or not the present state is the 'currently receivable state'.

If the state is the currently receivable state (Yes in S3, indicating that the 'unreceivability notification' has not been received), a return is made to step S3 to continue viewing/listening to the same station.

If the state is the 'currently unreceivable state' (No in S3, indicating that an 'unreceivability notification' has been received), the tuning control unit 7 decides whether or not the channel information of another broadcasting station with the same affiliation is stored in the affiliated station memory 8 (S4).

If the channel information of another broadcasting station with the same affiliation is stored in the affiliated station memory 8 in step S4 (Yes in S4), the tuning control unit 7 selects the program of the broadcasting station in the same affiliation (S5) and decides whether or not it has received an 'unreceivability notification' from the unreceivability detector 6, that is, whether or not the program of the affiliated broadcasting station is in the 'currently receivable state' (S6).

If the channel information of a plurality of broadcasting stations with the same affiliation is stored in the affiliated station memory 8, from the plurality of channel information, the channel information with the highest priority, listed first in a priority order, is selected in step S5. For example, the area identification codes of the areas adjacent to the area designated by the area identifier value in the service ID obtained from the received signal of the program from the broadcasting station being viewed/listened to are determined, and of the plurality of affiliated stations stored in the affiliated station memory 8, among the broadcasting stations disposed in areas adjacent to the station broadcasting the received signal of the program being viewed/listened to (as specified by the area identification codes that were determined), the nearest one is assigned priority number one and the others are prioritized in their order of proximity.

If the state is the 'currently receivable state' in step S6 (Yes in S6), the tuning control unit 7 permits the program of that station to be viewed/listened to (S7).

This corresponds to, for example, the transition 51A from the 'viewing/listening to broadcasting station A' state 51 to the 'viewing/listening to broadcasting station B' state 53 in FIG. 2.

If the state is the 'currently receivable state' in step S6 (No in S6), the tuning control unit 7 rejects the affiliated station determined to be unreceivable (S17) and determines whether channel information for another broadcasting station with the same affiliation is stored in the affiliated station memory 8 (S4).

If step S4 yields a Yes after step S17, the tuning control unit 7 proceeds to step S5, but this time it selects the highest-priority one of the affiliated stations other than the affiliated station that was rejected in step S17.

If the decision in step S6 yields a No result for all of the plurality of affiliated stations, the next time the decision in step S4 is made the answer is No. If there is only one stored affiliated station the first time the decision in step S4 is made, the first time the decision in step S4 is made after steps S5, S6, and S17, the answer is No.

While the program broadcast by the station selected in step S7 is being viewed/listened to, the decision as to whether that broadcasting station's program is in the 'currently receivable state' continues to be made (repeatedly) (S8).

If it is in the 'currently unreceivable state' (No in S8), a return is made to step S4, and the same process is repeated.

When step S4 yields a No, the process of finding and viewing/listening to an affiliated station (S18) is performed. This process S18 is carried out as shown, for example, in FIG. 4, and corresponds to 'searching for affiliated station' 52 and viewing/listening to the broadcasting station found in the search (either 'viewing/listening to broadcasting station A' 51 or 'viewing/listening to broadcasting station B' 53) in FIG. 2.

The tuning control unit 7 first instructs the tuner-demodulator 1 to select the channel with the minimum channel number among the channels in its band (S9) and inspects the signal from the selected broadcasting station (S10). From the information included in the signal, it determines whether or not the selected broadcasting station is an affiliated station (S11). For example, it may decide whether the value in the affiliation identifier (affiliation_id) field in the broadcaster information table section (BIT: the broadcaster information table specifies the broadcaster group and the broadcaster-group SI transmission parameters etc.) in the service information (SI) in the TS detected by the demultiplexer 2 is the same for the program being viewed/listened to and the program on the channel of the selected broadcasting station.

If the inspected broadcasting station is not a broadcasting station with the same affiliation (No in S11), whether the selected channel is the channel with the maximum channel number among the channels in the band is determined (S12).

If the selected channel is not the channel with the maximum channel number, (No in S12), the selected channel number is incremented by one (S13) and a return is made to step S10.

If the selected channel is the channel with the highest channel number in step S12 (Yes in S12), a return is made to step S9, and the process from step S9 onward is repeated.

If an affiliated station is detected in step S11 (Yes in S11), the tuning control unit 7 stores the channel information of the detected affiliated station and the channel information of the station broadcasting the program being viewed/listened to, which was stored in step S2, in the affiliated station memory 8, associating them as broadcasting stations with the same affiliation (S14), and permits the program of the detected affiliated station to be viewed/listened to (S15).

This process corresponds to, for example, the transition 52A from the 'searching for affiliated station' state 52 to the 'viewing/listening to broadcasting station B' state 53 in FIG. 2.

In step S15, while the program broadcast by the station found in step S11 is being viewed/listened to, the decision as to whether or not the program broadcast by that station is in the 'currently receivable state' is made repeatedly (S16).

If it is in the 'currently unreceivable state' (No in S16), a return is made to step S4, and the same process is repeated.

When the a program of a broadcasting station became unreceivable while being viewed/listened to, conventional digital broadcast receivers searched for affiliated broadcasting stations through the entire channel band. In the same circumstance in this embodiment, the past reception records (channel information) in the affiliated station memory 8 are referenced to select a broadcasting station with the same affiliation directly, so that when a program of a broadcasting station which was receivable in step S6 or step S16, for example, becomes unviewable/unlistenable, if a program of an affiliated broadcasting station (including the broadcasting station that was viewed/listened to in step S1) is viewable/listenable, the time needed to display the picture of the same program can be shortened, in comparison with the case in which a search of the entire channel band is made again.

In other words, when viewing/listening became impossible in the 'viewing/listening to broadcasting station A' state 51 in FIG. 2, for example, a transition to the 'searching for affiliated station' state 52 was conventionally made in all cases, followed by a transition to the 'viewing/listening to broadcasting station B' state 53. In this embodiment, if there is a past reception record (channel information) of an affiliated station in the affiliated station memory 8, then a direct transition can be made from the 'viewing/listening to broadcasting station A' state 51 to the 'viewing/listening to broadcasting station B' state 53. Therefore, the time needed to display the picture of the same program can be shortened.

If the affiliated station memory 8 stores a plurality of affiliated stations, the stored affiliated stations must be assigned priorities; in that case, priorities are assigned in order of proximity to the broadcasting station currently being received, as described above.

The information required to assign priorities includes the identification information of the broadcasting station of the program currently being viewed/listened to with the digital broadcast receiver, assignment information of service areas allotted to each of the digital broadcasting stations (including adjacency information), and the identification information of the individual areas. FIG. 5 shows the bit structure of the service ID in terrestrial digital broadcasting; FIG. 6 shows classifications in the area identifier field of the service ID in terrestrial digital broadcasting; FIG. 7 indicates the area assignments of the area identifier field in Japanese terrestrial digital broadcasts.

First, the identification information of the station broadcasting the program currently being viewed/listened to is inferred, to tell which broadcasting stations serve areas including the current location of the digital broadcast receiver. In the bit arrangement of the service ID in FIG. 5, bits 15 to 10 of the 16-bit structure form the area identification code field, and the value of the area identification code is a unique value assigned to each broadcasting station in the whole country. By extracting the service ID from the signal received from the currently selected broadcasting station and further extracting the six-bit value from the area identification code field, one of the 64 area identifier values is obtained.

Next the extracted area identifier value is interpreted by using FIG. 6, for example, which shows that '0' to '9' indicate a wide-area broadcast and that '10' to '63' indicate a prefectural (prefectural station) broadcast. More specifically, by using FIG. 7, for example, the area to which each area identification code is assigned can be found.

In this embodiment, from the area identification code of the broadcasting station of the program currently being viewed/listened to on the digital broadcast receiver, by using FIGS. 5 to 7 the current location of the digital broadcast receiver is inferred to be within the service area of the broadcasting station of the program currently being viewed/listened to; next the area identification codes of service areas adjacent to the broadcasting station service area including the current location are detected from the area assignments shown in FIG. 7, for example. Then, from the service IDs of the plurality of affiliated stations stored in the affiliated station memory 8, a broadcasting station having a service ID including an area identification code representing an adjacent service area is found. If a plurality of broadcasting stations are found, they are selected in the order in which they were found, for example, to determine whether they are in the 'currently receivable state,' and an affiliated station in the 'currently receivable state' is viewed/listened to.

In this embodiment, the channel information of the program of the broadcasting station of the program being viewed/listened to is recorded, and if a program of an affiliated station is found by a channel search performed when the program becomes unviewable/unlistenable (unreceivable), the channel information of the program of the affiliated station is recorded as related by affiliation with the channel information of the program of the broadcasting station being viewed/listened to. Afterward, when the program of the broadcasting station of the program being viewed/listened to becomes unviewable/unlistenable again, the recorded affiliated station is selected by the channel information, or conversely, when a program of the affiliated station becomes unviewable/unlistenable, the originally recorded broadcasting station can also be selected by the channel information.

Accordingly, if the 'currently unreceivable state' occurs during the reception of a broadcasting station which has already been selected and has a recorded affiliation relationship, or during the reception of an affiliated station, the time needed for performing a channel search for an affiliated station across the entire receivable frequency band can be eliminated by automatically referencing the records, which can shorten the time during which program viewing/listening is interrupted and can improve the continuity of viewing/listening.

In particular, if a vehicle such as an automobile is traveling near the boundary between the service areas of affiliated broadcasting stations, by quickly and automatically switching over to an affiliated station it is possible to avoid the conventional frequent channel searches for an affiliated station, so that the time during which program viewing/listening is interrupted can be markedly shortened and the continuity of program viewing/listening can be markedly improved.

When the motion of a vehicle such as an automobile brings about the 'currently unreceivable state' of the program being viewed/listened to, the digital broadcast receiver of this embodiment can select an affiliated station automatically, without any operation by the user.

Depending on the detection method in the unreceivability detector 6, another affiliated station can be selected automatically just before reception becomes impossible, or at other such times.

Moreover, in the digital broadcast receiver of this embodiment, since the tuning control unit 7 performs a channel search for an affiliated broadcasting station by using the value in the affiliation identifier (affiliation_id) field in the broadcaster information table (BIT) section of the service information (SI) in the TS detected by the demultiplexer 2, for example, an affiliated station that is likely to be broadcasting the same program as the program that has become unreceivable and unviewable/unlistenable can be selected; the continuity of viewing/listening to the same program can thereby be improved.

In the digital broadcast receiver of this embodiment, if a plurality of affiliated stations are recorded in the affiliated station memory 8, in a search for the affiliated station, the service area is found by extracting the area identification code of the broadcasting station of the program currently being viewed/listened to from the service ID of the program currently being viewed/listened to. Then only affiliated stations having service IDs of service areas adjacent to that service area are selected. By this process, the digital broadcast receiver of this embodiment can save the time that would have been spent needlessly searching for affiliated stations in service areas not adjacent to the service area of the broadcasting station of the program currently being viewed/listened to and determining whether they were in the 'currently receivable state,' shortening the time for finding an affiliated station in the 'currently receivable state'.

Second Embodiment

Although the digital broadcast receiver in the first embodiment above shortens the time during which program viewing/listening is interrupted when unreceivable and can improve the continuity of viewing/listening, there is a problem in that a move into an environment, such as a tunnel, that is out of signal reach, or an environment with poor signal reception, causes the tuning control unit 7 to decide that the receiving level has dropped and switch over to an affiliated station stored in the affiliated station memory 8 or perform a channel search for an affiliated station.

When a move is made into an environment such as a tunnel that is out of signal reach, a switchover to an affiliated station stored in the affiliated station memory 8 or a channel search for an affiliated station is performed even though no broadcasting stations can be received. If another move is made during the channel search for an affiliated station, from the tunnel into an environment in which the signal of the broadcasting station of the program that was being viewed/listened to up until the move into the tunnel can be received satisfactorily, finding the broadcasting station of the program that was being viewed/listened to up until the move into the tunnel takes time, because it is necessary to perform a channel search for an affiliated station.

If the state before the move into the tunnel had been maintained without performing a channel search, the signal of the original broadcasting station could be received and viewing/listening could be resumed immediately on exit from the tunnel, but in actual practice, viewing/listening cannot be resumed until the original broadcasting station is found by a channel search, which is a needless waste of time. The second embodiment avoids that pointless operation.

FIG. 8 is a block diagram showing the schematic internal structure of a digital broadcast receiver according to the second embodiment of this invention.

The structure of the digital broadcast receiver in FIG. 8 is basically the same as the structure in the first embodiment shown in FIG. 1, but differs in that a positioning unit 9 has been added.

The positioning unit 9 is a global positioning system (GPS) receiver, for example, which receives signals from a plurality of GPS satellites, received by a GPS antenna, and detects the current location of the digital broadcast receiver in accordance with the input signals, and can output the detected current location to the tuning control unit 7 or can have the current location indicated on map data.

Besides detecting the current location, the positioning unit 9 in this embodiment can also notify the tuning control unit 7 that the current location of the digital broadcast receiver is in an unreceivable area, by issuing an 'unreceivable location' notification, when it determines that the current location is in a tunnel where no broadcasting stations can be received or in an area affected by a structure that will affect (lower) the receiving level.

When the 'unreceivable location' notification is not received from the positioning unit 9, the tuning control unit 7 in this embodiment performs the same operations as in the first embodiment, illustrated in FIGS. 3 and 4.

When the 'unreceivable location' notification is received from the positioning unit 9, however, even if there is a 'currently unreceivable state' notification from the unreceivability detector 6, the tuning control unit 7 operates so as not to perform the automatic selection of an affiliated station in the operations in FIGS. 3 and 4. When in an unreceivable location, that is, even if an affiliated station has not been found, the tuning control unit 7 does not let the tuner-demodulator 1 perform a channel search for an affiliated station, and if an affiliated station has already been found, it does not perform the operations of retrieving the affiliated station from the affiliated station memory 8 and selecting the station.

The digital broadcast receiver in this embodiment is adapted to ascertain its present location by receiving signals from GPS satellites, so when it moves into an environment such as a tunnel that is out of signal reach, even though no broadcasting stations can be received, it can prevent the pointless operation of searching for an affiliated station or switching over to an affiliated station that has already been found. More specifically, when moved into an environment such as a tunnel that is out of signal reach, or an environment with poor signal reception, even if an affiliated station has not been found it does not carry out a channel search for an affiliated station, and even if an affiliated station has already been found it does not carry out the operations of retrieving and reselecting the affiliated station, so it maintains the selected state of the program that was being viewed/listened to, and when it moves into an environment in which signal reception is better, it can quickly resume viewing/listening to the program that was being viewed/listened to before the signal reception environment worsened.

Third Embodiment

When an unreceivability notification is input, conventional digital broadcast receivers perform a channel search for an affiliated station and select a program having the same program title as the program title of the program which has become unreceivable, a program belonging to the same genre as the genre of the program which has become unreceivable, or a program having the same program identification number as the program identification number of the program which has become unreceivable.

Because the program title, program genre, or program identification number alone provides insufficient information for identifying a program as being identical to the one that was being viewed/listened to up until input of the unreceivability notification, in some cases it is not possible to select the same program as the one that was being viewed/listened to up until input of the unreceivability notification.

Terrestrial digital broadcasting may include programs having features or information intended for particular localities, so affiliated stations do not necessarily broadcast the same news and weather programs and other such programs at the same time. For example, each broadcasting station may broadcast news specifically for its own service area. Therefore, in a conventional digital broadcast receiver, a program which has the same name, such as 'Midday News', and belongs to the same program genre, such as 'news program', may differ from the program that was being viewed/listened to before the search for an affiliated station was performed.

The program identification number corresponds to the event_id in *Operational Guidelines for Digital Terrestrial Television Broadcasting*, published as document TR-B14 by the Association of Radio Industries and Businesses (ARTB). Unique identification numbers are assigned within a single service area, so different programs broadcast by different stations may be given the same event_id. That is, even selecting an affiliated station with the same program identification number does not necessarily guarantee selection of the same program.

Whether the program of the broadcasting station that was being viewed/listened to is the same as the program of an affiliated station selected after the unreceivability notification is conventionally determined by, for example, interpreting the program name (title) included in the PSI of the program. In the first embodiment described above, the value in the affiliation identifier (affiliation_id) field in the broadcaster information table (BIT) section is interpreted to determine whether the broadcasting station is affiliated, and consequently whether the program is the same. The third embodiment allows the program to be identified more accurately.

Figure 9:
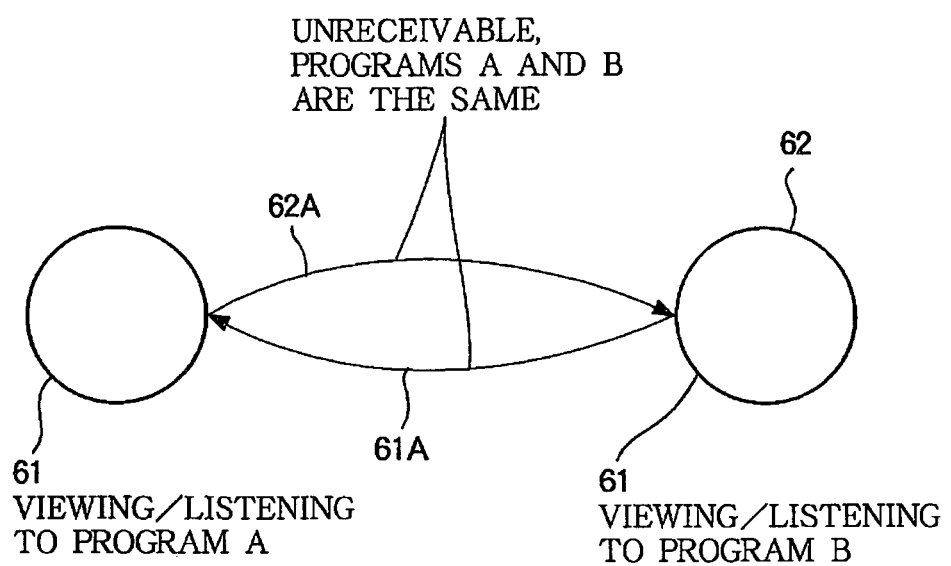
FIG. 9 is a state transition diagram of the station selection operation of the tuning control unit 7 in a digital broadcast receiver in a third embodiment of this invention.

FIG. 9 is a state transition diagram of the station selection operation of the tuning control unit 7 in the digital broadcast receiver in the third embodiment of this invention.

The digital broadcast receiver of the third embodiment differs in that the tuning control unit 7 in the structure of the second embodiment in FIG. 2 operates according to the state transition operation shown in FIG. 9 instead of the state transition operation shown in FIG. 2.

In FIG. 9, the 'viewing/listening to program A' state 61 and the 'viewing/listening to program B' state 62 indicate states in which simultaneous broadcasts of the same program by different affiliated broadcasting stations (channels) are being viewed/listened to. If the unreceivability detector 6 detects the 'currently unreceivable state' in the 'viewing/listening to program A' state 61 in FIG. 9, as in the first embodiment, an unreceivability notification is input to the tuning control unit 7.

The tuning control unit 7 detects information (program name, date and time of broadcasting, description of contents, and other information related to the program) in the event information table (EIT) section beforehand from the SI of the program being viewed/listened to, and checks the SI of the detected affiliated stations to decide whether any of the affiliated stations has the same values in these fields as in the EIT of the program that was being viewed/listened to. If so, the corresponding channel is selected to view/listen to the same program. A transition (61A) is thereby made to the 'viewing/listening to program B' state 62.

A transition (62A) from the 'viewing/listening to program B' state 62 to the 'viewing/listening to program A' state 61 is made by similar processing and a similar decision.

The conditions for the transitions 61A, 62A between state 61 and state 62 are accordingly that the program being viewed/listened to in the present state (61 or 62) is currently unreceivable and that programs A and B are the same program, meaning that the two programs have the same detailed program information and are broadcast at the same time.

To tell that the programs are the same by using the PSI/SI, the values in the event_name_char (program name) field and the values in the text_char (program description) field in the short-form event descriptor in the EIT section, for example, are compared. In the comparison of the values in the program name field, the program names are compared to tell whether the programs are the same, and the program descriptions (outline of the program, cast, etc.) in the PSI/SI are compared to determine more accurately whether the programs are the same.

If a positioning unit 9 is included as shown in FIG. 8 in the second embodiment and if the positioning unit 9 detects that the present location is in an unreceivable area, the tuning control unit 7 operates so as not to make the state transitions between the 'viewing/listening to program A' state 61 and 'viewing/listening to program B' state 62 of the same program (automatic selection) in the state transition diagram shown in FIG. 9.

In the third embodiment, when a program being viewed/listened to becomes unreceivable or is judged to be about to become unreceivable, the program description (outline of the program, cast, etc.) in the PSI/SI of each broadcasting station detected beforehand is used to select a program (the same program) having the same PSI/SI as the program which has become unviewable/unlistenable, so the accuracy of detection of the same program can be improved over detection of the same program by use of the program title, program genre, and program identification.

For example, many news, weather, and other such programs are apt to have titles similar to titles used by broadcasting stations outside the affiliation and to be broadcast every day under the same title, making it impossible to identify the programs just by their titles. In the third embodiment, those programs can be identified more accurately because the characters and the outline description included in the PSI/SI are used, so the accuracy of affiliated station detection can be improved.

Fourth Embodiment

Figure 10:
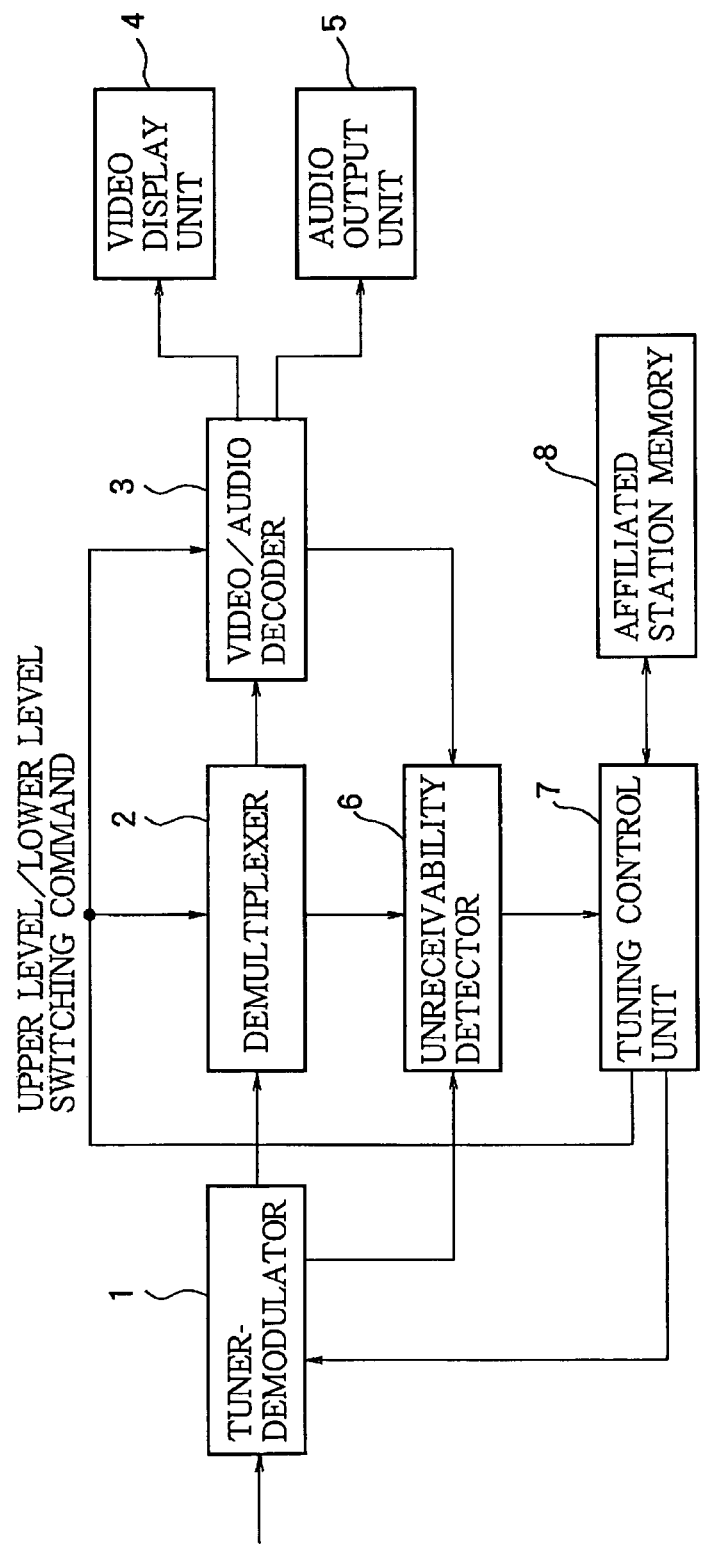
FIG. 10 is a block diagram showing the schematic internal structure of a digital broadcast receiver according to a fourth embodiment of this invention.

FIG. 10 is a block diagram showing the schematic internal structure of a digital broadcast receiver according to a fourth embodiment of the present invention.

The basic structure of the digital broadcast receiver in FIG. 10 is the same as the structure in the first embodiment shown in FIG. 1, except that in the fourth embodiment the digital broadcast receiver receives both a program signal transmitted on a lower level, intended for fixed receivers and having high image and sound quality but being susceptible to noise and multipath interference, and a program signal transmitted on an upper level, intended for digital broadcast receivers mounted on vehicles or carried by the user, this signal being resistant to noise and multipath, and that an upper level/lower level switching command for switching the signal by which the program is received is supplied from the tuning control unit 7 to the demultiplexer 2 and video/audio decoder 3.

Although the program signal received on the upper level is resistant to noise and multipath, the bit rate is low, and contents are transmitted in the form of a simple moving picture and simple sound. The program signal received on the lower level is originally provided for fixed receivers, has a high bit rater and transmits a high-quality moving picture and high-quality sound. Different video/audio compression methods are used for transmission on the upper and lower levels.

For example, in One-Seg broadcasting, which corresponds to broadcasting on the upper level, the H.264/AVC (MPEG-4 Part 10: Advanced Video Coding) coding method devised by MPEG (Moving Picture Experts Group) is used as the video compression method, and AAC (Advanced Audio Coding)+ SBR (Spectral Band Replication) is used as the audio compression method.

In broadcasting on the lower level for fixed receivers, the MPEG2 coding method is used as the video compression method, and AAC is used as the audio compression method.

The video/audio decoder 3 in FIG. 10 is configured to allow decoding conforming to the video compression method and audio compression method used in transmission on the upper level or lower level as described above.

Multiplexed data including lower-level data and upper-level data transmitted in the same channel are output from the tuner-demodulator 1 to the demultiplexer 2.

The tuner-demodulator 1 does not perform station selection for switching between the program transmitted on the upper level and the program transmitted on the lower level in the same channel, but the service viewed/listened to must be switched between the program transmitted on the upper level and the program transmitted on the lower level as specified by the user, so the tuning control unit 7 provides an upper level transmission/lower level transmission program switching command to the demultiplexer 2. The demultiplexer 2 then outputs the video stream and/or audio stream included in the transmission level specified by the user to the video/audio decoder 3.

The video/audio decoder 3 decodes the data of the corresponding video stream/audio stream in the input video streams/audio streams in accordance with the upper level transmission/lower level transmission program switching command from the tuning control unit 7, outputs decoded video signal data to the video display unit 4, outputs decoded audio signal data to the audio output unit 5, has the video display unit 4 display the picture, and has the audio output unit 5 output the sound.

The unreceivability detector 6 is notified of the receiving level, receiving C/N ratio information, PLL lock information, frame lock information, error rate information, and so on from the tuner-demodulator 1.

From the demultiplexer 2, the unreceivability detector 6 is given a PAT interruption notification and a PMT interruption notification when the PAT and PMT fail to arrive at their prescribed time intervals. When synchronization bytes are not detected in the TS at intervals of 188 bytes, a loss of synchronization notification is issued. When a discontinuity is detected in continuity counter values included in the TS packet headers, a packet loss notification is issued.

The unreceivability detector 6 receives an error notification from the video/audio decoder 3 when a decoding error is detected, or is notified that the error rate has fallen below a prescribed value.

From the information it receives, the unreceivability detector 6 detects whether the program is in the 'currently unreceivable state' and issues an unreceivability notification to the tuning control unit 7 if the 'currently unreceivable state' is detected. The tuning control unit 7 outputs a station selection command to the tuner-demodulator 1 and an upper level transmission/lower level transmission program switching command to the demultiplexer 2 and video/audio decoder 3 to perform the state transition operation shown in FIG. 11.

Figure 11:
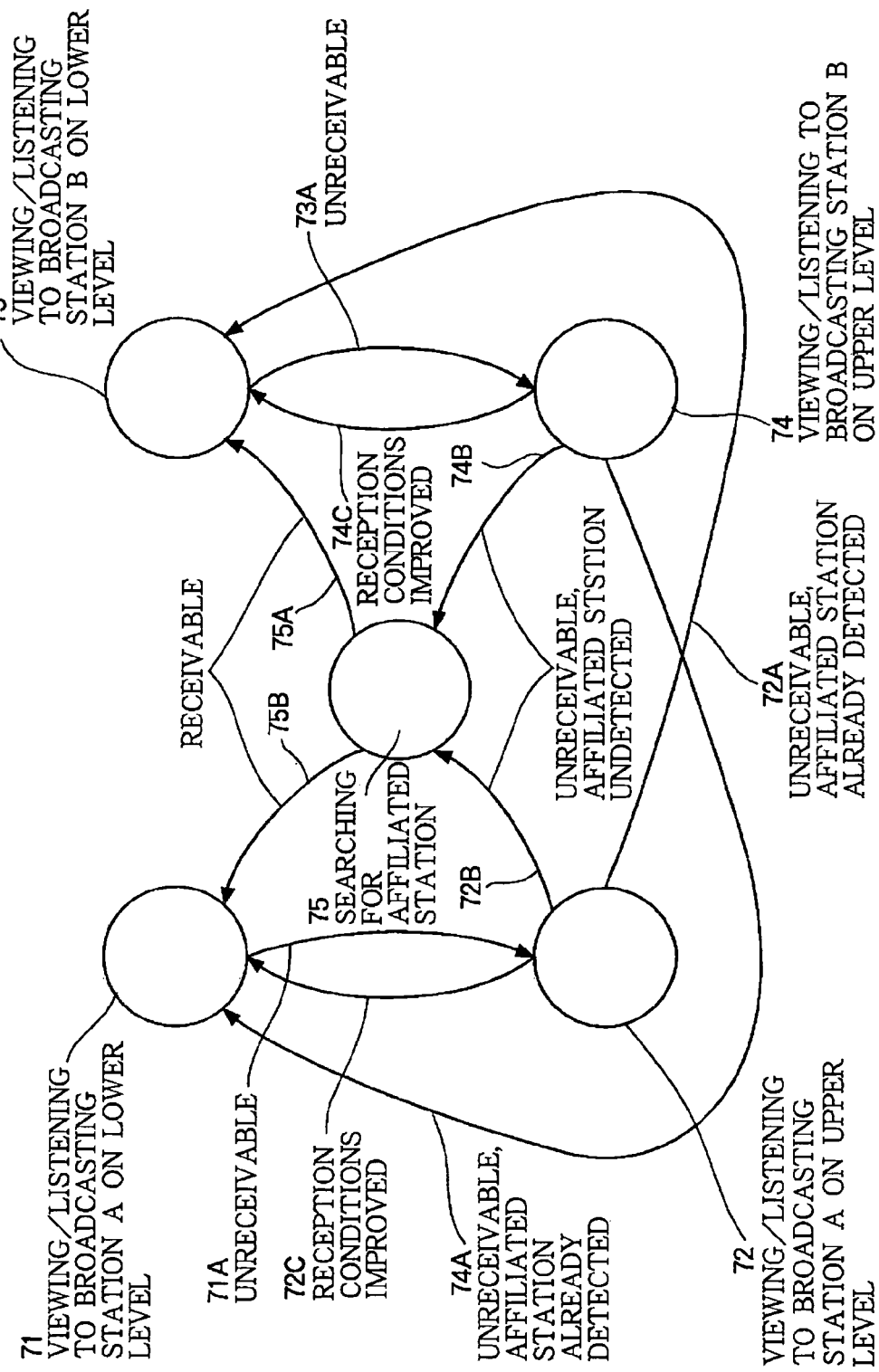
FIG. 11 is a state transition diagram of the station selection operation of the tuning control unit 7 in the fourth embodiment of this invention.

FIG. 11 is a state transition diagram of the station selection operation of the tuning control unit 7 in the fourth embodiment of this invention.

In FIG. 11, the 'viewing/listening to broadcasting station A on lower level' state 71 is a state in which the program transmitted by broadcasting station A on the lower level is being viewed/listened to, and the 'viewing/listening to broadcasting station A on upper level' state 72 is a state in which the program transmitted by broadcasting station A on the upper level is being viewed/listened to. The 'viewing/listening to broadcasting station B on lower level' state 73 is a state in which the program transmitted by broadcasting station B on the lower level is being viewed/listened to, and the 'viewing/listening to broadcasting station B on upper level' state 74 is a state in which the program transmitted by broadcasting station B on the upper level is being viewed/listened to.

Broadcasting station A and broadcasting station B are mutually affiliated, and the programs viewable/listenable on each broadcasting station are always the same programs, broadcast at the same time.

The 'searching for affiliated station' state 75 indicates that a channel search for an affiliated station of broadcasting station A or B is being performed in ascending order of physical frequency, for example.

The condition for a transition 71A from the 'viewing/listening to broadcasting station A on lower level' state 71 to the 'viewing/listening to broadcasting station A on upper level' state 72 is that the program transmitted on the lower level by broadcasting station A is in the 'currently unreceivable state.'

The conditions for a transition 72A from the 'viewing/listening to broadcasting station A on upper level' state 72 to the 'viewing/listening to broadcasting station B on lower level' state 73 are that the program transmitted on the upper level by broadcasting station A is in the 'currently unreceivable state' and that broadcasting station B has been found as an affiliated station.

The conditions for a transition 72B from the 'viewing/listening to broadcasting station A on upper level' state 72 to the 'searching for affiliated station' state 75 are that the program transmitted on the upper level by broadcasting station A is in the 'currently unreceivable state' and that no affiliated stations have been found.

The condition for a transition 72C from the 'viewing/listening to broadcasting station A on upper level' state 72 to the 'viewing/listening to broadcasting station A on lower level' state 71 is that the reception conditions have improved to bring the program transmitted on the lower level by broadcasting station A into the 'currently receivable state.'

The condition for a transition 73A from the 'viewing/listening to broadcasting station B on lower level' state 73 to the 'viewing/listening to broadcasting station B on upper level' state 74 is that the program transmitted on the lower level by broadcasting station B is in the 'currently unreceivable state.'

The conditions for a transition 74A from the 'viewing/listening to broadcasting station B on upper level' state 74 to the 'viewing/listening to broadcasting station A on lower level' state 71 are that the program transmitted on the upper level by broadcasting station B is in the 'currently unreceivable state' and that broadcasting station A has been found as an affiliated station.

The conditions for a transition 74B from the 'viewing/listening to broadcasting station B on upper level' state 74 to the 'searching for affiliated station' state 75 are that the program transmitted on the upper level by broadcasting station B is in the 'currently unreceivable state' and that no affiliated stations have been found.

The condition for a transition 74C from the 'viewing/listening to broadcasting station B on upper level' state 74 to the 'viewing/listening to broadcasting station B on lower level' state 73 is that the reception conditions have improved to bring the program transmitted on the lower level by broadcasting station B into the 'currently receivable state.'

The conditions for a transition 75A from the 'searching for affiliated station' state 75 to the 'viewing/listening to broadcasting station B on lower level' state 73 are that broadcasting station B has been found as an affiliated station by a search for an affiliated station and that the state is the 'currently receivable state.'

The conditions for a transition 75B from the 'searching for affiliated station' state 75 to the 'viewing/listening to broadcasting station A on lower level' state 71 are that broadcasting station A has been found as an affiliated station by a search for an affiliated station and that the state is the 'currently receivable state.'

Figure 12:
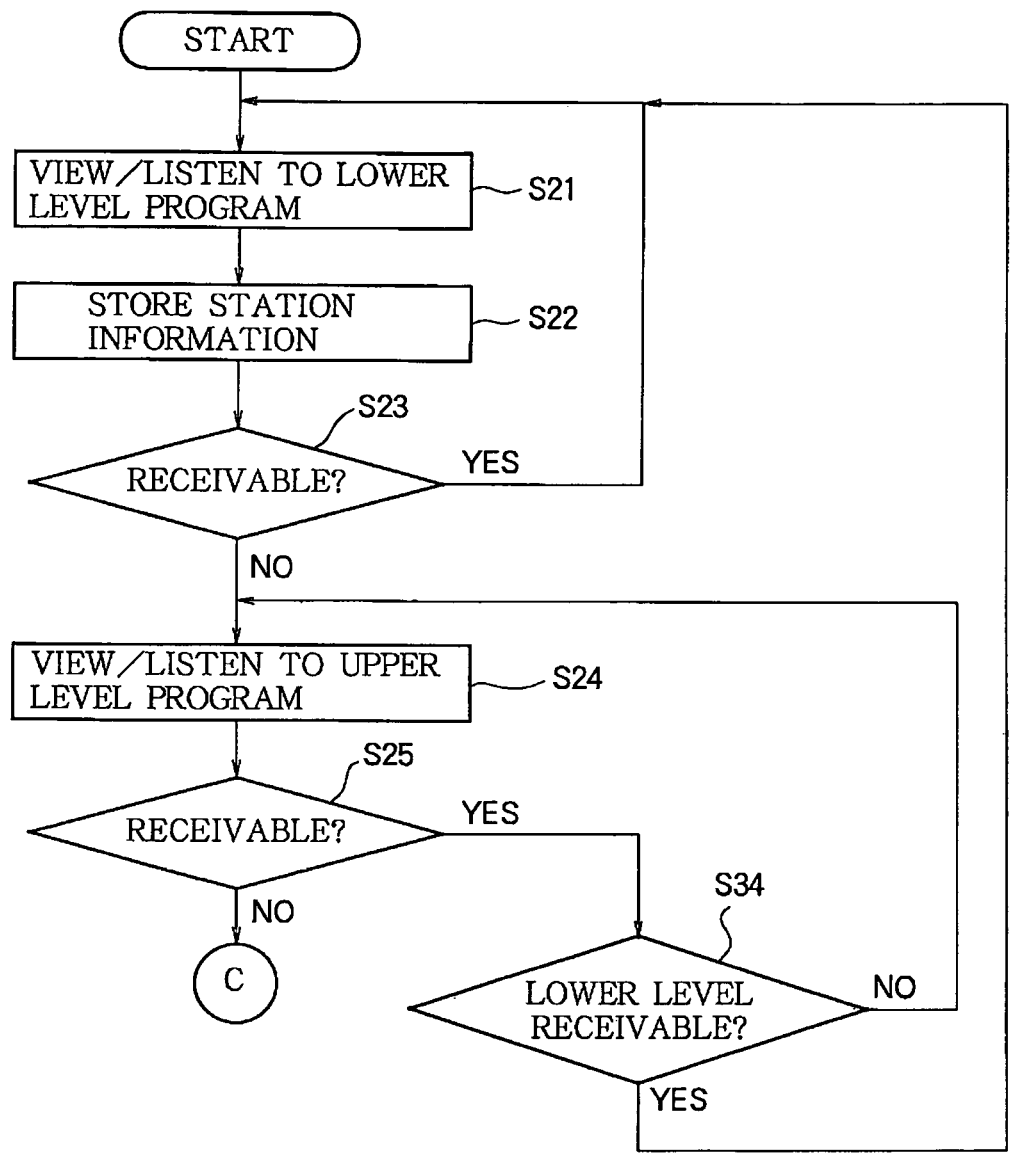
FIG. 12 is a flowchart of the operation of the tuning control unit 7 in the fourth embodiment of this invention.
Figure 13:
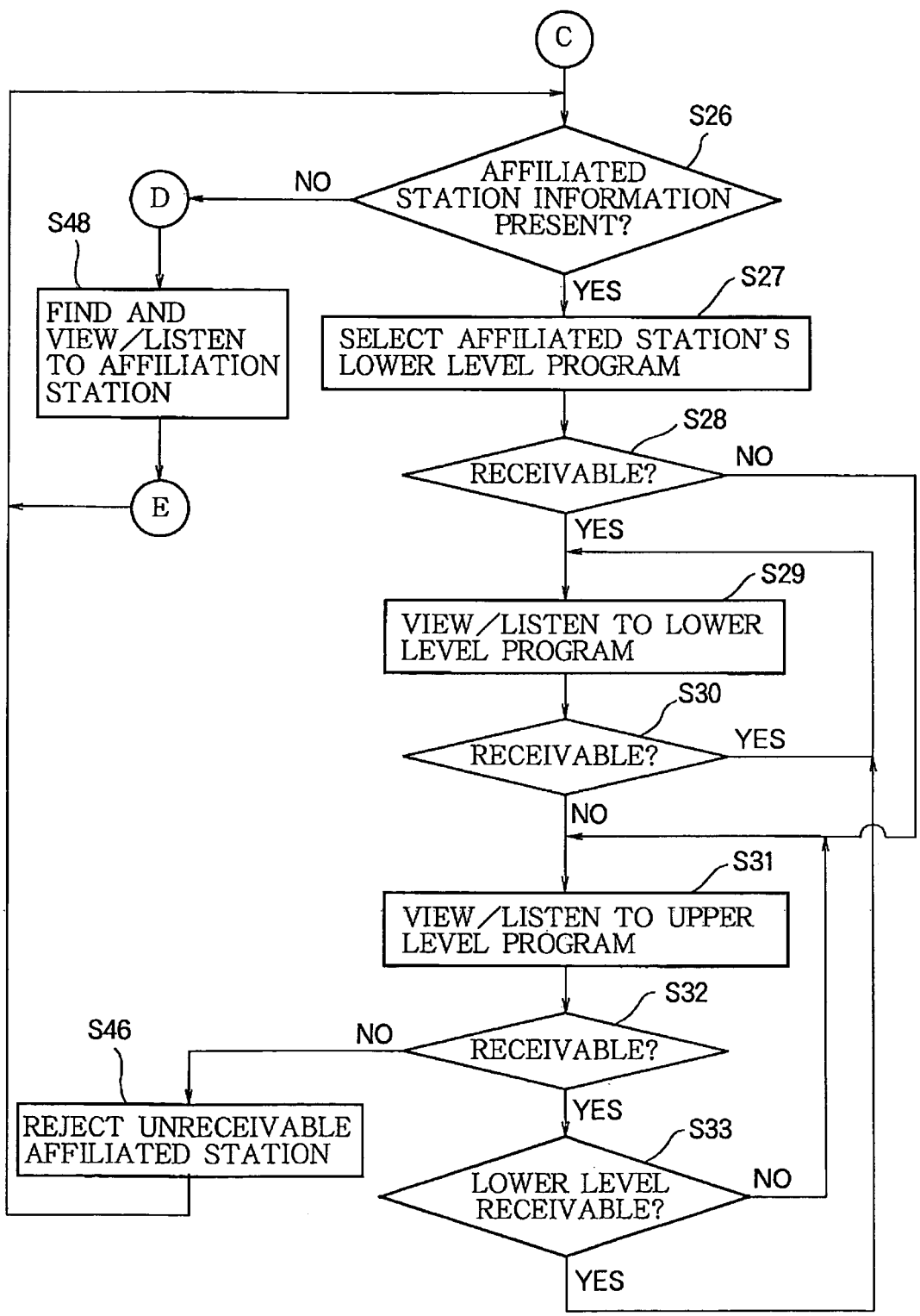
FIG. 13 is a flowchart of the operation of the tuning control unit 7 in the fourth embodiment of this invention.
Figure 14:
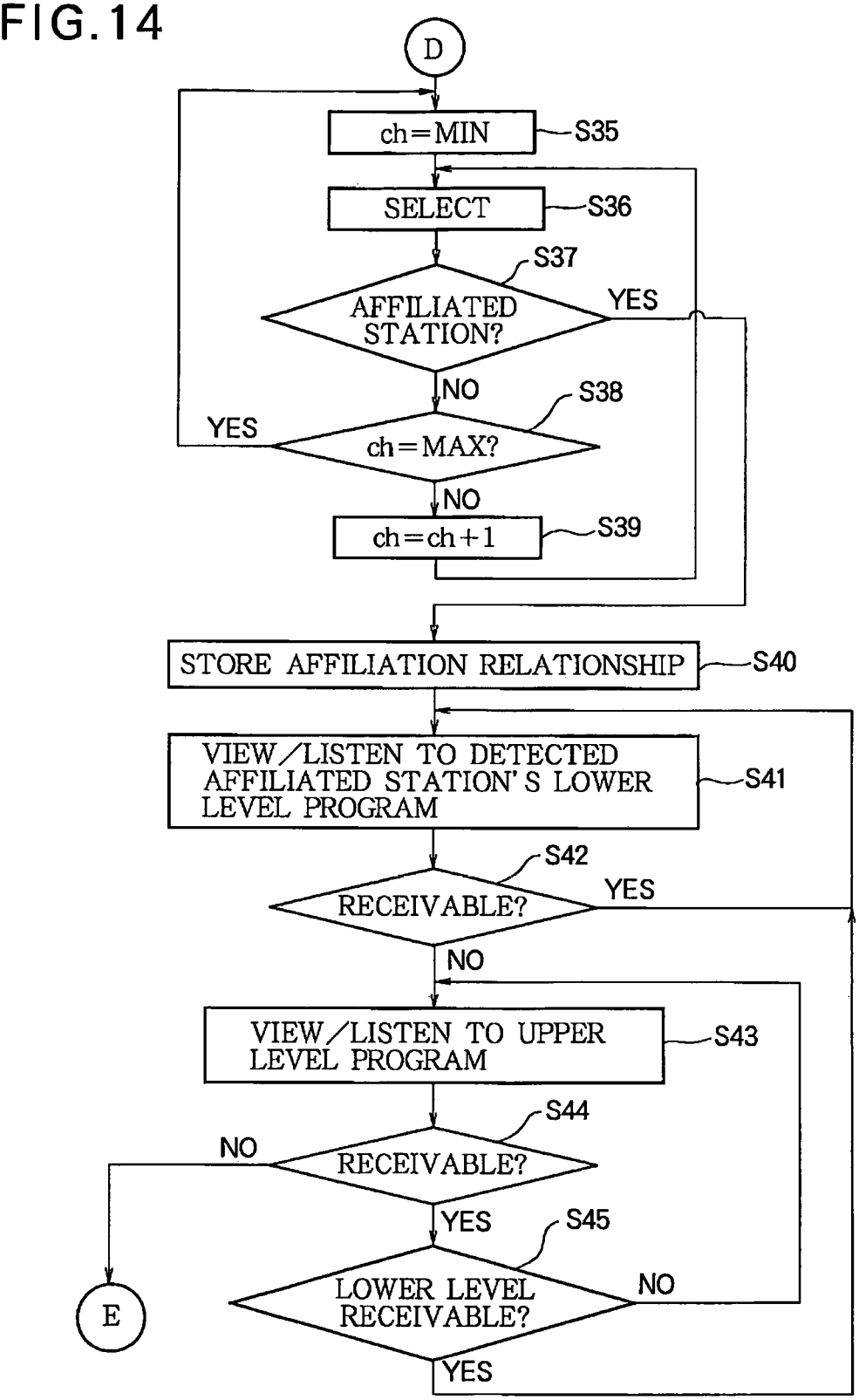
FIG. 14 is a flowchart showing details of step S48 (find and view/listen to affiliated station) in FIG. 13.

FIGS. 12, 13, and 14 form a flowchart illustrating the operation of the tuning control unit 7 in the fourth embodiment of the present invention.

The operation of the tuning control unit 7 will be described below using FIGS. 12, 13, and 14.

To start with, it will be assumed that the digital broadcast receiver is in a state (for example, the 'viewing/listening to broadcasting station A on lower level' state 71 in FIG. 11) in which a program transmitted on the lower level by one broadcasting station (for example, broadcasting station A, one of the two broadcasting stations shown in FIG. 11) is being viewed/listened to at the command of the tuning control unit 7 (S21).

In this situation, the tuning control unit 7 stores at least the channel information of the station broadcasting the program being viewed/listened to in the affiliated station memory 8 or another storage unit (S22).

In the state in step S21 above, the tuning control unit 7 decides whether or not it has received an 'unreceivability notification' from the unreceivability detector 6, that is, whether or not the state is the 'currently receivable state' (S23). If the state is the 'currently receivable state' (Yes in S23, indicating that the 'unreceivability notification' has not been received), a return is made to step S21 to continue viewing/listening to the program transmitted by the same station on the lower level.

If the state is the currently unreceivable state (No in S23, indicating that an 'unreceivability notification' has been received), viewing/listening to the program transmitted by the same station on the upper level is permitted (S24). This corresponds, for example, to a transition 71A from the 'viewing/listening to broadcasting station A on lower level' state 71 to the 'viewing/listening to broadcasting station A on upper level' state 72.

During the viewing/listening on the upper level, the tuning control unit 7 decides whether or not it has received an 'unreceivability notification' from the unreceivability detector 6, that is, whether or not the state is the 'currently receivable state' (S25).

If the program transmitted on the upper level is in the 'currently receivable state' (Yes in S25), the tuning control unit 7 proceeds to step S34 and decides whether or not the program transmitted by the same station on the lower level can be received, that is, whether or not the state is the 'currently receivable state' (S34). If the program transmitted by the same station on the lower level can be received (Yes in S34), a return is made to step S21, and viewing/listening to the program transmitted by the same station on the lower level is permitted.

In step S34, if the program transmitted on the lower level cannot be received (No in S34), a return is made to step S24 to continue viewing/listening to the program transmitted on the upper level.

In step S25, if the program transmitted on the upper level is in the 'currently unreceivable state' (No in S25), the tuning control unit 7 checks whether or not the affiliated station memory 8 stores the channel information of another broadcasting station with the same affiliation (S26 in FIG. 13).

If the channel information of another broadcasting station with the same affiliation is stored in the affiliated station memory 8 in step S25 (Yes in S26) the tuning control unit 7 selects the broadcasting station in the same affiliation (S27) and decides whether or not the program transmitted by the broadcasting station on the lower level is in the 'receivable state,' that is, whether or not an 'unreceivability notification' of the program has been received from the unreceivability detector 6 (S28).

If the channel information of a plurality of broadcasting stations with the same affiliation is stored in the affiliated station memory 8, from the plurality of channel information, the channel information with the highest priority, listed first in a priority order, is selected in step S27. For example, the area identification codes of the areas adjacent to the area designated by the area identifier value in the service ID obtained from the received signal of the program from the broadcasting station being viewed/listened to are determined, and of the plurality of affiliated stations stored in the affiliated station memory 8, among the broadcasting stations disposed in areas adjacent to the station broadcasting the received signal of the program being viewed/listened to (as specified by the area identification codes that were determined), the nearest one is assigned priority number one and the others are prioritized in their order of proximity.

If the state is the 'currently receivable state' in step S28 (Yes in S28), viewing/listening to the program transmitted by the affiliated station on the lower level is permitted (S29).

This corresponds to, for example, the transition 72A from the 'viewing/listening to broadcasting station A on upper level' state 72 to the 'viewing/listening to broadcasting station B on lower level' state 73 in FIG. 11.

While the program transmitted by the broadcasting station on the lower level is being viewed/listened to, the tuning control unit 7 continues (repeatedly) to determine whether or not an unreceivability notification is received from the unreceivability detector 6 (S30).

In step S30, if the program transmitted on the lower level by the broadcasting being viewed/listened to becomes unreceivable (No in S30), viewing/listening to the program transmitted on the upper level by the same station is permitted (S31).

This corresponds to, for example, the transition 73A from the 'viewing/listening to broadcasting station B on lower level' state 73 to the 'viewing/listening to broadcasting station B on upper level' state 74.

If the state is the 'currently unreceivable state' in step S28 (No in S28), the tuning control unit 7 likewise proceeds to step S31 and permits the program transmitted by the same station on the upper level to be viewed/listened to.

While the program transmitted by the broadcasting station on the upper level is being viewed/listened to, the tuning control unit 7 determines whether or not an unreceivability notification is received from the unreceivability detector 6, that is, whether or not the state is the 'currently receivable state' (S32).

If the state is the 'currently receivable state' (Yes in S32), it is decided whether or not the program transmitted on the lower level by the same station is in the 'currently receivable state' (S33). If the state is the 'currently unreceivable state' (No in S33), a return is made to step S31, and viewing/listening to the program transmitted on the upper level by the broadcasting station is continued.

If the state is the 'currently receivable state' (Yes in S33), a return is made to step S29, and viewing/listening to the program transmitted on the lower level by the broadcasting station is permitted.

If the state is the 'currently receivable state' in step S32 (No in S32), the tuning control unit 7 rejects the affiliated station determined to be unreceivable (S46) and determines whether channel information for another broadcasting station with the same affiliation is stored in the affiliated station memory 8 (S26).

If step S26 yields a Yes after step S46, the tuning control unit 7 proceeds to step S27, but this time it selects the highest-priority one of the affiliated stations other than the affiliated station that was rejected in step S46.

If the decision in step S32 yields a No result for all of the plurality of affiliated stations, the next time the decision in step S26 is made the answer is No. If there is only one stored affiliated station the first time the decision in step S26 is made, the first time the decision in step S26 is made after steps S28 to S32, the answer is No.

When step S26 yields a No, the process of finding and viewing/listening to an affiliated station (S48) is performed. This process S48 is carried out as shown, for example, in FIG. 14, and corresponds to 'searching for affiliated station' 75 and viewing/listening to the program of the broadcasting station found in the search in FIG. 11.

The tuning control unit 7 first instructs the tuner-demodulator 1 in FIG. 11 to select the channel with the minimum channel number among the channels in its band (S35) and inspects the information included in the signal from the selected broadcasting station (S36). From the information included in the signal, it determines whether or not the selected broadcasting station is an affiliated station (S37). This determination can be made, for example, in the same way as in the first embodiment.

If the inspected broadcasting station is not a broadcasting station with the same affiliation (No in S37), whether the selected channel is the channel with the maximum channel number among the channels in the band is determined next (S38).

If the selected channel is not the channel with the maximum channel number (No in S38), the selected channel number is incremented by one (S39) and a return is made to step S36.

If the selected channel is the channel with the highest channel number in step S38 (Yes in S38), a return is made to step S35, and the process from step S35 onward is repeated.

If an affiliated station is detected in step S37 (Yes in S37), the tuning control unit 7 stores the channel information of the detected affiliated station and the channel information of the station broadcasting the program being viewed/listened to, which was stored in step S22, in the affiliated station memory 8, associating them as broadcasting stations with the same affiliation (S40), and permits the program transmitted on the lower level by the detected affiliated station to be viewed/listened to (S41).

This process corresponds to, for example, the transition 75A from the 'searching for affiliated station' state 75 to the 'viewing/listening to broadcasting station B on lower level' state 73 in FIG. 11.

In step S41, while the program transmitted on the lower level is being viewed/listened to, the decision as to whether or not the program transmitted on the lower level by the same station is in the 'currently receivable state' is continued (repeated) (S42).

If the state is the 'currently unreceivable state' in step S42 (No in S42), viewing/listening to the program transmitted on the upper level by the same station is permitted (S43).

This corresponds to, for example, the transition 73A from the 'viewing/listening to broadcasting station B on lower level' state 73 to the 'viewing/listening to broadcasting station B on upper level' state 74.

Even while the program transmitted on the upper level is being viewed/listened to, the tuning control unit 7 continues (repeats) determining whether the state is the 'currently receivable state' (S44).

If the state is the 'currently receivable state' (Yes in S44), it is determined whether the reception of the program transmitted on the lower level by the same broadcasting station is in the 'currently receivable state' (S45).

If the state is the 'currently unreceivable state' in S45 (No in S45), a return is made to step S43, and viewing/listening to the program transmitted on the upper level is continued.

If the state is the 'currently receivable state' in step S45 (Yes in S45), a return is made to step S41, and viewing/listening to the program transmitted on the lower level by the broadcasting station is permitted.

This process corresponds to, for example, the transition 74C from the 'viewing/listening to broadcasting station B on upper level' state 74 to the 'viewing/listening to broadcasting station B on lower level' state 73 in FIG. 11.

If the state is the 'currently unreceivable state' in step S44 (No in S44), a return is made to step S26 in FIG. 13.

In the 'viewing/listening to broadcasting station A on lower level' state 71, in this embodiment, if the unreceivability detector 6 detects the 'currently unreceivable state', an unreceivability notification is sent to the tuning control unit 7 as described in the first embodiment.

Upon receiving the unreceivability notification from the unreceivability detector 6, the tuning control unit 7 sends the demultiplexer 2 and video/audio decoder 3 an upper level transmission/lower level transmission program switching command, causing a transition to the 'viewing/listening to broadcasting station A on upper level' state 72 in FIG. 11, and permits the program transmitted on the upper level by broadcasting station A to be viewed/listened to. If a further unreceivability notification is received from the unreceivability detector 6 in the 'viewing/listening to broadcasting station A on upper level' state 72 in FIG. 11, if an affiliated station has not been found yet, the tuning control unit 7 causes a transition to the 'searching for affiliated station' state 75, and conducts a search for an affiliated station. To detect an affiliated station, as in the first embodiment, for example, it may decide that a station is affiliated if the value in the affiliation identifier (affiliation_id) field in the broadcaster information table (BIT) section in the service information (SI) in the TS detected by the demultiplexer 2 is the same.

If an affiliated station is found in the 'searching for affiliated station' state 75 in FIG. 11, the tuning control unit 7 records that broadcasting station A and broadcasting station B are affiliated stations in the affiliated station memory 8 in FIG. 10, and transits to the 'viewing/listening to broadcasting station B on lower level' state 73. If it receives an unreceivability notification in the 'viewing/listening to broadcasting station B on lower level' state 73, the tuning control unit 7 sends the demultiplexer 2 and video/audio decoder 3 an upper level transmission/lower level transmission program switching command, causing a transition to the 'viewing/listening to broadcasting station B on upper level' state 74 in FIG. 11, and permits the upper level transmission by broadcasting station B to be viewed/listened to.

If an unreceivability notification is received from the unreceivability detector 6 in the 'viewing/listening to broadcasting station B on upper level' state 74 in FIG. 11, the tuning control unit 7 learns by referring to the affiliated station memory 8 that an affiliated station of broadcasting station B is broadcasting station A, so instead of carrying out another 'search for an affiliated station' 75, it selects the affiliated broadcasting station A and makes a direct transition to the 'viewing/listening to broadcasting station A on lower level' state 71.

Then, if broadcasting station A cannot be received after commencement of the 'viewing/listening to broadcasting station A on lower level' state 71, a transition is made to the 'viewing/listening to broadcasting station A on upper level' state 72. When an unreceivability notification is received from the unreceivability detector 6 in the 'viewing/listening to broadcasting station A on upper level' state 72, if no affiliated stations have been found, a transition is made to the 'searching for affiliated station' state 75, and a search for an affiliated station is performed again.

If a plurality of affiliated broadcasting stations have been recorded in the affiliated station memory 8, as in the first embodiment, the tuning control unit determines the area identification codes of the areas adjacent to the area designated by the area identifier value included in the service ID that was currently being viewed/listened to, and retrieves broadcasting stations having service IDs including the area identification codes it has determined. It then selects the retrieved broadcasting stations in order and permits an affiliated station in the 'currently receivable state' to be viewed/listened to.

In the 'viewing/listening to broadcasting station A on upper level' state 72 and 'viewing/listening to broadcasting station B on upper level' state 74 in FIG. 11, in which a program transmitted on the upper level is being viewed/listened to, the receiving level information, receiving C/N ratio information, PLL lock information, frame lock information, and error rate information from the tuner-demodulator 1, the PAT and PMT interruption notification and TS loss of synchronization and packet loss notifications from the demultiplexer 2, and the error notification or error rate from the video/audio decoder 3 are reported to the unreceivability detector 6, which can detect from these reports that reception conditions have improved. When an improvement in reception conditions is detected, the unreceivability detector 6 sends a reception improvement notification to the tuning control unit 7.

Due to reception of this reception improvement notification, the tuning control unit 7 sends the demultiplexer 2 and video/audio decoder 3 an upper level transmission/lower level transmission program switching command, and operates to permit the program transmitted on the lower level to be viewed/listened to.

In this embodiment, when it is decided that viewing/listening to the program transmitted on the lower level has become impossible, an automatic switchover is made to the program transmitted on the upper level, which is resistant to noise and multipath, and viewing/listening to the simple moving picture and simple sound is permitted, thereby improving the probability of being able to continue viewing/listening to the same program.

Since the programs transmitted on the upper level and lower level are usually multiplexed into a single TS when output from the tuner-demodulator 1, the switchover between upper level transmission and lower level transmission does not require the received broadcasting station to be switched by controlling the tuner-demodulator 1. Therefore, the program switchover time can be reduced, and the time during which program viewing/listening is interrupted can also be reduced.

If the program transmitted on the upper level also enters the 'currently unreceivable state,' an affiliated station of the broadcasting station that has been received can be automatically selected as in the embodiments described earlier. Since there is a strong possibility that the program of the affiliated station is the same program as the program which has entered the 'currently unreceivable state' and cannot be viewed/listened to, as described in the preceding embodiments, the probability of continuing to view/listen to/listen to the same program can be enhanced.

Even if the program transmitted on the upper level is selected because the program transmitted on the lower level has entered the 'currently unreceivable state,' the reception conditions are constantly monitored for improvement. If an improvement is found, viewing/listening to the program transmitted on the lower level, having higher image and sound quality, can be automatically resumed. Therefore, if the reception conditions improve while the program transmitted on the upper level is being selected, it is possible to keep from continuing to view/listen to the program transmitted on the upper level even though the program having higher image and sound quality can be viewed/listened to.

The fourth embodiment combines the automatic selection of an affiliated station in the first to third embodiments described above with an automatic switchover between the program transmitted on the upper level and the program transmitted on the lower level. Because both the affiliated station and level are switched automatically, the time during which program viewing/listening is interrupted can be shortened by more than in the first embodiment.

In particular, if a vehicle such as an automobile is traveling near a boundary between the service areas of affiliated broadcasting stations, the time during which program viewing/listening is interrupted can be shortened, and the continuity of program viewing/listening can be improved, in comparison with the first embodiment.

Fifth Embodiment

Although, in comparison with the first embodiment, the digital broadcast receiver in the fourth embodiment above shortens the time during which program viewing/listening is interrupted when unreceivable and can improve the continuity of viewing/listening, some problems still remain. For example, a move into an environment, such as a tunnel, that is out of signal reach, or an environment with poor signal reception, causes the tuning control unit 7 to decide that the receiving level has dropped and perform a channel search for an affiliated station.

The problem of performing a channel search for an affiliated station in an environment that is out of signal reach or an environment with poor signal reception also occurred in the first embodiment and was solved in the second embodiment. The digital broadcast receiver in the fifth embodiment solves this problem with respect to the fourth embodiment, as described below.

Figure 15:
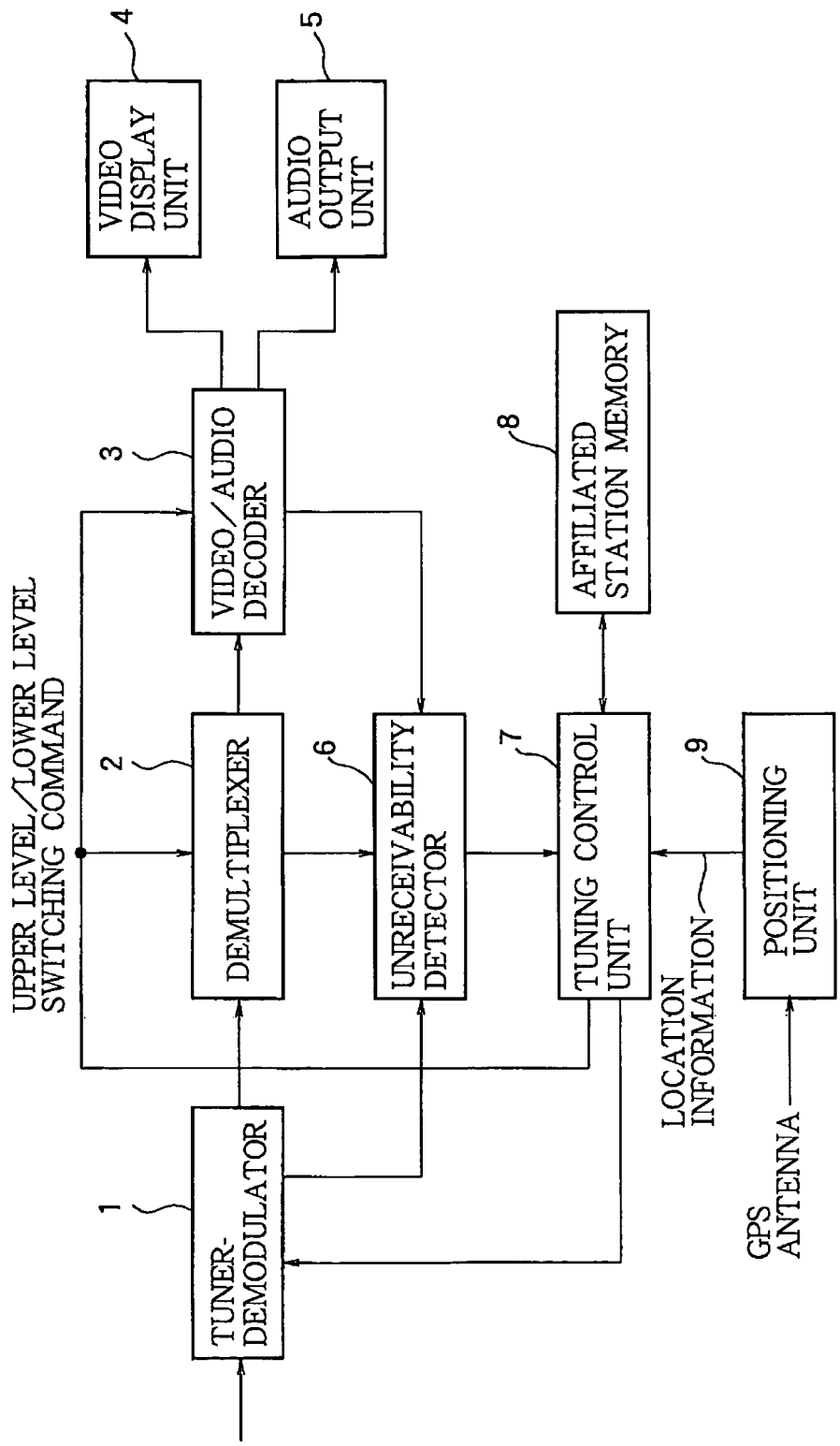
FIG. 15 is a block diagram showing the schematic internal structure of a digital broadcast receiver according to a fifth embodiment of this invention.

FIG. 15 is a block diagram showing the schematic internal structure of the digital broadcast receiver according to the fifth embodiment of this invention.

The structure of the digital broadcast receiver in FIG. 15 is basically the same as the structure in the fourth embodiment shown in FIG. 10, but differs in that a positioning unit 9 has been added.

The structure and operation of the positioning unit 9 were described in detail in the second embodiment, so a description will be omitted here.

When an 'unreceivable location' notification is not received from the positioning unit 9, the tuning control unit 7 in this embodiment performs the same operations as in the fourth embodiment, illustrated in FIGS. 12, 13, and 14.

When an 'unreceivable location' notification is received from the positioning unit 9, however, even if there is a 'currently unreceivable state' notification from the unreceivability detector 6, the tuning control unit 7 operates so as not to make any automatic state transitions from the 'viewing/listening to broadcasting station A on lower level' state 71, 'viewing/listening to broadcasting station A on upper level' state 72, 'viewing/listening to broadcasting station B on lower level' state 73, 'viewing/listening to broadcasting station B on upper level' state 74, and 'searching for affiliated station' state 75 in the operation illustrated in FIGS. 12, 13, and 14. That is, the operation of the tuning control unit 7 does not include any of the state transitions in FIG. 11 that change the level or perform the automatic selection of an affiliated station. When in an unreceivable location, even if notified that a program transmitted on the lower level is in the 'currently unreceivable state', the tuning control unit 7 does not make a state transition to the program transmitted on the upper level, does not let the tuner-demodulator 1 perform a channel search for an affiliated station if an affiliated station has not been found yet, and does not perform the operation to retrieve and select an affiliated station from the affiliated station memory 8 if an affiliated station has already been found.

Like the second embodiment, the digital broadcast receiver in the fifth embodiment can prevent the pointless operation of changing the level on which the signal is received from the same broadcasting station or searching for an affiliated station even though no broadcasting stations can be received, and when it moves into an environment with better signal reception, it can quickly resume viewing/listening to the program that was being viewed/listened to before the signal reception environment worsened.

Sixth Embodiment

A digital broadcast receiver according to the sixth embodiment can be represented by the same block diagram as shown in FIG. 10.

Figure 16:
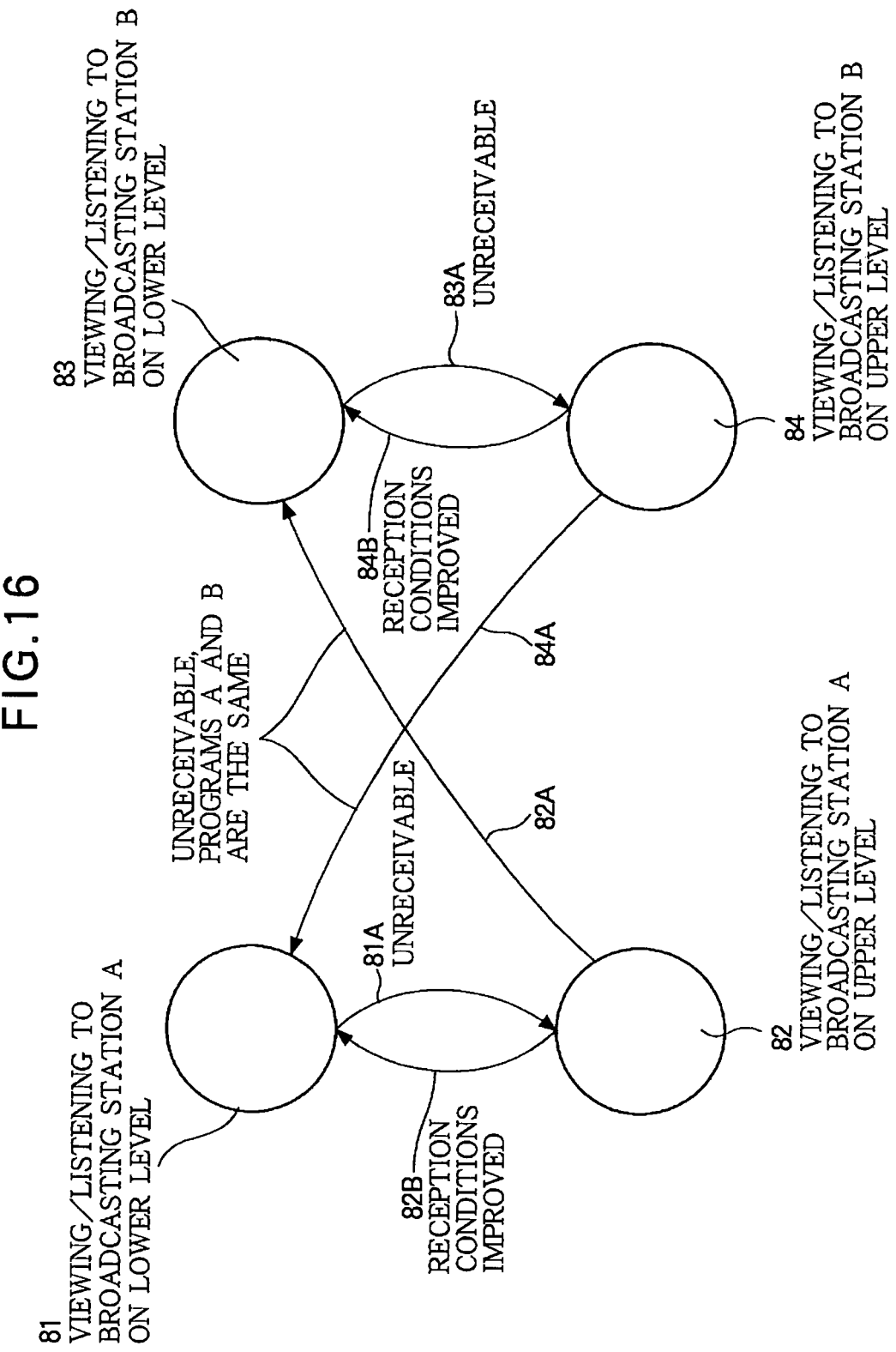
FIG. 16 is a state transition diagram of the station selection operation of the tuning control unit 7 in a sixth embodiment of this invention.

FIG. 16 is a state transition diagram of the station selection operation of the tuning control unit 7 in the sixth embodiment of this invention.

In FIG. 16, the 'viewing/listening to broadcasting station A on lower level' state 81 is a state in which a program transmitted by broadcasting station A on the lower level is being viewed/listened to, and the 'viewing/listening to broadcasting station A on upper level' state 82 is a state in which a program transmitted by broadcasting station A on the upper level is being viewed/listened to. The 'viewing/listening to broadcasting station B on lower level' state 83 is a state in which a program transmitted by broadcasting station B on the lower level is being viewed/listened to, and the 'viewing/listening to broadcasting station B on upper level' state 84 is a state in which a program transmitted by broadcasting station B on the upper level is being viewed/listened to. Broadcasting station A and broadcasting station B are mutually affiliated, and the programs viewable/listenable on each broadcasting station are always the same program broadcast at the same time.

This embodiment differs from the fourth embodiment by not including the 'searching for affiliated station' state, in which a channel search is performed to select an affiliated station of broadcasting station A or B.

In this embodiment, if the unreceivability detector 6 detects the 'currently unreceivable state' in the 'viewing/listening to broadcasting station A on lower level' state 81, as in the fourth embodiment, an unreceivability notification is sent to the tuning control unit 7

Upon receiving the unreceivability notification from the unreceivability detector 6, the tuning control unit 7 sends the demultiplexer 2 and video/audio decoder 3 an upper level transmission/lower level transmission program switching command, causing a transition (81A) to the 'viewing/listening to broadcasting station A on upper level' state 82 in FIG. 16, and permits the program transmitted on the upper level by broadcasting station A to be viewed/listened to. If a further unreceivability notification is received from the unreceivability detector 6 in the 'viewing/listening to broadcasting station A on upper level' state 82 in FIG. 16, if a program transmitted on the lower level having the same values in the fields of the event information table (EIT) section as the program transmitted on the lower level by the broadcasting station that was being viewed/listened to can be detected at the present time by checking the values in the fields acquired in advance from the EIT section in the SI information, the tuning control unit 7 records in the affiliated station memory 8 in FIG. 10 that broadcasting station A and broadcasting station B are affiliated stations and selects the corresponding service. That is, a transition (82A) is made to the 'viewing/listening to broadcasting station B on lower level' state 83.

If a further unreceivability notification is received from the unreceivability detector 6 in the 'viewing/listening to broadcasting station B on lower level' state 83, the tuning control unit 7 sends the demultiplexer 2 and video/audio decoder 3 an upper level transmission/lower level transmission program switching command, causing a transition (83A) to the 'viewing/listening to broadcasting station B on upper level' state 84 in FIG. 16, and permits the upper level transmission by broadcasting station B to be viewed/listened to.

If an unreceivability notification is received from the unreceivability detector 6 in the 'viewing/listening to broadcasting station B on upper level' state 84, the tuning control unit 7 learns by referring to the affiliated station memory 8 that an affiliated station of broadcasting station B is broadcasting station A, so it selects the affiliated broadcasting station A and makes a transition (84A) to the 'viewing/listening to broadcasting station A on lower level' state 81.

The SI field values that are used to tell that the programs are the same include the value in the event_name_char (program name) field and the value in the text_char (program description) field in the short-form event descriptor in the EIT section, for example; these field values may be compared to check whether the programs are the same. In this comparison, the program descriptions as well as the program names in the PSI/SI are checked to see whether they are the same, which means that the outlines, cast, and so on are checked to see whether they are the same, so the probability that the program of the affiliated station is the same program can be enhanced.

If a plurality of affiliated stations have been recorded in the affiliated station memory 8, as in the first embodiment, the area identification codes of the areas adjacent to the area designated by the area identifier value included in the service ID that was currently being viewed/listened to are determined, and broadcasting stations having service IDs including the determined area identification codes are retrieved from the affiliated station memory 8. The retrieved broadcasting stations are selected in order, and viewing/listening to an affiliated station in the 'currently receivable state' is permitted.

In the 'viewing/listening to broadcasting station A on upper level' state 82 and the 'viewing/listening to broadcasting station B on upper level' state 84 in FIG. 16, in which a program transmitted on the upper level is being viewed/listened to, the receiving level information, receiving C/N ratio information, PLL lock information, frame lock information, and error rate information from the tuner-demodulator 1, the PAT and PMT interruption notification, TS loss of synchronization, and packet loss notifications from the demultiplexer 2, and the error notification or error rate from the video/audio decoder 3 are reported to the unreceivability detector 6, which can detect from these reports that reception conditions have improved. When an improvement in reception conditions is detected, the unreceivability detector 6 sends a reception improvement notification to the tuning control unit 7.

Due to reception of this reception improvement notification, the tuning control unit 7 sends the demultiplexer 2 and video/audio decoder 3 an upper level transmission/lower level transmission program switching command, and operates to permit the program transmitted on the lower level to be viewed/listened to. This results in a transition (82B, 84B) from the viewing/listening to broadcasting station A on upper level state to the viewing/listening to broadcasting station A on lower level state or from the viewing/listening to broadcasting station B on upper level state to the viewing/listening to broadcasting station B on lower level state.

If a positioning unit 9 is included as in the fifth embodiment shown in FIG. 15 and if the positioning unit 9 detects that the present location is in an unreceivable area, the operations shown in the state transition diagram in FIG. 16 are controlled so as not to make the automatic selection of the same program in a different state (or a transition to another state).

In this embodiment, the same program on a different level or the same program of an affiliated station can be automatically selected in accordance with the field values in the EIT section of the SI, so the same program can be identified more accurately than when a program is judged just by its program title, program genre, or program identification number. In particular, it may be impossible to identify news, weather, and other such programs just by their titles; programs such as these can be identified more accurately by using the cast and outline descriptions included in the field values in the EIT section of the SI.

Seventh Embodiment

In the first embodiment shown in FIG. 1, when reception becomes impossible, a search for an affiliated station is performed, and if the search detects a new affiliated station that is transmitting (broadcasting) a TS including the same affiliated station information as the affiliated station information of the TS which has become unreceivable, the affiliated station information of the TS that has become unreceivable is stored in the affiliated station memory 8 in association with the transmission frequency or the channel number of the TS of the newly detected affiliated station. Moreover, in the first embodiment, in Integrated Services Digital Broadcasting-Terrestrial (ISDB-T), a type of digital terrestrial broadcasting used in Japan, for example, the value in the affiliation identifier (affiliation_id) field in the broadcaster information table (BIT) section, and the broadcaster information table (BIT) section transmitted in the frequency list are used as affiliated station information and whether these values are the same is checked. If the affiliation decision is made just by the values in the affiliation identifier (affiliation_id) field in the broadcaster information table (BIT) section, the probability of being able to tune in the affiliated station is not always sufficiently high.

In the seventh embodiment of this invention described below, the probability of being able to tune in the affiliated station is increased by detecting and storing a hit count value indicating the number of times the TS has been successfully selected, or the number of times a detected affiliated station has been detected, in the affiliated station memory 8, in addition to the value in the affiliation identifier (affiliation_id) field stored in the first embodiment, and by using the detection count as well.

The structure and operation of the digital broadcast receiver according to the seventh embodiment are basically the same as the structure and operation of the digital broadcast receiver according to the first embodiment shown in FIG. 1, but differ in that, as described above, when a TS is received by automatic station selection, a hit count value indicating the number of times the TS has been successfully received is stored in the affiliated station memory 8, and when a station becomes unreceivable, the stored information (the hit count values indicating the number of successful receptions: the number of times the detected affiliated station has been detected before) is used to select another station automatically.

The stored information (the hit count values indicating the number of successful receptions: the number of times the detected affiliated station has been detected) will be described below.

When the unreceivability detector 6 detects that the TS being viewed/listened to has become unreceivable because the reception environment has worsened, the tuning control unit 7 searches through the affiliated station memory 8. If this brings about normal reception of the TS, the tuning control unit 7 increments the hit count value corresponding to the TS by one, then stores the hit count in the affiliated station memory 8 together with the affiliated station information of the TS. In addition, when an affiliated station is detected by a channel search through the broadcasting frequency range and when the TS can be received normally, the tuning control unit 7 increments the hit count value corresponding to the TS by one and stores the hit count in the affiliated station memory 8 together with the affiliated station information of the TS.

Then, if the unreceivability detector 6 detects that the TS being viewed/listened to has become unreceivable because of a worsened reception environment, the tuning control unit 7 first finds a TS such that the current location is 'within the reception service area' or 'inferred to be within the reception service area' from the channel information of the affiliated stations in the affiliated station memory 8. If a plurality of TS's are found, the hit count values are referred to, selection commands are output to the tuner-demodulator 1 in descending order of the hit count value, and whether the affiliated station selected by the tuner-demodulator 1 can be received is determined. The TS that was determined to be unreceivable may be excluded from the range of selection.

In the digital broadcast receiver of this embodiment, when the tuning control unit 7 stores affiliated stations in association with one another in the affiliated station memory 8, when an affiliated station is detected, the tuning control unit 7 detects the number of times the affiliated station has been detected, and stores the detection count in the affiliated station memory 8 in association with the affiliated station. After that, if an unreceivability notification is received from the unreceivability detector 6, the channel information of the affiliated stations is retrieved from the affiliated station memory 8. If the result of this retrieval indicates that a plurality of affiliated stations that are possibly receivable in the current location have been stored, the tuning control unit 7 selects the affiliated stations in descending order of the number of times they have been detected. The tuning control unit 7 determines whether the received signal based on the channel information of the selected affiliated station is in the 'currently receivable state,' and if the state is the 'currently receivable state,' viewing/listening to the program of the affiliated station is permitted. If no affiliated station is stored in the affiliated station memory 8 or if all the affiliated stations stored there are in the 'currently unreceivable state,' the tuning control unit 7 outputs a command to perform a channel search for an affiliated station.

In the example described above, affiliated stations having a high hit count are selected preferentially; alternatively, the selection priority order of an affiliated station may be raised by one each time the affiliated station is detected.

The affiliated station that is detected last may be given the highest (leading) priority (regardless of its previous priority), and the priorities of other affiliated stations may be lowered by one each if necessary (that is, the priorities of other affiliated stations that had priorities ahead of the priority of the affiliated station detected last before the change are lowered by one each). In this case, when storing affiliated stations in association with one another in the affiliated station memory 8, the tuning control unit 7 may assign the detected affiliated station the highest priority in the priority order, lower by one each the priorities of other affiliated stations that were stored in the affiliated station memory 8 and had priorities ahead of the priority of the detected affiliated station before its priority was changed, store the changed priorities in association with the affiliated stations in the affiliated station memory 8, and use the changed priorities in automatic selection the next time the broadcasting station being viewed/listened to becomes unreceivable. That is, when the next unreceivability notification is received from the unreceivability detector 6, the channel information of the affiliated stations may be retrieved from the affiliated station memory 8, and if a plurality of affiliated stations that are possibly receivable in the current location are stored, the affiliated station may be selected in order from the affiliated station with the leading priority, whether the received signal based on the channel information of the selected affiliated station is in the 'currently receivable state' may be decided, viewing/listening to the program of the affiliated station may be permitted if it is in the 'currently receivable state', and if no affiliated stations are stored or if all of the stored affiliated broadcasting stations are in the 'currently unreceivable state', a command to make a channel search for an affiliated station may be output.

As described above, in this embodiment, when a TS having a station affiliation relationship is detected, the hit count value of the TS is stored in association with the channel information concerning the TS, and each time the TS is detected, the stored hit count value is incremented by one, so the TS's of affiliated station in regularly and frequently traveled areas have higher hit count values than other TS's. The higher hit count values cause these TS's to be assigned higher priorities when affiliated stations are retrieved. Accordingly, in the automatic selection (automatic retrieval) of affiliated stations when a station becomes unreceivable, the probability of selecting a previously detected TS increases and the selection process can proceed quickly. Moreover, the probability of making a correct selection in the automatic selection of affiliated stations when a station becomes unreceivable can be improved without using positioning hardware (H/W) such as GPS hardware, so the cost of the digital broadcast receiver can be reduced.

Eighth Embodiment

The structure and operation of the digital broadcast receiver in the eighth embodiment of this invention are basically the same as the structure and operation of the digital broadcast receiver in the first embodiment shown in FIG. 1, but the operation differs in the following point: when a TS becomes unreceivable, if another TS can be received by performing automatic selection, whether or not that TS has a multifrequency network (MFN) relationship with the TS that has become unreceivable is stored in the affiliated station memory 8; and if reception becomes impossible later, the stored MFN information is used to perform automatic selection of a TS having an MFN relationship with the TS that has become unreceivable A multifrequency network (MFN) is a network in which different frequencies are allocated to different transmitting stations (relay stations) when the same program of the same broadcasting station is broadcast from different transmitting stations (relay stations) in a plurality of overlapping service areas; one of the transmitting stations may be the parent station. Therefore, an MFN-related TS is a TS that has the same content but is transmitted on a different frequency.

When a TS becomes unreceivable, the digital broadcast receiver of this embodiment refers to the MFN information in the affiliated station memory 8 and retrieves TS's having an MFN relationship with the TS that has become unreceivable. If a plurality of MFN-related TS's are retrieved, the tuner-demodulator 1 selects the TS's in order to check whether or not they can be received. Then, if an MFN-related TS that is newly receivable is detected, the detected TS (affiliated station TS) is stored in the affiliated station memory 8 in association with the corresponding channel number or the transmission frequency. In ISDB-T, the channel number and frequency information of the MFN-related TS can be obtained from the frequency field included in the transmitted terrestrial distribution system descriptor or the physical_ch field and new_physical_ch field included in the frequency list descriptor, in the network information table (NIT) section in the PSI. In digital video broadcasting (DVB), a European digital broadcasting standard, the information can be obtained from the centre_frequency field included in the transmitted frequency list descriptor or the transposer_frequency field included in the cell_frequency_list descriptor, in the NIT section.

In this embodiment, in addition to the MFN information, the hit count values stored in the affiliated station memory 8 in the seventh embodiment described above are also stored to indicate the number of times each TS is successfully selected. When the unreceivability detector 6 detects that the TS being viewed/listened to has become unreceivable because of a worsened reception environment, the tuning control unit 7 searches through the affiliated station memory 8, and if the TS can be received normally from a detected affiliated station, the hit count value corresponding to the TS is incremented by one. Likewise, when the TS can be received normally from an affiliated station that is detected by a channel search through the broadcasting frequency range, the tuning control unit 7 increments the hit count value corresponding to the TS by one.

If the unreceivability detector 6 detects that the TS being viewed/listened to has become unreceivable because of a worsened reception environment, the tuning control unit 7 first refers to the MFN information transmitted by the TS that has become unreceivable, and if there are a plurality of MFN-related TS's, it retrieves the channel information of the TS's from the affiliated station memory 8. If a plurality of TS's are stored, selection commands are output to the tuner-demodulator 1 in descending order of the hit count values of the TS's, and whether they can be received is determined. The TS that was being viewed/listened to and has become unreceivable may be excluded from the range of selection.

The digital broadcast receiver of this embodiment includes the tuner-demodulator 1 for receiving a signal of a digital broadcast program from a broadcasting station detected by a channel search according to a command output from the tuning control unit 7 or a broadcasting station designated by an input means, performing station selection, demodulation, and error correction, and outputting a TS of the signal of the selected program. When the affiliated stations are stored in association with one another in the affiliated station memory 8, if the tuner-demodulator 1 detects a TS identical to the TS transmitting the program being viewed/listened to, the tuning control unit 7 detects that the detected TS is MFN-related and stores at least the channel information of the detected MFN-related TS and at least the channel information of the TS transmitting the program being viewed/listened to as associated with each other in the affiliated station memory 8. If an unreceivability notification is received from the unreceivability detector 6, MFN-related TS's are retrieved from the affiliated station memory 8. Whether the received signal based on the channel information of an MFN-related TS that is possibly receivable in the current location is in the 'currently receivable state' is determined, and if the state is the 'currently receivable state', viewing/listening to the program transmitted by the MFN-related TS is permitted. If no MFN-related TS is stored or if all the programs transmitted by the MFN-related TS's stored there are in the 'currently unreceivable state', a command to perform a channel search for an affiliated station is output.

If no MFN-related TS is stored or if all the programs transmitted by the stored MFN-related TS's are in the 'currently unreceivable state', the affiliated station memory may be referenced to determine whether an affiliated station of the broadcasting station that was being viewed/listened to up until now is included, before a channel search for an affiliated station is performed, as in the first to sixth embodiments. If an affiliated station is detected, whether the signal received from the detected affiliated station is in the 'currently receivable state' may be determined.

In this embodiment, the tuning control unit 7 detects the number of times the detected TS is detected and stores the detection count and the MFN relationship in association with the affiliated station in the affiliated station memory 8, and when an unreceivability notification is received from the unreceivability detector 6, an MFN-related TS is retrieved from the affiliated station memory 8. If a plurality of MFN-related TS's that are possibly receivable in the current location are stored, the tuning control unit 7 selects the affiliated stations in descending order of the detection count values of the MFN-related TS's, and determines whether the received signal based on the channel information of the selected TS is in the 'currently receivable state', and permits viewing/listening to the program transmitted by the MFN-related TS if the state is the 'currently receivable state'.

In this embodiment, when an MFN-related TS is detected, the channel information concerning the TS is stored, so in the retrieval made when a program becomes unreceivable, a program transmitted by an MFN-related TS is selected preferentially. In addition, since the stored hit count value is incremented by one as in the seventh embodiment, an MFN-related TS in a regularly and frequently traveled area has a greater hit count value than other TS's, causing the station to be selected preferentially in MFN retrieval when unreceivable. Therefore, a frequently received TS can be selected automatically and quickly. Because additional positioning hardware (H/W) such as GPS hardware is not needed, the cost of the search function for use in the unreceivable state can be reduced.

Ninth Embodiment

The digital broadcast receiver in the ninth embodiment has the same structure as in the seventh or eighth embodiment but differs in that the station selection order is determined not by the hit count value but by an algorithm described below.

The affiliated station memory 8 stores affiliated station information or MFN information as described in the eighth embodiment, but in the ninth embodiment, the affiliated station memory 8 also stores station selection order information for TS's in the same mutual station affiliation relationship and station selection order information for TS's in a mutual MFN relationship. When the unreceivability detector 6 detects that the TS being viewed/listened to has become unreceivable because of a worsened reception environment and the tuning control unit 7 selects a TS having a station affiliation relationship or an MFN relationship found by searching the affiliated station memory 8, if the result is that the tuner-demodulator 1 can receive the selected TS normally, the selected TS is assigned leading priority in the station selection order. Similarly, when the tuning control unit 7 makes a channel search through the broadcasting frequency range and finds a TS with a station affiliation relationship or MFN relationship, if the TS is received normally, it is assigned leading priority in the station selection order. As a result, the station selection priorities of other TS's are lowered by one each if necessary (the priorities of TS's that had priorities ahead of the priority of the selected TS having the station affiliation relationship or MFN relationship before the priority order was changed are lowered by one each).

FIGS. 17(*a*) and 17(*b*) form a diagram illustrating a priority order alteration algorithm (for determining the priority order for the next station selection) when an affiliated station is successfully received in the ninth embodiment of this invention, or when a new TS is detected.

More specifically, FIG. 17(*a*) shows the station selection priority order (old station selection order; the station selection order to be altered) in the affiliated station memory 8 when TS(A), TS(B), and TS(C) are stored in the affiliated station memory 8 and are used for automatic station selection when unreceivability is detected.

If station selection in the sequence in FIG. 17(*a*) fails and TS(D) is newly found and selected by an affiliated station search made by scanning frequencies sequentially, and if TS(D) is an affiliated station or in a new MFN relationship not present in the affiliated station memory 8, the station selection priority order (station selection order) in the affiliated station memory 8 is updated as shown in FIG. 17(*b*), which shows the new station selection priority order (new station selection order; the altered station selection order) in the affiliated station memory 8.

In FIGS. 17(*a*) and 17(*b*) TS (A) TS (B), TS(C), and TS(D) are assumed to be in a mutual station affiliation relationship or in a mutual MFN relationship.

The rearrangement of the station selection order will now be described with reference to FIGS. 17(*a*) and 17(*b*). The TS statuses stored in the affiliated station memory 8 as shown in FIG. 17(*a*) indicate a relation among three affiliated stations A, B, C or indicate that TS(A), TS(B), TS(C) are in an MFN relationship. In this drawing, smaller numbers indicate higher priority for station selection, so the level-one item will be selected first. When the unreceivability detector 6 detects that the TS being viewed/listened to has become unreceivable because of a worsened reception environment, if the tuning control unit 7 cannot select any of TS(A), TS(B), or TS(C) in the affiliation relationship or MFN relationship in the affiliated station memory 8, an affiliated station search is performed. If the search finds a new TS(D) in a station affiliation relationship, the station selection information of TS(D) is stored in the affiliated station memory 8, and the priority of TS(D) for the next station selection is set to the level-one priority. This lowers the priorities of TS(A), TS(B), and TS(C) by one each from their respective level 1, level 2, and level 3 priorities specified in the old station selection order. In FIGS. 17(*a*) and 17(*b*), TS(A) has its priority lowered from level 1 to level 2, TS(B) has its priority lowered from level 2 to level 3, and TS(C) has its priority lowered from level 3 to level 4.

When the affiliated station memory 8 is in the state shown in FIG. 17(*a*), not including TS(D), which is in an MFN relationship with the TS that has become unreceivable, if the MFN information transmitted by the TS that has become unreceivable includes TS(D) and if the broadcast can be received using TS(D) by selecting the channel on which the included TS(D) is transmitted, the information needed to select the new TS(D) is stored in the affiliated station memory 8 with level-one station selection priority, as shown in FIG. 17(*b*).

FIGS. 18(*a*) and 18(*b*) form a diagram illustrating an algorithm for altering the priority order (for determining the priority order for the next station selection) when an affiliated station stored in the affiliated station memory 8 or an MFN TS is successfully received in the ninth embodiment of this invention, or when a station can be selected with a TS in the affiliated station memory.

More specifically, FIG. 18(*a*) shows the station selection priority order (old station selection order) stored in the affiliated station memory 8, in which TS(A) is on level 2, TS(B) is on level 3, TS(C) is on level 4, and TS(D) is on level 1; when unreceivability is detected, if the automatic station selection of a TS in a station affiliation relationship or an MFN relationship succeeds at level 2, when TS(A) is selected, then the station selection priority order (station selection order) of TS(A) is raised to level 1 as shown in FIG. 18(*b*), which shows the station selection priority order (new station selection order) in the affiliated station memory 8 after the change caused by the successful selection of TS(A).

In FIGS. 18(*a*) and 18(*b*), TS(A), TS(B), TS(C), TS(D) are assumed to be in a mutual station affiliation relationship or in a mutual MFN relationship.

FIG. 18(*a*) shows four TS's, TS(A), TS(B), TS(C), TS(D), in a station affiliation relationship or an MFN relationship stored in the affiliated station memory 8 in descending sequence of station selection priority, TS(D) on level 1, TS(A) on level 2, TS(B) on level 3, and TS(C) on level 4. When the unreceivability detector 6 detects that the TS being viewed/listened to has become unreceivable because of a worsened reception environment, the tuning control unit 7 retrieves a TS in a station affiliation or MFN relationship from the affiliated station memory 8. When reception succeeds at TS(A), which is assigned level-2 station selection priority, the station selection priority of the successfully selected TS(A) is raised to level 1, which is the highest priority, and the priorities of the other TS's that were ahead of the successfully selected TS(A) in the priority order of station selection before the change are lowered by one each. TS(D) meets this condition and its station selection priority is lowered from level 1 to level 2 as in FIG. 18(*b*). TS(B) and TS(C) maintain their priorities on levels 3 and 4 in the station selection order because their priorities were lower than the level-2 priority of TS(A) in the old station selection order.

Next, when the unreceivability detector 6 detects that the TS being viewed/listened to has become unreceivable because of a worsened reception environment, the tuning control unit 7 retrieves the channel information of a TS in a station affiliation relationship or an MFN relationship with the TS that has become unreceivable from the affiliated station memory 8. If this retrieval produces a plurality of TS's in a station affiliation or an MFN relationship, the tuning control unit 7 searches through the affiliated stations or MFNs by selecting stations in the station selection order stored in the affiliated station memory 8 and determining whether the selected broadcast can be received. The TS that was being viewed/listened to and became unreceivable may be excluded from the range of automatic station selection.

In this embodiment, the tuning control unit 7 detects the number of times the detected TS has been detected and stores priorities in the affiliated station memory 8, giving the detected MFN-related TS the highest priority in the next retrieval of channel information of an MFN-related TS and lowering the priorities of the other MFN-related TS's in the next retrieval of channel information to levels equal to or lower than their priorities until then. When an unreceivability notification is received from the unreceivability detector 6, the channel information of an MFN-related TS is retrieved from the affiliated station memory 8. If a plurality of MFN-related TS's that are possibly receivable in the current location are stored, the tuning control unit 7 selects the MFN-related TS's in descending sequence of station selection priority, determines whether the received signal based on the channel information of the selected MFN-related TS is in the 'currently receivable state', and if it is in the 'currently receivable state', outputs a command to permit viewing/listening to the program transmitted by the MFN-related TS.

As described above, when a TS in a station affiliation relationship or an MFN relationship is detected in this embodiment, a station selection priority of the TS in the station affiliation relationship or MFN relationship when reception becomes impossible next is stored together with the channel information of the TS, and the method by which the station selection priority order is determined gives an elevated priority or the highest priority for next selection to the TS that was successfully received by the automatic selection made in the unreceivable state, so even if excursions are made into an infrequently traveled area, when reception becomes impossible for the second time and thereafter, a TS of an affiliated station or an MFN-related TS can be selected automatically and quickly. When a return is made to a regularly and frequently traveled area, a relatively fast automatic selection can be made because the station selection priority order stored in the affiliated station memory 8 still has values that produce relatively quick selection. Because positioning hardware (H/W) such as GPS hardware need not be added, the cost of the retrieval function for use in the unreceivable state can be reduced.

Tenth Embodiment

The digital broadcast receiver in the tenth embodiment has the same structure as in the first embodiment but differs in the following points.

The unreceivability detector 6 collects a history of one or some of the electric field level (receiving signal level), receiving C/N ratio information, PLL lock information, frame lock information, and error rate information from the tuner-demodulator 1, the PAT and PMT interruption information, TS loss of synchronization information, and information about abnormal occurrences in the continuity counter value in the TS headers from the demultiplexer 2, and decoding error information etc. from the video/audio decoder 3. When the unreceivability detector 6 detects an unreceivable condition from the collected information, if a TS with a station affiliation relationship or an MFN relationship is detected by a search of the affiliated station memory 8 by the tuning control unit 7 or by a channel search, the channel selection information of the detected TS is stored in the affiliated station memory 8 and the reception problem history information over a certain time immediately preceding the occurrence of the unreceivable condition is also stored. The digital broadcast receiver collects the above types of status information regularly with a fixed sampling period of, for example, a few seconds; the certain time mentioned above means, for example, the fixed sampling period.

Then, when the unreceivability detector 6 next detects an unreceivable condition, the tuning control unit 7 searches the affiliated station memory 8 for reception problem history information representing a past pattern of variations identical to or similar to the current pattern of variations. If reception problem history information having the same or a similar pattern of variations is found, the tuning control unit 7 selects a channel in accordance with the channel selection information stored in association with the detected reception problem history information. That is, when reception problem history information having the same or a similar pattern of variations is detected, and a station having a station affiliation relationship or a station having an MFN relationship that was selected and could be received before is selected again.

The digital broadcast receiver in this embodiment includes a tuner-demodulator 1 for receiving the received signal of a digital broadcast program, performing station selection, demodulation, and error correction, outputting the TS of the received signal of the selected program, and outputting at least one of receiving level information, receiving C/N ratio information, PLL lock information, frame lock information, and error rate information of the received signal of the program; a demultiplexer 2 for extracting a video/audio stream from the TS, outputting the video/audio stream, extracting the PSI/SI from the TS, storing the PSI/SI, and outputting at least one of PAT interruption information, PMT interruption information, TS loss of synchronization information, and TS packet loss information, and a video/audio decoder 3 for performing video decoding and audio decoding from the video/audio stream, outputting the decoded video signal and audio signal, and outputting at least one of decoding error detection information and decoding error rate information.

When the unreceivability detector 6 detects that the received signal of the program is in the 'currently unreceivable state' in accordance with at least one of the above information, if a TS having a station affiliation relationship or an MFN relationship can be detected by a search of the affiliated station memory 8 or by a channel search, the tuning control unit 7 stores the channel selection information of the detected TS in the affiliated station memory 8 and stores the pattern of variations in the information over a certain time immediately preceding the occurrence of the 'currently unreceivable state' as reception problem history information in the affiliated station memory 8 in association with the channel selection information of the detected TS.

When the unreceivability detector 6 detects the 'currently unreceivable state' later, the tuning control unit 7 searches for reception problem history information representing a pattern of variations identical to or similar to the pattern of variations in the corresponding (detected) reception problem history information in the reception problem history information stored in the affiliated station memory 8, and if reception problem history information having the same or a similar pattern of variations is found, the channel selection information of the TS, having a station affiliation relationship or an MFN relationship, stored in association with the detected reception problem history information is used for station selection.

As described above, in this embodiment, when a TS having a station affiliation relationship or an MFN relationship can be automatically selected, the tuning control unit 7 stores the channel information of the TS and reception problem history information immediately preceding the occurrence of the unreceivable condition, and if the unreceivable condition occurs later, a similar pattern of variations in reception problem information at that time is found in the stored reception problem history information, and the corresponding TS is automatically selected. The TS that could be automatically selected at the same point when reception became impossible in the past has a high probability of being receivable, so the probability of performing a quick automatic selection can be improved by selecting that TS first. Because additional positioning hardware (H/W) such as GPS hardware is not needed, the cost of the search function for use in the unreceivable state can be reduced.

Eleventh Embodiment

The digital broadcast receiver in the eleventh embodiment has the same structure as in the first embodiment but differs in the following points.

The unreceivability detector 6 collects a history of one or some of the electric field level (receiving signal level), receiving C/N ratio information, PLL lock information, frame lock information, and error rate information from the tuner-demodulator 1, the PAT and PMT interruption information, TS loss of synchronization information, and information about abnormal occurrences in the continuity counter value in the TS headers from the demultiplexer 2, and decoding error information etc. from the video/audio decoder 3. When the unreceivability detector 6 detects an unreceivable condition from the collected information, if a TS with a station affiliation relationship or an MFN relationship can be detected by a search of the affiliated station memory 8 by the tuning control unit 7 or by a channel search, the tuning control unit 7 stores the channel selection information of the detected TS in the affiliated station memory 8 and also stores the reception problem history information over a certain time immediately preceding the occurrence of the unreceivable condition.

Then, when the unreceivability detector 6 next detects an unreceivable condition, if the electric field level changes sharply for the worse in the reception problem history information immediately preceding the occurrence of the unreceivable condition, for example, the tuning control unit 7 decides that it has moved into an environment, such as a tunnel, where no channel can be received, and cancels the automatic search for a TS having a station affiliation relationship or an MFN relationship and the automatic selection operation.

Like the tenth embodiment, the digital broadcast receiver in this embodiment includes a tuner-demodulator 1 for receiving the received signal of a digital broadcast program, performing station selection, demodulation, and error correction, outputting the TS of the received signal of the selected program, and outputting at least one of receiving level information, receiving C/N ratio information, PLL lock information, frame lock information, and error rate information of the received signal of the program, a demultiplexer 2 for extracting a video/audio stream from the TS, outputting the video/audio stream, extracting the PSI/SI from the TS, storing the PSI/SI, and outputting at least one of PAT interruption information, PMT interruption information, TS loss of synchronization information, and TS packet loss information, and a video/audio decoder 3 for performing video decoding and audio decoding from the video/audio stream, outputting the decoded video signal and audio signal, and outputting at least one of decoding error detection information and decoding error rate information.

When the unreceivability detector 6 detects that the received signal of the program is in the 'currently unreceivable state' in accordance with at least one of the above information, if a TS having a station affiliation relationship or an MFN relationship can be detected by a search of the affiliated station memory 8 or by a channel search, the tuning control unit 7 stores the channel selection information of the detected TS in the affiliated station memory 8 and also stores the pattern of variations in the information over a certain time immediately preceding the occurrence of the 'currently unreceivable state' as reception problem history information in the affiliated station memory 8 in association with the channel selection information of the detected TS. If all programs from all broadcasting stations are in the 'currently unreceivable state', this condition is also stored in association with the reception problem history information.

When the unreceivability detector 6 detects the 'currently unreceivable state' later, reception problem history information representing a pattern of variations identical to or similar to the pattern of variations in the corresponding information is searched for in the affiliated station memory 8. If reception problem history information having the same or a similar pattern of variations is found, the tuning control unit 7 performs station selection in accordance with the channel selection information stored in association with the detected reception problem history information. That is, when reception problem history information having the same or a similar pattern of variations is found, a station, having a station affiliation relationship or an MFN relationship, that could be received when selected before is selected again. If information indicating that all programs of all broadcasting stations are in the 'currently unreceivable state' is stored in association with the detected reception problem history information, however, no station selection or switchover among broadcasting stations is performed. This is because the detected pattern of variations in the information is assumed to indicate that the digital broadcast receiver is in a location where no channel can be selected.

As described above, in this embodiment, from the pattern of variations in the reception problem information immediately preceding the occurrence of the unreceivable state, a decision is made as to whether the environment does not permit any channel to be received, and if that is the case, automatic station selection is halted. Because automatic station selection is not performed in a tunnel or the like, the reception of the TS that was being received can be resumed quickly on exit from the tunnel. Because additional positioning hardware (H/W) such as GPS hardware is not needed, the cost of the search function for use in the unreceivable state can be reduced.

Twelfth Embodiment

Figure 19:
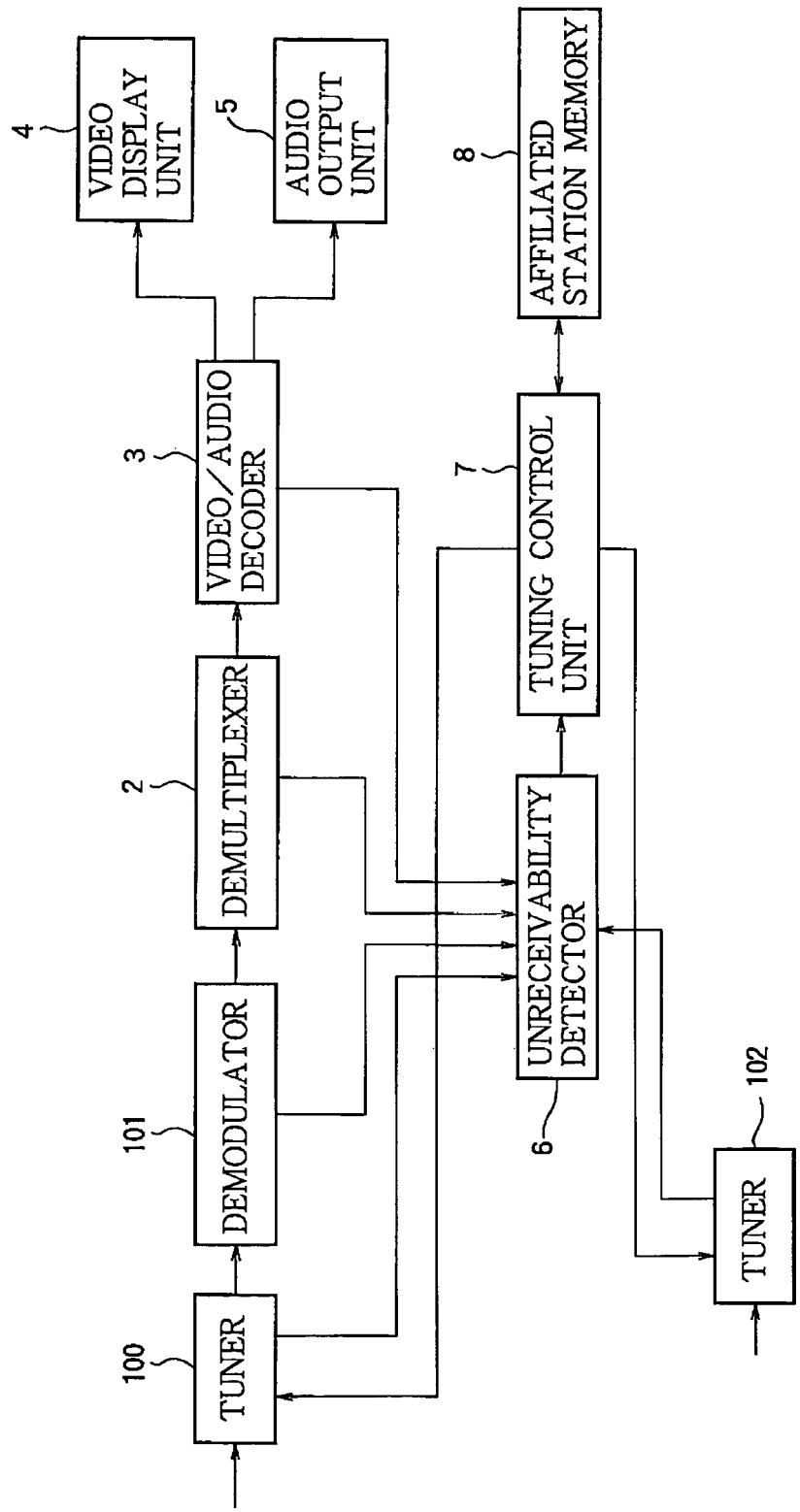
FIG. 19 is a block diagram showing the schematic internal structure of a digital broadcast receiver according to twelfth and thirteenth embodiments of this invention.

FIG. 19 is a block diagram showing the schematic internal structure of a digital broadcast receiver according to a twelfth embodiment of this invention. In FIG. 19, a first tuner 100 and a second tuner 102 receive signals from an antenna separately and extract a signal of a particular frequency. The tuning control unit 7 can control the frequency of the signal to be extracted. The first tuner 100 and the second tuner 102 output receiving level information separately.

A first demodulator 101 performs demodulation and error correction of the signal from the first tuner 100 and outputs a TS. The first demodulator 101 also outputs at least one of receiving C/N information, PLL lock information, frame lock information, and error rate information.

The combination of the first tuner 100 and the first demodulator 101 in FIG. 19 corresponds to the tuner-demodulator 1 in FIG. 1.

When the receiver is used for mobile applications or the like, either or both of the first and second tuners 101, 102 may be a diversity tuner receiving a plurality of antenna outputs with a plurality of tuner sections. When the receiver is used as a fixed receiver for home use or the like, each of the first and second tuners 100, 102 may receive a single antenna output with a single tuner section.

The digital broadcast receiver in this embodiment has almost the same internal structure as in the first embodiment but differs in the following point: this embodiment includes a plurality of tuners, such as first and second tuners 101, 102. The unreceivability detector 6 in this embodiment can receive the information that can be received in the first embodiment and the receiving level information from the second tuner 102. The tuning control unit 7 in this embodiment can control the first tuner 100 and the second tuner 102 to select different broadcasting stations.

The operation of the digital broadcast receiver in this embodiment will now be described. Suppose that the first tuner 100 selects a broadcasting station (broadcasting station A). In this state, the first demodulator 101, demultiplexer 2, video/audio decoder 3, video display unit 4, and audio output unit 5 operate so as to display and output the picture and sound (content) broadcast by broadcasting station A.

Figure 20:
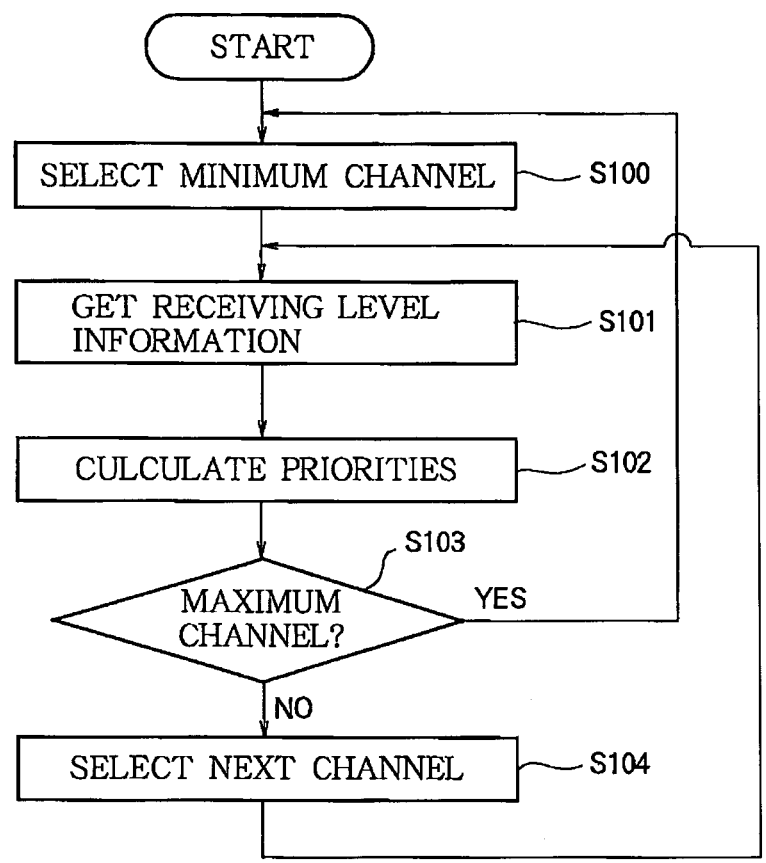
FIG. 20 is a flowchart illustrating the operation performed by the tuning control unit 7 in FIG. 19 using the second tuner 102 in a digital broadcast receiver according to the twelfth embodiment of this invention.

The tuning control unit 7 uses the second tuner 102 to perform the operations illustrated in the flowchart in FIG. 20. First, the second tuner 102 selects the channel having the minimum channel number among the channels used in digital broadcasting (S100). The receiving level information output from the second tuner 102 is recorded in the affiliated station memory 8 or another storage unit (not shown) (S101). From the receiving level information recorded in the affiliated station memory 8 or other storage unit, priorities of the affiliated stations recorded in the affiliated station memory 8 are calculated and recorded in the affiliated station memory 8 (S102). As exemplary priorities, the higher receiving level an affiliated station has, the higher priority it may be given. The channel selected by the second tuner 102 is checked to see whether it has the maximum channel number among the channels used in digital broadcasting (S103). If the channel selected by the second tuner 102 has the maximum channel number (Yes in S103), the second tuner 102 next selects the channel having the minimum channel number among the channels used in digital broadcasting (S100), and proceeds to step S101. If the channel selected by the second tuner 102 does not have the maximum channel number (No in S103), the second tuner 102 selects the next channel (S104) and proceeds to step S101. The operation illustrated in this flowchart is performed continuously to monitor the receiving levels.

Next, suppose that the reception conditions have changed, making it impossible to receive the broadcasting station (broadcasting station A) that was being viewed/listened to. In this state, the unreceivability detector 6 receives output information from the first tuner 100, first demodulator 101, demultiplexer 2, and video/audio decoder 3 and sends an unreceivability notification. The tuning control unit 7 receives the unreceivability notification and performs the operations illustrated in the flowchart in FIG. 21, using the first tuner 100. First it checks whether a broadcasting station in the same affiliation as broadcasting station A is recorded in the affiliated station memory 8 (S110). If one or more broadcasting stations with the same affiliation are recorded (Yes in S110), the first tuner 100 selects a broadcasting station having the highest priority among them (S111). Next, whether the broadcasting station selected by the first demodulator 101 is in a receivable state is checked (S112). If it is in a receivable state (Yes in S112), the process ends. If it is in an unreceivable state (No in S112), whether the broadcasting stations recorded in the affiliated station memory 8 as having the same affiliation as broadcasting station A include a broadcasting station that has not yet been selected is determined (S113). If a broadcasting station with the same affiliation as broadcasting station A is left (Yes in S113), the first tuner 100 selects the broadcasting station having the next high priority (S114) and proceeds to step S112.

If step S110 reveals that no broadcasting station with the same affiliation as broadcasting station A is recorded in the affiliated station memory 8, or if step S113 reveals that no broadcasting station that has not yet been selected is left among the broadcasting stations recorded in the affiliated station memory 8 with the same affiliation as broadcasting station A, the process proceeds to step S115.

In step S115, the first tuner 100 selects the channel having the minimum channel number among the channels used in digital broadcasting. Whether the channel selected by the first tuner 100 is a broadcasting station with the same affiliation as broadcasting station A is determined (S116). If the broadcasting station is in the same affiliation as broadcasting station A (Yes in S116), the channel selected by the first tuner 100 is recorded as an affiliated station of broadcasting station A in the affiliated station memory 8 (S119), and the process proceeds to step S112. If the broadcasting station is not in the same affiliation as broadcasting station A (No in S116), the process proceeds to step S117. In step S117, whether the channel selected by the first tuner 100 has the maximum channel number among the channels used in digital broadcasting is determined. If the channel selected by the first tuner 100 is the channel having the maximum channel number (Yes in S117), the process proceeds to step S115. If the channel selected by the first tuner 100 is not the channel having the maximum channel number (No in S117), the first tuner 100 selects the next channel (S118) and the process proceeds to step S116.

Figure 21:
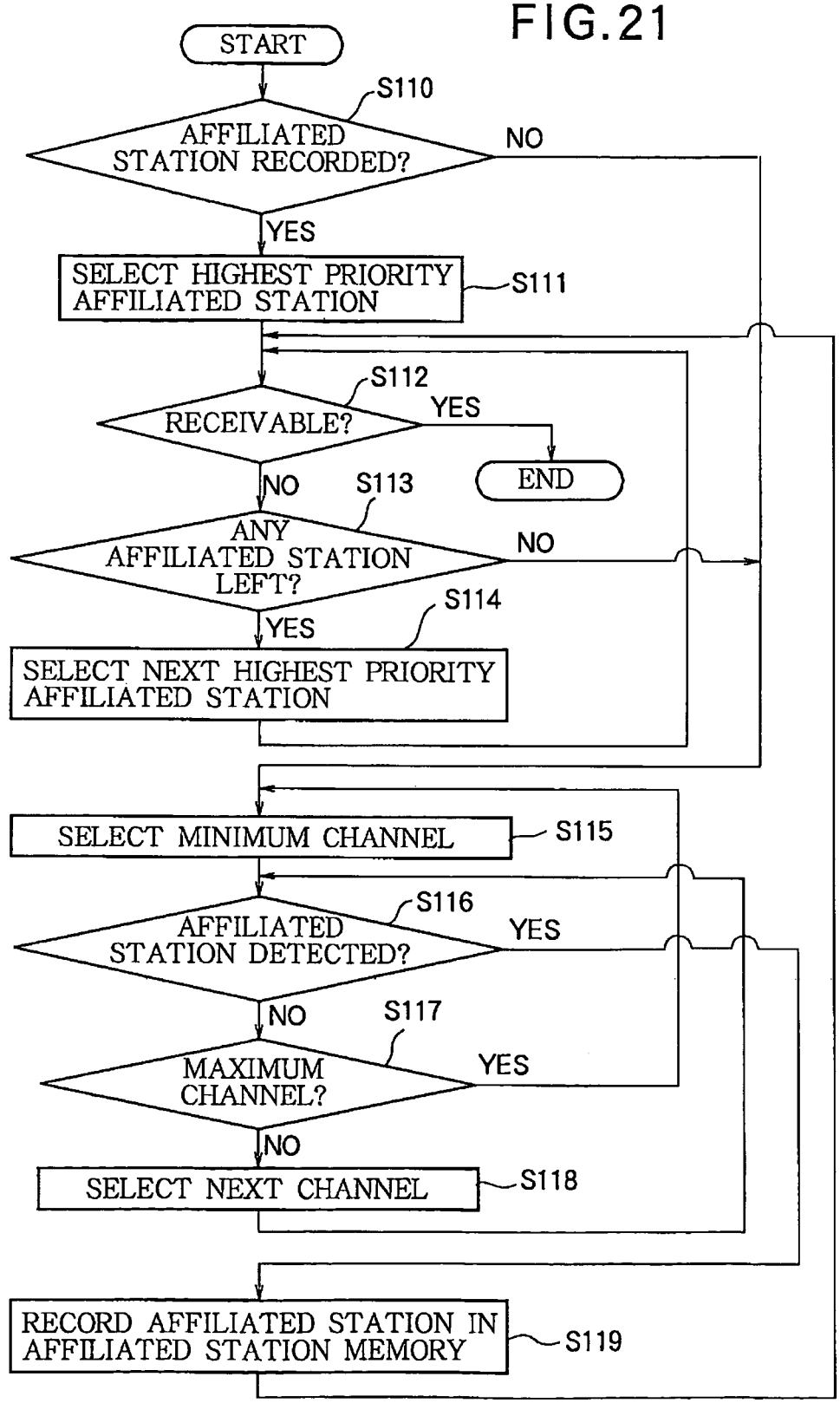
FIG. 21 is a flowchart illustrating the operation performed by the tuning control unit 7 in FIG. 19 using the first tuner 100 when the channel selected by the first tuner 100 in FIG. 19 becomes unreceivable in the digital broadcast receiver according to the twelfth embodiment of this invention.

The affiliated station memory 8 may record both affiliated station channels and MFN channels; priorities may be assigned to both the affiliated station channels and the MFN channels in the flowchart in FIG. 20; if both channels having the same affiliation relationship as broadcasting station A and channels having an MFN relationship with broadcasting station A are recorded in the affiliated station memory 8 in the flowchart in FIG. 21, an MFN channel may be selected preferentially; if no MFN channel can be received, an affiliated station channel may be selected.

In the digital broadcast receiver in the first embodiment, when a plurality of broadcasting stations with the same affiliation as broadcasting station A are recorded in the affiliated station memory 8, information indicating the receiving levels of the broadcasting stations at that point in time is not used as a criterion for selecting one of the broadcasting stations. Therefore, a broadcasting station with unfavorable reception conditions may be selected first. The digital broadcast receiver of the first embodiment uses the values of the service ID to infer adjacent areas, but if the values of the service ID are not used as in FIGS. 5 to 7 (as in DVB digital broadcasting in Europe, for example), the adjacent areas cannot be inferred, increasing the probability of selecting a broadcasting station with unfavorable reception conditions first. The digital broadcast receiver of this embodiment, however, receives the receiving level information and continuously updates the priorities of the affiliated stations in accordance with the receiving level information, increasing the probability of selecting an affiliated station with favorable reception conditions first. Accordingly, when broadcasting station A enters the unreceivable state, a switchover to a broadcasting station with the same affiliation as broadcasting station A can be made more quickly than in the first embodiment. Even when the digital broadcast receiver in this embodiment is used to receive digital broadcasts that do not use the values of the service ID as in FIGS. 5 to 7, if a plurality of broadcasting stations with the same affiliation as broadcasting station A are recorded, the probability of selecting the broadcasting station with the best reception conditions is high.

Thirteenth Embodiment

Figure 22:
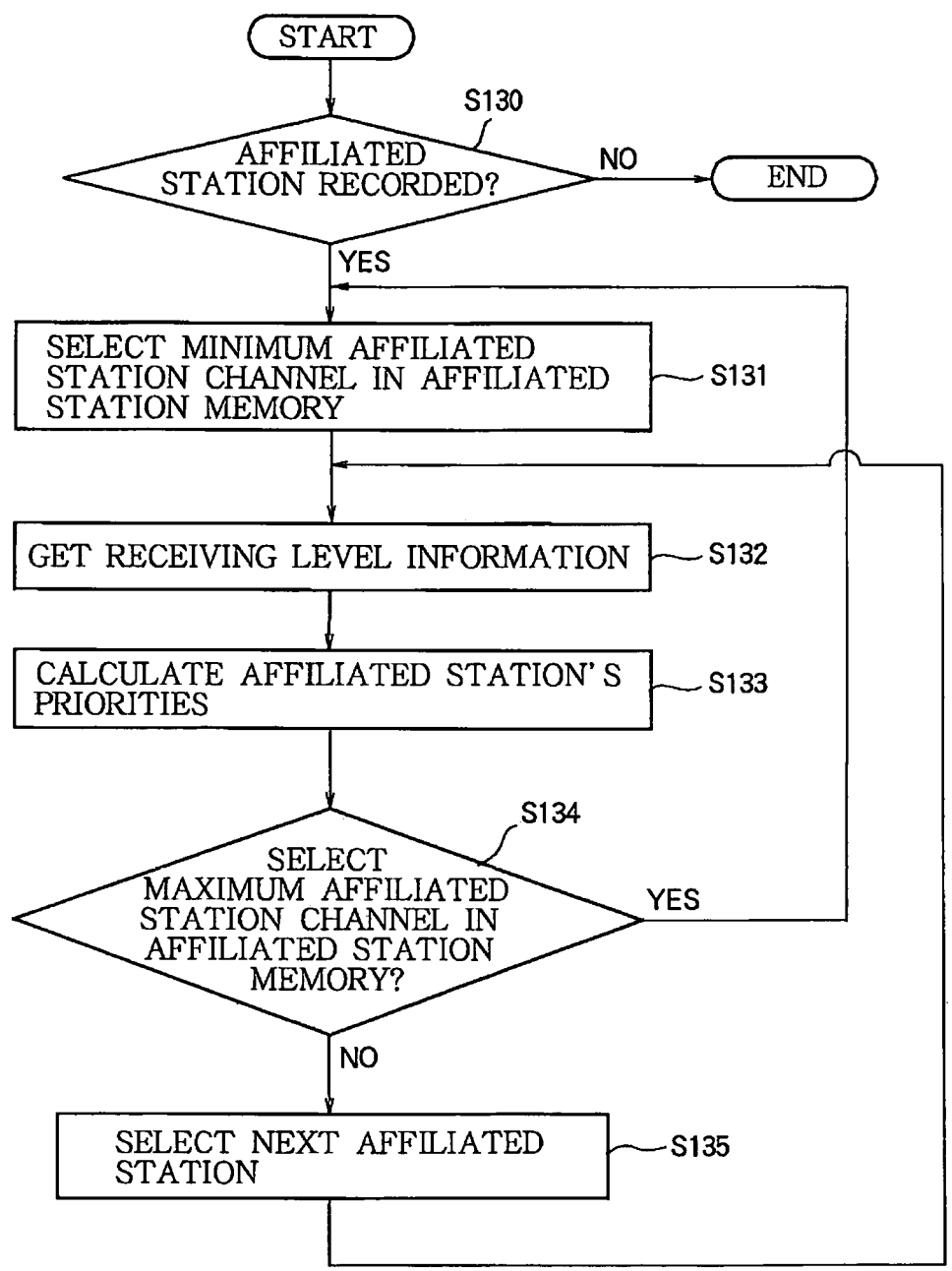
FIG. 22 is a flowchart illustrating the operation performed by the tuning control unit 7 in FIG. 19 using the second tuner 102 in a digital broadcast receiver according to the thirteenth embodiment of this invention.

The structure and operation of a digital broadcast receiver according to the thirteenth embodiment are basically similar to the structure and operation of the digital broadcast receiver according to the twelfth embodiment; only the operations performed by the tuning control unit 7 using the second tuner 102 differ. The difference is that the second tuner 102, which is provided for monitoring receiving levels, does not monitor the receiving levels of all physical channels present in the entire broadcast band as in the twelfth embodiment; it only monitors the broadcasting stations present in the affiliated station memory 8 that have the same affiliation relationship as the broadcasting station that has become unreceivable. A flowchart of the operations performed by the tuning control unit 7 using the second tuner 102 is shown in FIG. 22. First the tuning control unit 7 checks whether or not an affiliated station is recorded in the affiliated station memory 8 (S130). If an affiliated station is recorded (Yes in S130), it proceeds to step S131; if no affiliated station is recorded (No in S130), it terminates processing.

In step S131, the second tuner 102 selects the channel having the minimum channel number among the affiliated stations recorded in the affiliated station memory 8. The receiving level information output from the second tuner 102 is recorded in the affiliated station memory 8 or another storage unit (S132). On the basis of the receiving level information recorded in the affiliated station memory 8, the priorities of the affiliated stations recorded in the affiliated station memory 8 are calculated and recorded in the affiliated station memory 8 (S133). Whether the channel selected by the second tuner 102 is the channel having the maximum channel number among the affiliated stations recorded in the affiliated station memory 8 is checked (S134). If the channel selected by the second tuner 102 is the channel having the maximum channel number (Yes in S134), the second tuner 102 selects the channel having the minimum channel number among the channels recorded in the affiliated station memory 8 (S131) and proceeds to step S132. If the channel selected by the second tuner 102 is not the channel having the maximum channel number (No in S134), the second tuner 102 selects the next affiliated station (S135) and proceeds to step S132. When affiliated stations are recorded in the affiliated station memory 8, the operation illustrated in this flowchart is executed continuously to monitor their receiving levels.

The affiliated station memory 8 may record both affiliated station channels and MFN channels; priorities may be assigned to both the affiliated station channels and the MFN channels in the flowchart in FIG. 22; if both channels having the same affiliation as broadcasting station A and channels having an MFN relationship with broadcasting station A are recorded in the affiliated station memory 8 in the flowchart in FIG. 21, an MFN channel may be selected preferentially; if no MFN channel can be received, an affiliated station channel may be selected.

As described above, the digital broadcast receiver in this embodiment obtains the receiving level information of just the affiliated stations recorded in the affiliated station memory 8 and, in contrast to the twelfth embodiment, does not monitor the receiving levels of unaffiliated broadcasting stations, thereby avoiding unnecessary tuning and monitoring. The appropriately narrowed monitoring group may include a plurality of affiliated stations that can be selected, and all of their receiving levels can be obtained in a short time and can be reflected quickly into the priorities for the selection of the affiliated stations. Therefore, when the reception conditions of broadcasting station A worsen, in comparison with the digital broadcast receiver of the twelfth embodiment, the digital broadcast receiver of this embodiment has a higher probability of selecting the station with the best reception conditions among the broadcasting stations in the same affiliation as broadcasting station A and allows a quicker automatic switchover to an affiliated station.

Fourteenth Embodiment

Figure 23:
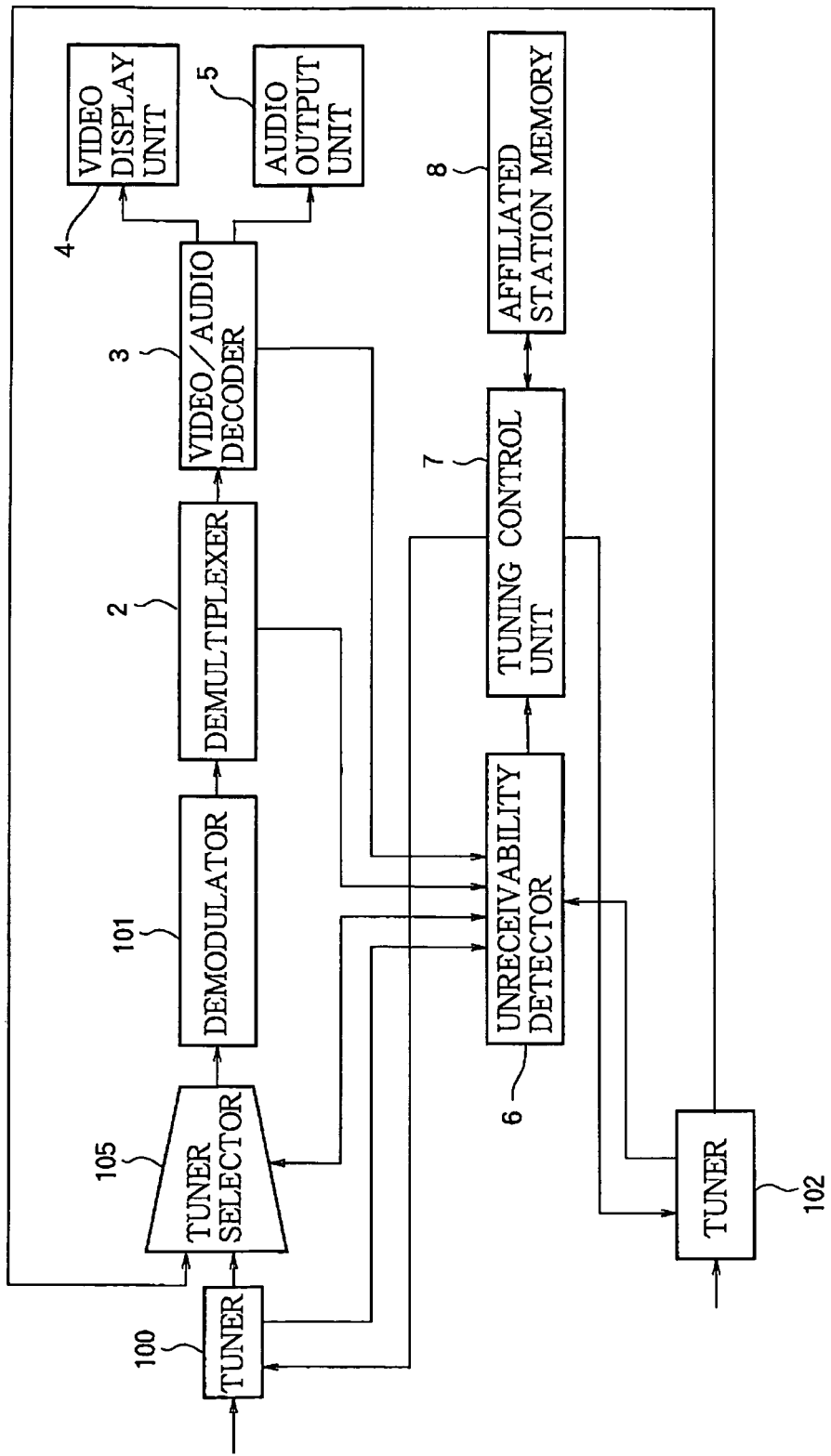
FIG. 23 is a block diagram showing the schematic internal structure of a digital broadcast receiver according to a fourteenth embodiment of this invention.

FIG. 23 is a block diagram showing the schematic internal structure of a digital broadcast receiver according to a fourteenth embodiment of this invention. The internal structure of the digital broadcast receiver in this embodiment is substantially the same as in the twelfth embodiment, but differs in providing a tuner selector 105 and in switching between input of the signal from the first tuner 100 and the signal from the second tuner 102 to the first demodulator 101. When the receiver is used for mobile applications or the like, either or both of the first and second tuners 101, 102 may be a diversity tuner receiving a plurality of antenna outputs with a plurality of tuner sections. When the receiver is used as a fixed receiver for home use or the like, each of the first and second tuners 100, 102 may receive a single antenna output with a single tuner section.

The operation of the digital broadcast receiver in this embodiment will now be described. Suppose that the first tuner 100 selects a broadcasting station (broadcasting station A). In this state, the first demodulator 101, demultiplexer 2, video/audio decoder 3, video display unit 4, and audio output unit 5 operate so as to display and output the picture and sound (content) broadcast by broadcasting station A.

Figure 24:
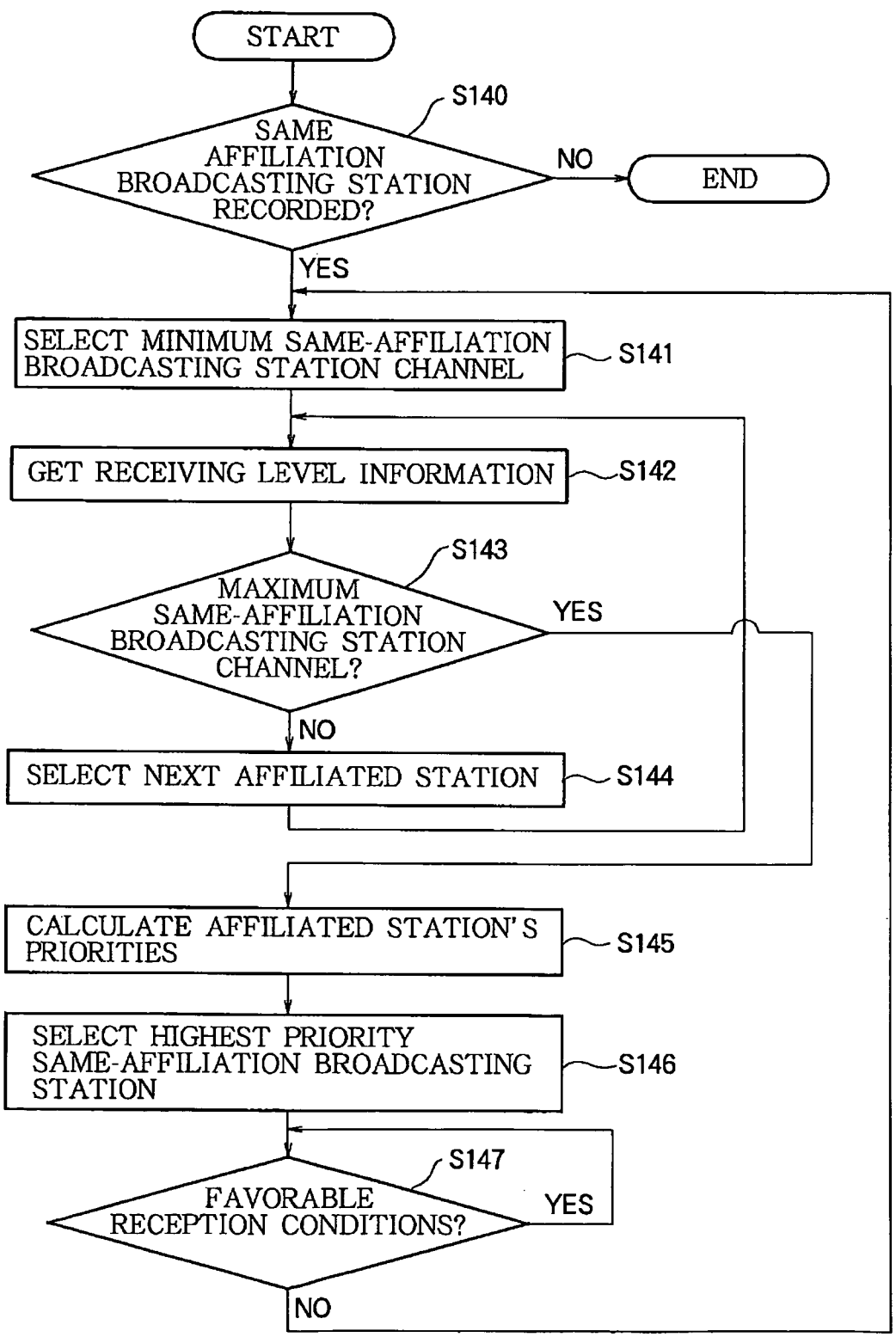
FIG. 24 is a flowchart illustrating the operation performed by the tuning control unit 7 in FIG. 23 using the second tuner 102 in a digital broadcast receiver according to the fourteenth embodiment of this invention.

The tuning control unit 7 uses the second tuner 102 to perform the operations illustrated in the flowchart in FIG. 24. First the affiliated station memory 8 is checked to see whether a broadcasting station with the same affiliation as broadcasting station A is recorded (S140). If a broadcasting station with the same affiliation is present (Yes in S140), the process proceeds to step S141. If there is no broadcasting station with the same affiliation (No in S140), the process ends. In step S141, the second tuner 102 selects the channel having the minimum channel number among the broadcasting stations recorded in the affiliated station memory 8 as having the same affiliation as broadcasting station A. The receiving level information reported from the second tuner 102 is recorded in the affiliated station memory 8 or another storage unit (S142). The channel selected by the second tuner 102 is checked to see whether it has the maximum channel number among the broadcasting stations recorded in the affiliated station memory 8 with the same affiliation as broadcasting station A (S143). If the channel selected by the second tuner 102 is the channel having the maximum channel number (Yes in S143), the process proceeds to step S145. If the channel selected by the second tuner 102 is not the channel having the maximum channel number (No in S143), the next affiliated station is selected (S144), and the process proceeds to step S142.

In step S145, from the receiving level information recorded in the affiliated station memory 8 or other storage unit, priorities of the broadcasting stations with the same affiliation as broadcasting station A are calculated and recorded in the affiliated station memory 8. The broadcasting station having the highest priority among the broadcasting stations with the same affiliation as broadcasting station A is selected, and the second tuner 102 then selects that broadcasting station (S146). The receiving level information output from the second tuner 102 is obtained, and whether the reception conditions of the second tuner 102 are favorable is determined (S147). If the reception conditions are favorable (Yes in S147), the process proceeds to step S147, not allowing the second tuner 102 to select another channel until the reception conditions worsen. If the reception conditions are unfavorable (No in S147), the process proceeds to step S141.

Next, suppose that the reception conditions have changed, making it impossible to receive the broadcasting station (broadcasting station A) that was being viewed/listened to. In this state, the tuning control unit 7 decides whether the second tuner 102 has selected an affiliated station of broadcasting station A (whether the Yes state in S147 is maintained). If the second tuner 102 has selected an affiliated station of broadcasting station A, the tuner selector 105 is controlled to change the input signal to the first demodulator 101 from the first tuner 100 to the second tuner 102, and the roles of the first tuner 100 and second tuner 102 are exchanged thereafter. If the second tuner 102 has not selected an affiliated station of broadcasting station A, the operation of searching for an affiliated station is performed as in the first embodiment.

While the first demodulator 101 is performing demodulation and error correction of the output signal from one tuner (100, for example) among the first and second tuners 100, 102, the tuning control unit 7 assigns priorities to the affiliated stations recorded in the affiliated station memory 8 by using the signal of the other tuner (102) among the first and second tuners. When the broadcasting station selected by the former tuner (100) becomes unviewable/unlistenable, if the broadcasting station selected by the latter tuner (102) is viewable/listenable, the roles of the first and second tuners 100, 102 are exchanged.

If the affiliated station memory 8 records both the channels of affiliated stations and MFN channels and if both a channel with the same affiliation as broadcasting station A and a channel having an MFN relationship with broadcasting station A are recorded in the affiliated station memory 8 in the flowchart in FIG. 24, the MFN channel may be selected preferentially, and when no MFN channel can be received, an affiliated station channel may be selected.

In the digital broadcast receiver of the twelfth embodiment, when a broadcasting station with the same affiliation as broadcasting station A is selected because the reception conditions of broadcasting station A have worsened, it takes some time for the first tuner 100 to tune to the frequency of a broadcasting station with the same affiliation as broadcasting station A, consequently taking some time to display and output the picture and sound (content) of a broadcasting station with the same affiliation as broadcasting station A. In the digital broadcast receiver of the present embodiment, however, if the reception conditions of broadcasting station A worsen, when a broadcasting station with the same affiliation as broadcasting A is selected, it is likely that the tuner other than the tuner which has selected broadcasting station A has already selected a broadcasting station with the same affiliation as broadcasting station A. Then it is only necessary for the tuner selector 105 to switch the signal received by the demodulator from the first tuner 100 to the second tuner 102, and the time needed to have the tuner select the frequency of a broadcasting station with the same affiliation as broadcasting station A can be eliminated. Therefore, when a broadcasting station with the same affiliation as broadcasting station A needs to be selected because of worsened reception conditions of digital broadcasting station A, the digital broadcast receiver of this embodiment can greatly shorten the time required to display and output the picture and sound (content) of a broadcasting station with the same affiliation as broadcasting station A, in comparison with the digital broadcast receiver of the twelfth embodiment.

Fifteenth Embodiment

Figure 25:
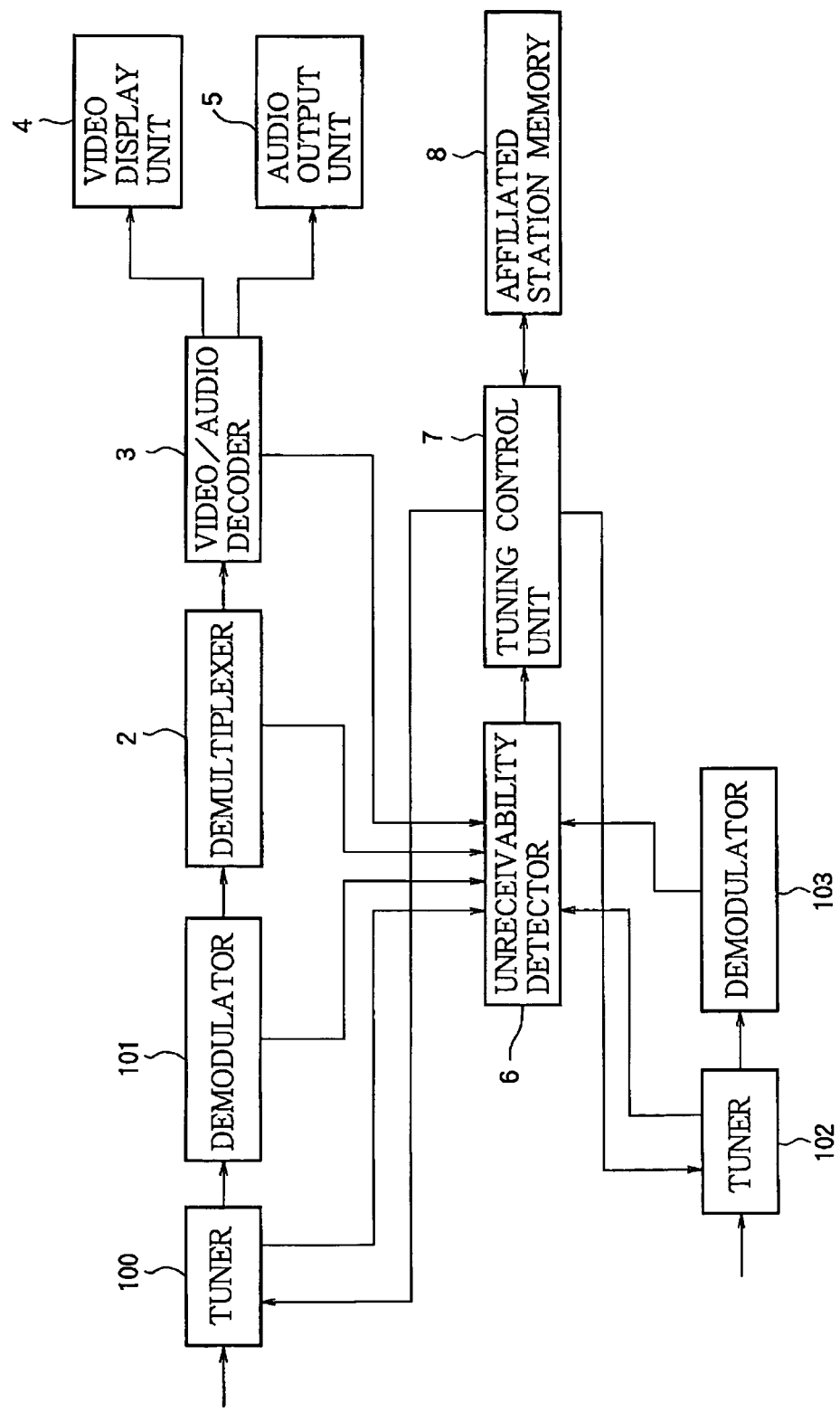
FIG. 25 is a block diagram showing the schematic internal structure of a digital broadcast receiver according to fifteenth and sixteenth embodiments of this invention.

FIG. 25 is a block diagram showing the schematic internal structure of a digital broadcast receiver according to a fifteenth embodiment of this invention. The internal structure of the digital broadcast receiver in this embodiment is substantially the same as in the twelfth embodiment, but differs in the following point: this embodiment includes a plurality of demodulators, such as first and second demodulators 101, 103. The unreceivability detector 6 in this embodiment can receive the information that can be received in the twelfth embodiment and at least one of receiving C/N ratio information, PLL lock information, frame lock information, and error rate information output from the second demodulator 103. When the receiver is used for mobile applications or the like, either or both of the first and second tuners 100, 102 may be a diversity tuner receiving a plurality of antenna outputs with a plurality of tuner sections. When the receiver is used as a fixed receiver for home use or the like, each of the first and second tuners 100, 102 may receive a single antenna output with a single tuner section.

The operation of the digital broadcast receiver in this embodiment is substantially the same as in the twelfth embodiment, but differs in the following points: in this embodiment, the operation in step S101 in FIG. 20 is to record at least one of the receiving level information output from the second tuner 102 and the receiving C/N information, PLL lock information, frame lock information, and error rate information output from the second demodulator 103 in the affiliated station memory 8 or another storage unit; the operation in step S102 is to calculate priorities by using at least one of the receiving level information, receiving C/N information, PLL lock information, frame lock information, and error rate information. The operation illustrated in the flowchart in FIG. 20 is executed continuously to monitor the receiving levels.

The affiliated station memory 8 may record both affiliated station channels and MFN channels; priorities may be assigned to both the affiliated station channels and the MFN channels in the flowchart in FIG. 20; if both channels having the same affiliation relationship as broadcasting station A and channels having an MFN relationship with broadcasting station A are recorded in the affiliated station memory 8 in the flowchart in FIG. 21, an MFN channel may be selected preferentially; if no MFN channel can be received, an affiliated station channel may be selected.

Since the digital broadcast receiver in the twelfth embodiment calculates priorities just from the receiving level information, the presence of a signal (of analog broadcasting or noise, for example) other than digital broadcasting may raise the receiving level and could consequently raise the station selection priority even in the absence of a digital broadcast signal. However, the digital broadcast receiver in this embodiment can use the receiving level information, receiving C/N information, PLL lock information, frame lock information, and error rate information in the calculation of priorities and can accordingly determine whether the channel is carrying a digital broadcast. Accordingly, the priority of a channel having a high receiving level due to a factor other than digital broadcasting can be lowered. Therefore, when the reception conditions of digital broadcasting station A worsen, in comparison with the digital broadcast receiver of the twelfth embodiment, the digital broadcast receiver in this embodiment has a higher probability of first selecting the broadcasting station with the most favorable reception conditions among the broadcasting stations with the same affiliation as broadcasting station A.

Sixteenth Embodiment

The internal structure of the digital broadcast receiver in the sixteenth embodiment is the same as in the fifteenth embodiment. The operation of the digital broadcast receiver in this embodiment is substantially the same as in the thirteenth embodiment, but differs in the following point: in this embodiment, the operation in step S132 in FIG. 22 is to record at least one of the receiving level information output from the second tuner 102 and the receiving C/N information, PLL lock information, frame lock information, and error rate information output from the second demodulator 103 in the affiliated station memory 8 or another storage unit; the operation in step S133 is to calculate priorities by using at least one of the receiving level information, receiving C/N information, PLL lock information, frame lock information, and error rate information. When affiliated stations are recorded in the affiliated station memory 8, the operation illustrated in the flowchart in FIG. 22 is executed continuously to monitor the receiving levels.

The affiliated station memory 8 may record both affiliated station channels and MFN channels; priorities may be assigned to both the affiliated station channels and the MFN channels in the flowchart in FIG. 22; if both channels having the same affiliation relationship as broadcasting station A and channels having an MFN relationship with broadcasting station A are recorded in the affiliated station memory 8 in the flowchart in FIG. 21, an MFN channel may be selected preferentially; if no MFN channel can be received, an affiliated station channel may be selected.

Since the digital broadcast receiver in the thirteenth embodiment calculates priorities just from the receiving level information, the presence of a signal (of analog broadcasting or noise, for example) other than digital broadcasting may raise the receiving level and could consequently raise the station selection priority even in the absence of a digital broadcast signal. However, the digital broadcast receiver in this embodiment can use the receiving level information, receiving C/N information, PLL lock information, frame lock information, and error rate information in the calculation of priorities and can accordingly determine whether the channel is carrying a digital broadcast. Accordingly, the priority of a channel having a high receiving level due to a factor other than digital broadcasting can be lowered. Therefore, when the reception conditions of broadcasting station A worsen, in comparison with the digital broadcast receiver in the thirteenth embodiment, the digital broadcast receiver in this embodiment has a higher probability of first selecting the broadcasting station with the most favorable reception conditions among the broadcasting stations with the same affiliation as broadcasting station A.

Seventeenth Embodiment

Figure 26:
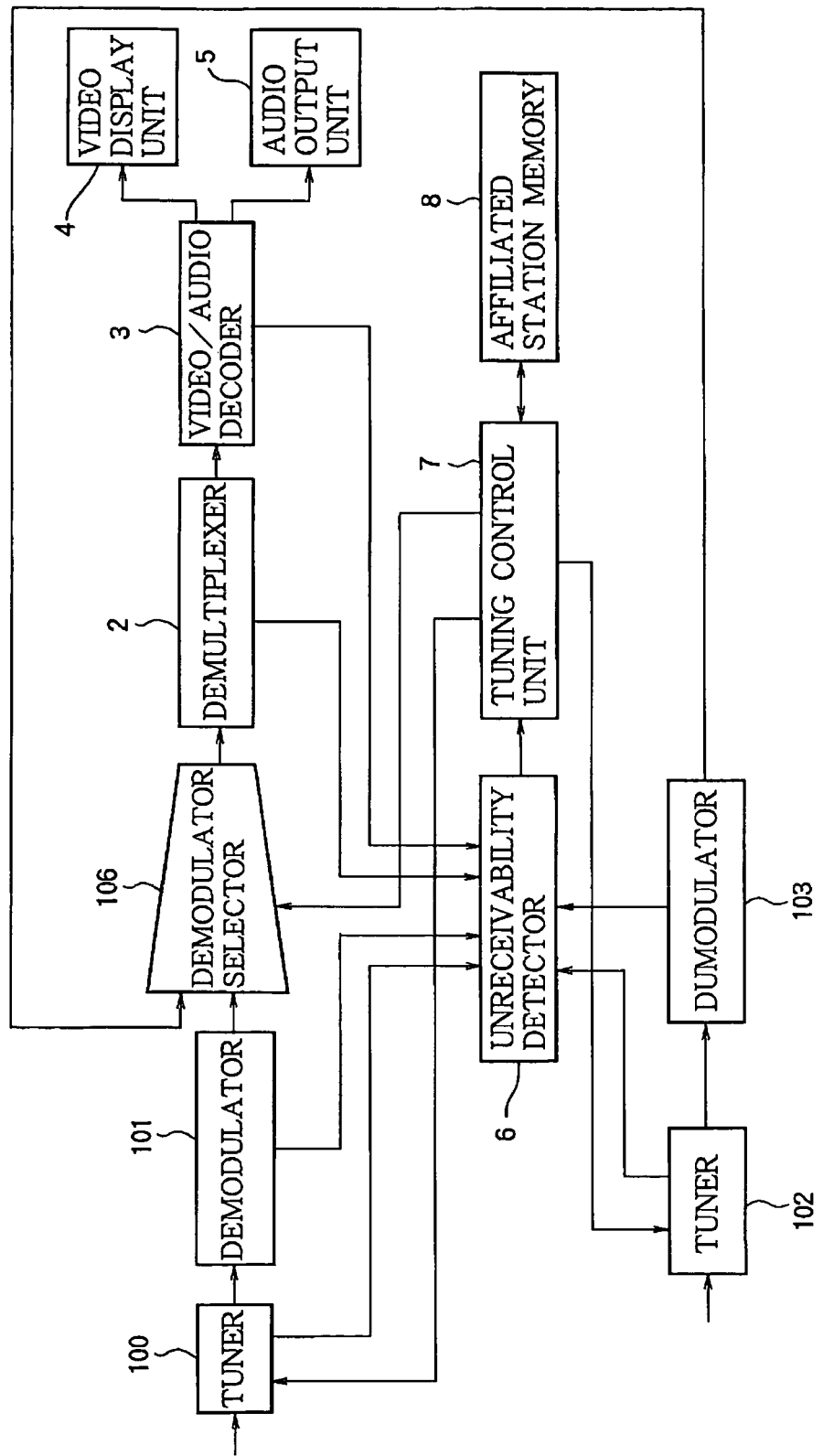
FIG. 26 is a block diagram showing the schematic internal structure of a digital broadcast receiver according to a seventeenth embodiment of this invention.

FIG. 26 is a block diagram showing the schematic internal structure of a digital broadcast receiver according to a seventeenth embodiment of this invention. The internal structure of the digital broadcast receiver in this embodiment is substantially the same as in the fourteenth embodiment, but differs in the following point: this embodiment includes a plurality of demodulators, such as first and second demodulators 101, 103. The unreceivability detector 6 in this embodiment can receive the information that can be received in the fourteenth embodiment and at least one of receiving C/N ratio information, PLL lock information, frame lock information, and error rate information output from the second demodulator 103. This embodiment also provides a demodulator selector 106 and switches between input of the signal from the first demodulator 101 and the signal from the second demodulator 103 to the demultiplexer 2. When the receiver is used for mobile applications or the like, either or both of the first and second tuners 100, 102 may be a diversity tuner receiving a plurality of antenna outputs with a plurality of tuner sections. When the receiver is used as a fixed receiver for home use or the like, each of the first and second tuners 100, 102 may receive a single antenna output with a single tuner section.

The operation of the digital broadcast receiver in this embodiment is substantially the same as in the fourteenth embodiment, but differs in the following points: in this embodiment, the operation in step S142 in FIG. 24 is to record at least one of the receiving level information output from the second tuner 102 and the receiving C/N information, PLL lock information, frame lock information, and error rate information output from the second demodulator 103 in the affiliated station memory 8 or another storage unit; the operation in step S145 is to calculate priorities by using at least one of the receiving level information, receiving C/N information, PLL lock information, frame lock information, and error rate information; the operation in step S147 is to determine whether the receiving conditions are favorable by using at least one of the receiving level information, receiving C/N information, PLL lock information, frame lock information, and error rate information; and the operation performed when a broadcasting station (broadcasting station A) that was being viewed/listened to becomes unreceivable is to control the demodulator selector 106 to switch the input signal to the demultiplexer 2 from the first demodulator 101 to the second demodulator 103.

While the demultiplexer 2 is receiving the output of a demodulator (101, for example) which performs demodulation and error correction of the output signal from one tuner (100, for example) among the first and second tuners 100, 102, the tuning control unit 7 assigns priorities to the affiliated stations recorded in the affiliated station memory 8 by using the signal of either the other tuner (102) among the first and second tuners or the demodulator (103) which performs demodulation and error correction of the output signal from the tuner (102). When the broadcasting station selected by the former tuner (100) becomes unviewable/unlistenable, if the broadcasting station selected by the Latter tuner (102) is viewable/listenable, the roles of the first and second tuners (100, 102) and the first and second demodulators (101, 103) are exchanged.

The affiliated station memory 8 may record both affiliated station channels and MFN channels; if both channels having the same affiliation relationship as broadcasting station A and channels having an MFN relationship with broadcasting station A are recorded in the affiliated station memory 8 in the flowchart in FIG. 24, an MFN channel may be selected preferentially; if no MFN channel can be received, an affiliated station channel may be selected.

Since the digital broadcast receiver in the fourteenth embodiment calculates priorities just from the receiving level information, the presence of a signal (analog broadcasting or noise, for example) other than digital broadcasting may raise the receiving level and could consequently raise the station selection priority even in the absence of a digital broadcast signal. However, the digital broadcast receiver in this embodiment can use the receiving level information, receiving C/N information, PLL lock information, frame lock information, and error rate information in the calculation of priorities and can accordingly determine whether the channel is carrying a digital broadcast. Accordingly, the priority of a channel having a high receiving level due to a factor other than digital broadcasting can be lowered. Therefore, in comparison with the digital broadcast receiver of the fourteenth embodiment, with the digital broadcast receiver in this embodiment there is a higher probability that the second tuner 102 will select the broadcasting station with the most favorable reception conditions among the broadcasting stations with the same affiliation as broadcasting station A. When the digital broadcast receiver of the fourteenth embodiment switches from broadcasting station A to a broadcasting station with the same affiliation as broadcasting station A, it takes some time for the first demodulator 101 to output a TS of the broadcasting station with the same affiliation as broadcasting station A after it starts receiving the signal of the broadcasting station with the same affiliation as broadcasting station A from the tuner, consequently taking some time to display and output the picture and sound (content) of the broadcasting station with the same affiliation as broadcasting station A. However, when the digital broadcast receiver of this embodiment switches from broadcasting station A to a broadcasting station with the same affiliation as broadcasting station A, the demodulator selector 106 only has to switch the signal to be received by the demultiplexer 2 from the signal from the first demodulator 101 to the already demodulated output of the second demodulator 103. This can eliminate the time from when the demodulator starts receiving the signal of the broadcasting station with the same affiliation as broadcasting station A from the tuner section until the TS of the broadcasting station with the same affiliation as broadcasting station A is output. Therefore, the digital broadcast receiver in this embodiment can shorten the time needed to display and output the picture and sound (content) of the broadcasting station with the same affiliation as broadcasting station A, in comparison with the digital broadcast receiver of the fourteenth embodiment.

Eighteenth Embodiment

Figure 27:
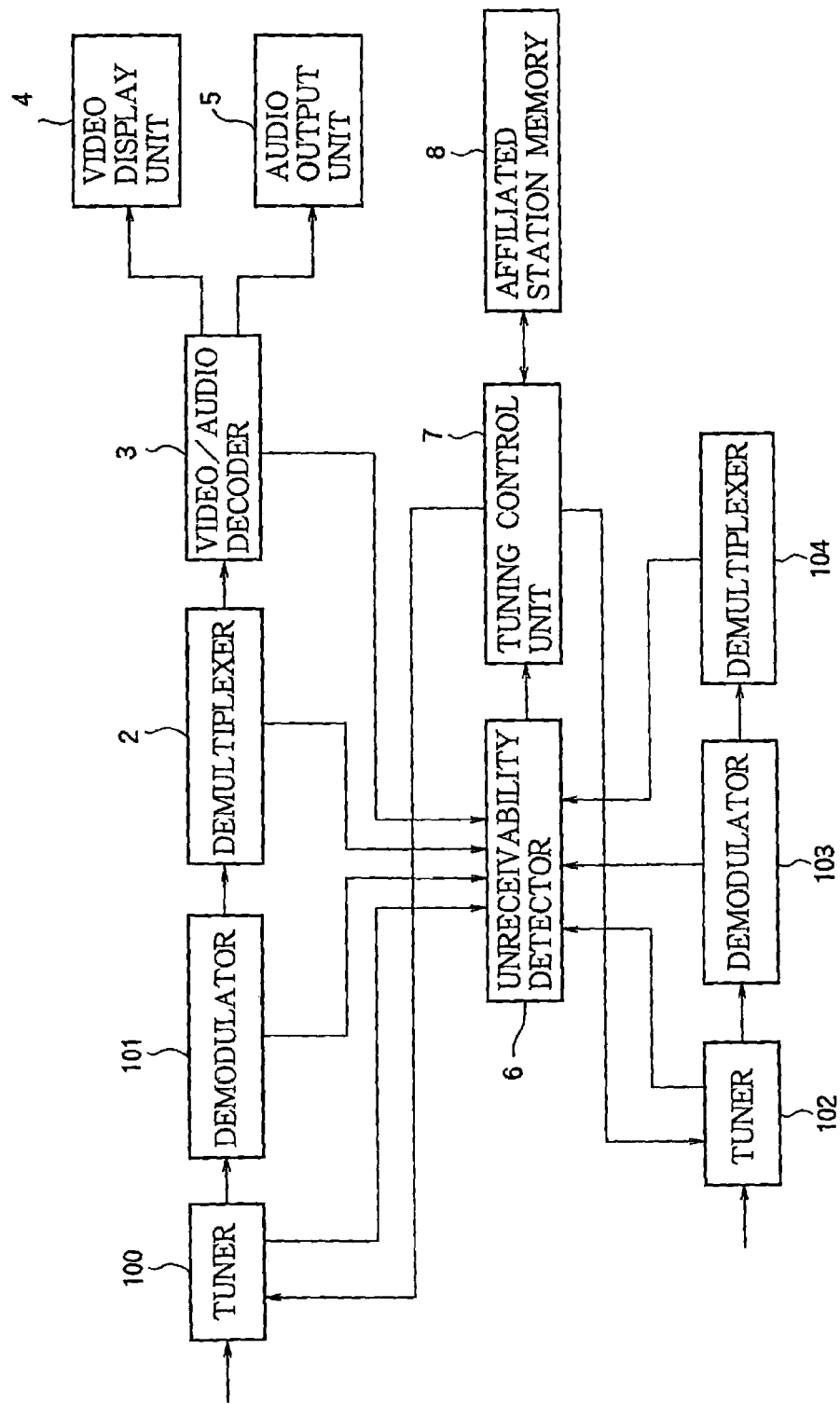
FIG. 27 is a block diagram showing the schematic internal structure of a digital broadcast receiver according to eighteenth and nineteenth embodiments of this invention.
Figure 28:
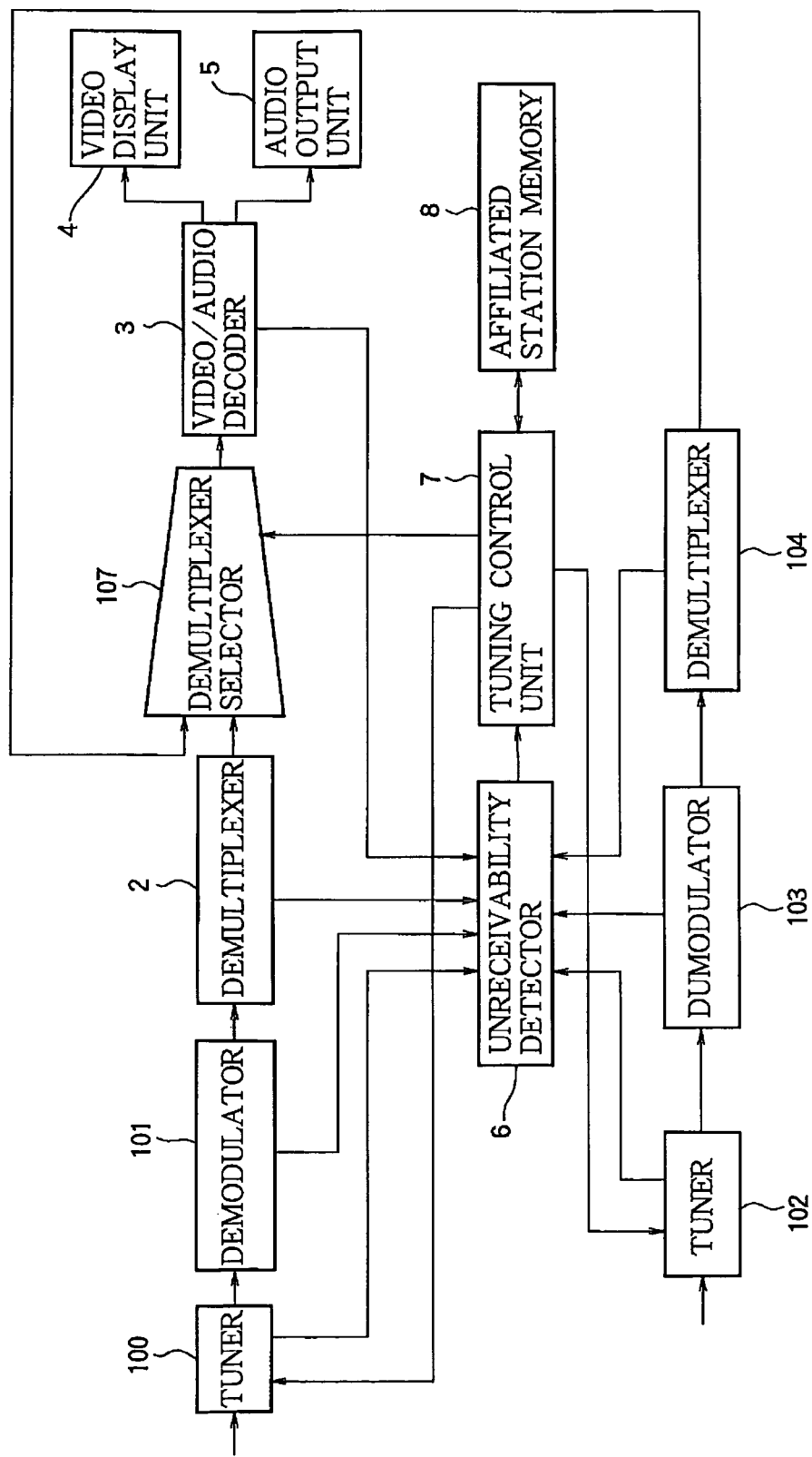
FIG. 28 is a block diagram showing the schematic internal structure of a digital broadcast receiver according to a twentieth embodiment of this invention.

FIG. 27 is a block diagram showing the schematic internal structure of a digital broadcast receiver according to an eighteenth embodiment of this invention. The internal structure of the digital broadcast receiver in this embodiment is substantially the same as in the fifteenth embodiment, but differs in the following point: this embodiment includes a plurality of demultiplexers, such as first and second demultiplexers 2, 104. The unreceivability detector 6 in this embodiment can receive the information that can be received in the fifteenth embodiment and can also receive at least one of PSI/SI information, the interruption notification when PATs fail to arrive at the prescribed time intervals, the interruption notification when PMTs fail to arrive at the prescribed time intervals, the loss of synchronization notification when synchronization bytes are not detected in the TS at intervals of 188 bytes, and the packet loss notification when a discontinuity is detected in continuity counter values included in the TS packet headers, output from the second demultiplexer 104. When the receiver is used for mobile applications or the like, either or both of the first and second tuners 100, 102 may be a diversity receiver receiving a plurality of antenna outputs with a plurality of tuner sections. When the receiver is used as a fixed receiver for home use or the like, each of the first and second tuners 100, 102 may receive a single antenna output with a single tuner section.

The operation of the digital broadcast receiver in this embodiment is substantially the same as in the fifteenth embodiment, but differs in the following point: in this embodiment, the operation in step S101 in FIG. 20 is to record at least one of the receiving level information output from the second tuner 102, the receiving C/N information, PLL lock information, frame lock information, and error rate information output from the second demodulator 103, and the PSI/SI information, the interruption notification when PATs fail to arrive at their prescribed time intervals, the interruption notification when PMTs fails to arrive at their prescribed time intervals, the loss of synchronization notification when synchronization bytes are not detected in the TS at intervals of 188 bytes, and the packet loss notification when a discontinuity is detected in continuity counter values included in the TS packet headers output from the second demultiplexer 104 in the affiliated station memory 8 or another storage unit; the operation in step S102 is to calculate priorities by using at least one of the receiving level information, receiving C/N information, PLL lock information, frame lock information, error rate information, PSI/SI information, the interruption notification when PATs fail to arrive at their prescribed time intervals, the interruption notification when PMTs fail to arrive at their prescribed time intervals, the loss of synchronization notification when synchronization bytes are not detected in the TS at intervals of 188 bytes, and the packet loss notification when a discontinuity is detected in continuity counter values included in the TS packet headers. The operation illustrated in the flowchart in FIG. 20 is executed continuously to monitor the receiving levels.

The affiliated station memory 8 may record both affiliated station channels and MFN channels; priorities may be assigned to both the affiliated station channels and the MFN channels in the flowchart in FIG. 20; if both channels having the same affiliation relationship as broadcasting station A and channels having an MFN relationship with broadcasting station A are recorded in the affiliated station memory 8 in the flowchart in FIG. 21, an MFN channel may be selected preferentially; if no MFN channel can be received, an affiliated station channel may be selected.

The digital broadcast receiver in the fifteenth embodiment may assign a high priority to a broadcasting station not in the same affiliation as broadcasting station A, because it does not use the PSI/SI information in the calculation of priorities. The digital broadcast receiver in this embodiment, however, can use the PSI/SI information in the calculation of priorities and can consequently assign low priorities to broadcasting stations not in the same affiliation as broadcasting station A. Therefore, when the reception conditions of broadcasting station A worsen, in comparison with the digital broadcast receiver of the fifteenth embodiment, the digital broadcast receiver in this embodiment has a higher probability of first selecting the broadcasting station with the most favorable reception conditions among the broadcasting stations with the same affiliation as broadcasting station A.

Nineteenth Embodiment

The internal structure of a digital broadcast receiver according to the nineteenth embodiment is the same as in the eighteenth embodiment. The operation of the digital broadcast receiver in this embodiment is substantially the same as in the sixteenth embodiment, but differs in the following point: in this embodiment, the operation in step S132 in FIG. 22 is to record at least one of the receiving level information output from the second tuner 102, the receiving C/N information, PLL lock information, frame lock information, and error rate information output from the second demodulator 103, and the PSI/SI information, the interruption notification when PATs fail to arrive at their prescribed time intervals, the interruption notification when PMTs fail to arrive at their prescribed time intervals, the loss of synchronization notification when synchronization bytes are not detected in the TS at intervals of 188 bytes, and the packet loss notification when a discontinuity is detected in continuity counter values included in the TS packet headers output from the second demultiplexer 104 in the affiliated station memory 8 or another storage unit; the operation in step S133 is to calculate priorities by using at least one of the receiving level information, receiving C/N information, PLL lock information, frame lock information, error rate information, PSI/SI information, the interruption notification when PATs fail to arrive at their prescribed time intervals, the interruption notification when PMTs fail to arrive at their prescribed time intervals, the loss of synchronization notification when synchronization bytes are not detected in the TS at intervals of 188 bytes, and the packet loss notification when a discontinuity is detected in the continuity counter values included in the TS packet headers. If affiliated stations are recorded in the affiliated station memory 8, the operation illustrated in the flowchart in FIG. 22 is executed continuously to monitor the receiving levels.

The affiliated station memory 8 may record both affiliated station channels and MFN channels; priorities may be assigned to both the affiliated station channels and the MFN channels in the flowchart in FIG. 22; if both channels having the same affiliation relationship as broadcasting station A and channels having an MFN relationship with broadcasting station A are recorded in the affiliated station memory 8 in the flowchart in FIG. 21, an MFN channel may be selected preferentially; if no MFN channel can be received, an affiliated station channel may be selected.

The digital broadcast receiver in the sixteenth embodiment may assign a high priority to a broadcasting station not in the same affiliation as broadcasting station A, because it does not use the PSI/SI information in the calculation of priorities. The digital broadcast receiver in this embodiment, however, can use the PSI/SI information in the calculation of priorities and can consequently assign low priorities to broadcasting stations not in the same affiliation as broadcasting station A. Therefore, in comparison with the digital broadcast receiver of the sixteenth embodiment, when the reception conditions of broadcasting station A worsen, the digital broadcast receiver in this embodiment has a higher probability of first selecting the broadcasting station with the most favorable reception conditions among the broadcasting stations with the same affiliation as broadcasting station A.

Twentieth Embodiment

FIG. 2B is a block diagram showing the schematic internal structure of a digital broadcast receiver according to a twentieth embodiment of this invention. The internal structure of the digital broadcast receiver in this embodiment is substantially the same as in the seventeenth embodiment, but differs in the following point: this embodiment includes a plurality of demultiplexers, such as first and second demultiplexers 2, 104. The unreceivability detector 6 in this embodiment can receive the information that can be received in the seventeenth embodiment and can receive at least one of PSI/SI information, the interruption notification when PATs fail to arrive at their prescribed time intervals, the interruption notification when PMTs fail to arrive at their prescribed time intervals, the loss of synchronization notification when synchronization bytes are not detected in the TS at intervals of 188 bytes, and the packet loss notification when a discontinuity is detected in continuity counter values included in the TS packet headers. This embodiment also provides a demultiplexer selector 107 and switches between input of the signal from the first demultiplexer 2 and the signal from the second demultiplexer 104 to the video/audio decoder 3.

The operation of the digital broadcast receiver in this embodiment is substantially the same as in the seventeenth embodiment, but differs in the following points: in this embodiment, the operation in step S142 in FIG. 24 is to record at least one of the receiving level information output from the second tuner 102, the receiving C/N information, PLL lock information, frame lock information, and error rate information output from the second demodulator 103, and the PSI/SI information, the interruption notification when PATs fail to arrive at their prescribed time intervals, the interruption notification when PMTs fail to arrive at their prescribed time intervals, the loss of synchronization notification when synchronization bytes are not detected in the TS at intervals of 188 bytes, and the packet loss notification when a discontinuity is detected in continuity counter values included in the TS packet headers output from the second demultiplexer 104 in the affiliated station memory 8 or another storage unit; the operation in step S145 is to calculate priorities by using at least one of the receiving level information, receiving C/N information, PLL lock information, frame lock information, error rate information, PSI/SI information, the interruption notification when PATs fail to arrive at their prescribed time intervals, the interruption notification when PMTs fail to arrive at their prescribed time intervals, the loss of synchronization notification when synchronization bytes are not detected in the TS at intervals of 188 bytes, and the packet loss notification when a discontinuity is detected in continuity counter values included in the TS packet headers; the operation in step S147 is to determine whether the receiving conditions are favorable by using at least one of the receiving level information, receiving C/N information, PLL lock information, frame lock information, error rate information, PST/SI information, the interruption notification when PATs fail to arrive at their prescribed time intervals, the interruption notification when PMTs fail to arrive at their prescribed time intervals, the loss of synchronization notification when synchronization bytes are not detected in the TS at intervals of 188 bytes, and the packet loss notification when a discontinuity is detected in continuity counter values included in the TS packet headers; and the operation performed when a broadcasting station (broadcasting station A) that was being viewed/listened to becomes unreceivable is to control the demultiplexer selector 107 to switch the input to the video/audio decoder 3 from the signal from the first demultiplexer 2 to the signal from the second demultiplexer 104.

While the video/audio decoder 3 is receiving the output of a demultiplexer (2) which receives the output of a demodulator (101) for performing demodulation and error correction of the output signal from one tuner (100, for example) among the first and second tuners 100, 102, the tuning control unit 7 assigns priorities to the affiliated stations recorded in the affiliated station memory 8 by using the signal of the other tuner (102) among the first and second tuners 100, 102, the demodulator (103) which performs demodulation and error correction of the output signal from that tuner (102), or the demultiplexer (104) which receives the output of that demodulator (103). When the broadcasting station selected by the former tuner (100) becomes unviewable/unlistenable, if the broadcasting station selected by the latter tuner (102) is viewable/listenable, the roles of the first and second tuners (100, 102), the first and second demodulators (101, 103), and the first and second demultiplexers (2, 104) are exchanged.

The affiliated station memory 8 may record both affiliated station channels and MFN channels; if both channels having the same affiliation relationship as broadcasting station A and channels having an MFN relationship with broadcasting station A are recorded in the affiliated station memory 8 in the flowchart in FIG. 24, an MFN channel may be selected preferentially; if no MFN channel can be received, an affiliated station channel may be selected.

The digital broadcast receiver in the seventeenth embodiment may assign a high priority to a broadcasting station not in the same affiliation as broadcasting station A, because it does not use the PSI/SI information in the calculation of priorities. The digital broadcast receiver in the present embodiment, however, can use the PSI/SI information in the calculation of priorities and can consequently assign low priorities to broadcasting stations not in the same affiliation as broadcasting station A. Therefore, with the digital broadcast receiver in this embodiment there is a higher probability that the second tuner 102 will select the broadcasting station with the most favorable reception conditions among the broadcasting stations with the same affiliation as broadcasting station A, in comparison with the digital broadcast receiver of the seventeenth embodiment. When the digital broadcast receiver of the seventeenth embodiment switches from broadcasting station A to a broadcasting station with the same affiliation as broadcasting station A, it takes some time for the first demultiplexer 2 to demultiplex a TS of the broadcasting station with the same affiliation as broadcasting station A after it starts receiving the TS of the broadcasting station with the same affiliation as broadcasting station A, consequently taking some time to display and output the picture and sound (content) of the broadcasting station with the same affiliation as broadcasting station A. However, when the digital broadcast receiver of this embodiment switches from broadcasting station A to a broadcasting station with the same affiliation as broadcasting station A, the demultiplexer selector 107 only has to switch the signal to be received by the video/audio decoder from the output signal from the first demultiplexer 2 to the output signal from the second demultiplexer 104. This can eliminate the time from when the demultiplexer starts receiving the TS of the broadcasting station with the same affiliation as broadcasting station A until the TS of the broadcasting station with the same affiliation as broadcasting station A is demultiplexed. Therefore, the digital broadcast receiver in this embodiment can shorten the time needed to display and output the picture and sound (content) of the broadcasting station with the same affiliation as broadcasting station A, in comparison with the digital broadcast receiver of the seventeenth embodiment.

What is claimed is:

1. A digital broadcast receiver comprising:
   a tuner for selecting, demodulating, and correcting errors in a received signal of a digital broadcast channel;
   an unreceivability detector for detecting, based on information obtained from a broadcasting station of a digital broadcast multiplex stream currently being tuned to, that it is currently impossible or is about to become impossible to receive the received signal from the broadcasting station of the multiplex stream currently being tuned to, and outputting an unreceivability notification;
   a broadcasting station memory for storing at least channel information of the broadcasting station of the multiplex stream currently being tuned to and, when a multiplex stream of an affiliated broadcasting station affiliated with the broadcasting station broadcasting the multiplex stream currently being tuned to and a multiplex stream having an MFN (multi-frequency network) relationship with the multiplex stream of the broadcasting station broadcasting the multiplex stream currently being tuned to are found through selection by the tuner, storing at least channel information of the multiplex stream of the affiliated broadcasting station and the MFN-related multiplex stream in association, as related by affiliation, with the at least channel information of the broadcasting station of the multiplex stream currently being tuned to, the channel information being necessary for performing station selection; and
   a tuning control unit for, upon receiving the unreceivability notification from the unreceivability detector, retrieving the channel information of the multiplex stream of the affiliated broadcasting station or the MFN-related multiplex stream from the broadcasting station memory, the multiplex stream of the affiliated broadcasting station and the MFN-related multiplex stream having been received, the channel information of the multiplex stream of the affiliated broadcasting station or the MFN-related multiplex stream being stored as related to the channel information of the broadcasting station of the multiplex stream currently being tuned to,
   if the channel information of the multiplex stream of the affiliated broadcasting station or the MFN-related multiplex stream can be retrieved, based on the retrieved channel information, deciding whether the received signal is currently in the 'currently receivable state', and, based on the decision that the received signal is in the 'currently receivable state', permitting the channel of the received signal to be tuned to a channel of the affiliated broadcasting station or to a channel of the station having a MFN relationship with the broadcasting station currently being tuned to, and
   if no channel information of the multiplex stream of the affiliated broadcasting station or the MFN-related multiplex stream can be retrieved, outputting a command to the tuner to make a channel search for a further multiplex stream of an affiliated broadcasting station and a further MFN-related multiplex stream, and if all of the received signal based on the retrieved channel information is 'currently unreceivable', outputting a command to the tuner to make a channel search for the further multiplex stream of the affiliated broadcasting station and the further MFN-related multiplex stream.

2. The digital broadcast receiver of claim 1, wherein the tuner receives, selects, demodulates, and corrects errors in the received signal of a digital broadcast channel found in a channel search made according to the command output from the tuning control unit or a broadcasting station specified through an input means, and outputs a multiplex stream of the received signal of the selected channel, further comprising:
   a demultiplexer for extracting a video/audio stream from the multiplex stream, outputting the video/audio stream, extracting PSI (Program Specific Information)/SI (Service Information) from the multiplex stream, and saving the PSI/SI; and
   a video/audio decoder for performing video decoding and audio decoding from the video/audio stream and outputting the decoded video signal and audio signal.

3. The digital broadcast receiver of claim 2 wherein:
   the tuner also outputs at least one of receiving level information, receiving C/N ratio (Carrier to Noise ratio) information, PLL lock information, frame lock information, and error rate information of the received signal of the channel when any of the processes of selecting, demodulating, and correcting errors cannot be carried out;
   the demultiplexer also outputs at least one of PAT (Program Association Table) interruption information, PMT (Program Map Table) interruption information, multiplex stream loss of synchronization information, and multiplex stream packet loss information when any of the processes of extracting a video/audio stream from the multiplex stream and extracting PSI (Program Specific Information)/SI (Service Information) from the multiplex stream cannot be carried out;
   the video/audio decoder also outputs at least one of decoding error detection information and decoding error rate information when any of the processes of performing video decoding and audio decoding from the video/audio stream cannot be carried out; and
   the unreceivability detector detects whether the received signal of the channel is in the 'currently unreceivable state' or the 'currently receivable state' according to at least one of said information.

4. The digital broadcast receiver of claim 1, wherein the broadcasting station memory also stores the PSI/SI of the broadcasting station of the channel being tuned to or the PSI/SI of the multiplex stream of affiliated broadcasting stations and the MFN-related multiplex stream; and
   the tuning control unit
   when it receives the unreceivability notification from the unreceivability detector, retrieves the channel information and PSI/SI of the multiplex stream of the affiliated broadcasting stations and the MFN-related multiplex stream from the broadcasting station memory,
   if channel information of the multiplex stream of the affiliated broadcasting station or the MFN-related multiplex stream can be retrieved, based on the retrieved channel information, decides whether the received signal is in the 'currently receivable state', decides from the PSI/SI whether the channel being tuned to and the channel of the received signal are the same or not, and permits the channel of the received signal to be tuned to based on the decision that the received signal in the 'currently receivable state' and the channels are the same, and
   if no channel information of the multiplex stream of the affiliated broadcasting station or the MFN-related multiplex stream can be retrieved, or if reception based on the retrieved channel information is possible but the channels are not the same, outputs the command to make a channel search for a further multiplex stream of affiliated broadcasting station and a further MFN-related multiplex stream.

5. The digital broadcast receiver of claim 4, wherein when the tuning control unit receives the unreceivability notification from the unreceivability detector, it determines whether the channel being tuned to and the channel of the received signal based on the retrieved channel information are the same or not from the affiliation_id field value in the BIT (Broadcaster Information Table) section of the PSI/SI.

6. The digital broadcast receiver of claim 1, wherein when the tuning control unit receives the unreceivability notification from the unreceivability detector, if a plurality of the information of the multiplex stream of the affiliated broadcasting station or the MFN-related multiplex stream are retrieved, the tuning control unit selects them in a priority order and decides whether or not the received signal based on them are in the 'currently receivable state'.

7. The digital broadcast receiver of claim 6, wherein in the 'currently receivable state'-or-not decision process, the tuning control unit selects broadcasting stations disposed in an area adjacent to the service area of the multiplex stream being received, selecting the broadcasting stations in order of proximity.

8. The digital broadcast receiver of claim 6, wherein in the 'currently receivable state'-or-not decision process, the tuning control unit selects broadcasting stations in order of the number of times it has successfully selected them in the past.

9. The digital broadcast receiver of claim 6, wherein in the 'currently receivable state'-or-not decision process, the tuning control unit selects broadcasting stations disposed in areas adjacent to the service area of the multiplex stream being received, in order of closeness in time of successful reception, giving highest priority to the multiplex stream of the affiliated station or MFN-related multiplex stream that was successfully received most recently.

10. The digital broadcast receiver of claim 1, further comprising a positioning unit for deciding whether or not the present location is in an unreceivable area of digital broadcasting on all channels, and if the present location is in an unreceivable area of digital broadcasting on all channels, notifying the tuning control unit that it is in an unreceivable area, wherein:
   the tuning control unit does not output the command to the tuner to make a channel search for the further multiplex stream of affiliated broadcasting station and the further MFN-related multiplex stream when the present location is in an unreceivable area of digital broadcasting on all channels.

11. The digital broadcast receiver of claim 1, further comprising a positioning unit for detecting the present location, outputting location information thereof, deciding whether or not the present location is in an unreceivable area of digital broadcasting on all channels, and if the present location is in an unreceivable area of digital broadcasting on all channels, notifying the tuning control unit that it is in an unreceivable area, wherein:
   the tuning control unit maintains the selection of the channel being tuned to so far when the present location is in an unreceivable area of digital broadcasting on all channels.

12. A receiving method for a digital broadcast receiver, comprising:

a channel information storing step for storing at least channel information of a digital broadcast channel being tuned to, the channel information being necessary for performing station selection;

a receiving step using a tuner for selecting, demodulating, and correcting errors in a received signal of a digital broadcast channel from a broadcasting station;

an unreceivability notification step for detecting, based on information obtained from a received signal of the channel currently being tuned to, that it is currently impossible or is about to become impossible to receive the received signal of the channel currently being tuned to, and outputting an unreceivability notification;

a channel information detection step for retrieving channel information of a multiplex stream of an affiliated broadcasting station affiliated with the broadcasting station transmitting the channel being tuned to and a multiplex stream having an MFN relationship with the multiplex stream of the broadcasting station transmitting the channel currently being tuned to, when the unreceivability notification is received, the multiplex stream of the affiliated broadcasting station and the MFN-related multiplex stream having been received, the channel information of the multiplex stream of the affiliated broadcasting station or the MFN-related multiplex stream being stored as related to the channel information of the broadcasting station of the channel currently being tuned to;

a receivability decision step which, if the channel information of the multiplex stream of the affiliated broadcasting station or the MFN-related multiplex stream can be retrieved, decides, based on the retrieved channel information, whether the received signal is in the 'currently receivable state';

a tuning step which, based on the decision that the received signal is in the 'currently receivable state', tunes the channel of the received signal to a channel of the affiliated broadcasting station or to a channel of the station having a MFN relationship with the broadcasting station currently being tuned to;

a channel search step in which, if no channel information of the multiplex stream of the affiliated broadcasting station or the MFN-related multiplex stream can be retrieved, a channel search for a further multiplex stream of affiliated broadcasting station and a further MFN-related multiplex stream is made by the tuner, and if all of the received signal based on the retrieved channel information is in the 'currently unreceivable state', a channel search for the further multiplex stream of affiliated broadcasting station and the further MFN-related multiplex stream is made by the tuner; and an affiliation relation storing step in which, when the multiplex stream of the affiliated broadcasting station or the MFN-related multiplex stream of the broadcasting station of the channel being tuned to is detected by the channel search made by the tuner, at least channel information of the multiplex stream of the affiliated broadcasting station or the MFN-related multiplex stream is stored as related by affiliation or by an MFN relationship with the at least channel information of the broadcasting station of the channel being tuned to.

13. The receiving method for a digital broadcast receiver of claim 12, wherein the received signal of a digital broadcast channel from a broadcasting station found in a channel search or a broadcasting station specified through an input means is received, selected, demodulated, and error-corrected by the tuner in the receiving step, further comprising:

a demultiplexing step using a demultiplexer for extracting a video/audio stream from the multiplex stream, outputting the video/audio stream, extracting PSI (Program Specific Information)/SI (Service Information) from the multiplex stream, and saving the PSI/SI; and a video/audio decoding step using a video/audio decoder for performing video decoding and audio decoding from the video/audio stream and outputting the decoded video signal and audio signal.

14. The receiving method for a digital broadcast receiver of claim 13 wherein:

in the receivability decision step, when any of the processes of selecting, demodulating, and correcting errors cannot be carried out by the tuner, at least one of receiving level information, receiving C/N ratio information, PLL lock information, frame lock information, and error rate information of the received signal of the channel is output;

in the demultiplexing step, when any of the processes of extracting a video/audio stream from the multiplex stream and extracting PSI (Program Specific Information)/SI (Service Information) from the multiplex stream cannot be carried out, at least one of PAT (Program Association Table) interruption information, PMT (Program Map Table) interruption information, multiplex stream loss of synchronization information, and multiplex stream packet loss information is output;

in the video/audio decoding step, when any of the processes of performing video decoding and audio decoding from the video/audio stream cannot be carried out, at least one of decoding error detection information and decoding error rate information is output; and the 'currently unreceivable state' of the received signal of the channel is detected according to at least one of said information.

15. The receiving method for a digital broadcast receiver of claim 12, wherein:

in the channel information retrieval step, the channel information and PSI/SI of the multiplex stream of the affiliated broadcasting stations and the MFN-related multiplex stream are retrieved;

in the receivability decision step, besides deciding whether the received signal based on the retrieved channel information is in the 'currently receivable state', also decides from the PSI/SI whether the channel being tuned to and the channel of the received signal based on the retrieved channel information are the same or not;

in the tuning step, the channel of the received signal based on the retrieved channel information is tuned to if it is in the 'currently receivable state' and the channels are the same;

in the channel searching step, if no channel information of the multiplex stream of the affiliated broadcasting station or the MFN-related multiplex stream can be retrieved, or if reception based on the retrieved channel information is receivable but the channels are not the same, the channel search is carried out; and in the affiliation relation storing step, the PSI/SI of the broadcasting station of the channel being tuned to and the PSI/SI of the multiplex stream of its affiliated station or its MFN-related multiplex stream are also stored.

16. The receiving method for a digital broadcast receiver of claim 12, wherein when the unreceivability notification is received, if a plurality the information of the multiplex stream of the affiliated broadcasting station or the MFN-related multiplex stream are retrieved, they are selected in a priority order and whether or not the received signal based on them are in the 'currently receivable state' is decided.

17. The receiving method for a digital broadcast receiver of claim 16, wherein in the 'currently receivable state'-or-not decision process, the broadcasting stations disposed in an area adjacent to the service area of the multiplex stream being received are selected in order of proximity.

18. The receiving method for a digital broadcast receiver of claim 16, wherein in the 'currently receivable state'-or-not decision process, the broadcasting stations are selected in order of the number of times they have been successfully selected in the past.

19. The receiving method for a digital broadcast receiver of claim 16, wherein in the 'currently receivable state'-or-not decision process, the broadcasting stations disposed in an area adjacent to the service area of the multiplex stream being received are selected in order closeness in time of successful reception, highest priority being given to the multiplex stream of the affiliated station or the MFN-related multiplex stream that was successfully received most recently.

20. The receiving method for a digital broadcast receiver of claim 16, further comprising an unreceivable area decision step for deciding whether or not the present location is in an unreceivable area of digital broadcasting on all channels, and if the present location is in an unreceivable area of digital broadcasting on all channels, issuing a notification that it is in an unreceivable area, wherein:
the channel search for the further multiplex stream of affiliated broadcasting station or the further MFN-related multiplex stream by the tuner is not performed when the present location is in an unreceivable area of digital broadcasting on all channels.

21. The receiving method for a digital broadcast receiver of claim 12, further comprising an unreceivable area decision step for detecting the present location, outputting location information thereof, deciding whether or not the present location is in an unreceivable area of digital broadcasting on all channels, and if the present location is in an unreceivable area of digital broadcasting on all channels, issuing a notification that it is in an unreceivable area, wherein:
when the present location is in an unreceivable area of digital broadcasting on all channels, the selection of the channel being tuned to so far is maintained.

22. The digital broadcast receiver of claim 1, wherein the tuning control unit also adds the channel information of the tuned multiplex stream to be linked to a stored channel information of a multiplex stream which is affiliated with or MFN-related with the tuned multiplex stream in the broadcasting station memory.

23. The digital broadcast receiver of claim 1, wherein the tuning control unit also adds the channel information of the tuned multiplex stream to be linked to a stored channel information of a multiplex stream which is affiliated with or MFN-related with the tuned multiplex stream in the broadcasting station memory, when the stored channel information is detected in the broadcasting station memory in a channel search sequence.

24. The digital broadcast receiver of claim 1, wherein when the further multiplex stream of the affiliated broadcasting station or the further MFN-related multiplex stream is detected, the tuning control unit stops the channel search and permits the channel of the received signal to be tuned to a channel of the detected affiliated broadcasting station or to a channel of the detected station having a MFN relationship with the broadcasting station currently being tuned to.

* * * * *